United States Patent [19]

Patterson

[11] Patent Number: 4,938,733
[45] Date of Patent: Jul. 3, 1990

[54] BICYCLE GEAR SHIFTING METHOD AND APPARATUS
[75] Inventor: Sam H. Patterson, Chicago, Ill.
[73] Assignee: Sram Corporation, Chicago, Ill.
[21] Appl. No.: 456,155
[22] Filed: Dec. 21, 1989

Related U.S. Application Data

[63] Continuation-in-part of Ser. No. 293,521, Jan. 5, 1989, Pat. No. 4,900,291, which is a continuation-in-part of Ser. No. 291,359, Dec. 29, 1988, abandoned, which is a continuation of Ser. No. 141,625, Jan. 6, 1988, abandoned.

[51] Int. Cl.$^5$ .............................................. F16H 9/24
[52] U.S. Cl. ........................................ 474/80; 74/488; 74/501.6
[58] Field of Search ............................... 474/77–81; 74/473 R, 475, 480 R, 488, 489, 501.6; 280/289 R, 289 H

[56] References Cited

U.S. PATENT DOCUMENTS

| | | | |
|---|---|---|---|
| 4,055,093 | 10/1977 | Ross | 474/81 X |
| 4,194,408 | 3/1980 | Hedrich | 474/81 |
| 4,201,095 | 5/1980 | Cirami | 474/81 |
| 4,267,744 | 5/1981 | Yamasaki | 474/82 X |
| 4,384,864 | 5/1983 | Bonnard | 474/80 |
| 4,693,700 | 9/1987 | Chappell | 474/80 |

Primary Examiner—Thuy M. Bui
Attorney, Agent, or Firm—Albert L. Gabriel

[57] ABSTRACT

A bicycle derailleur gear shifting system having a rotatable handgrip actuator cam which is coupled with the derailleur shifting mechanism through a control cable system so as to control the derailleur mechanism. Separate actuator cams are associated with the front and rear derailleurs. For the down-shifting direction, at least the rear derailleur cam is configured so as to substantially compensate for increasing force of the derailleur return spring; so as to substantially compensate for numerous cumulative lost motions in the derailleur shifting mechanism and cable system, and for chain gap variations; and so as to overshift the chain a sufficient amount beyond the destination freewheel sprocket so that the chain will approach the destination sprocket in the same direction as it would in the up-shift direction, but not sufficient to cause a double shift, or derailling from the #1 sprocket. A front derailleur cam is configured to provide fine-tuning for "cross-over" riding. In one form of the invention a secondary overshift boost cam is added axially in tandem with the primary cam, and is adaptable to both the front and rear derailleur shift actuators.

41 Claims, 19 Drawing Sheets

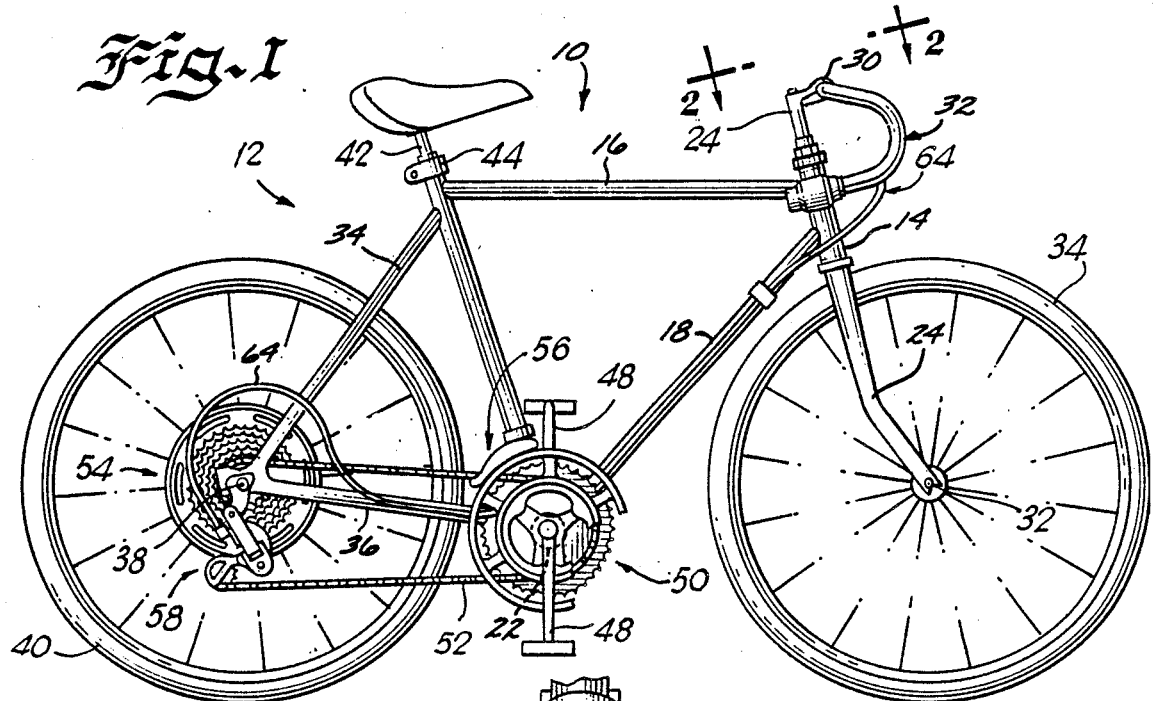
Fig. 1
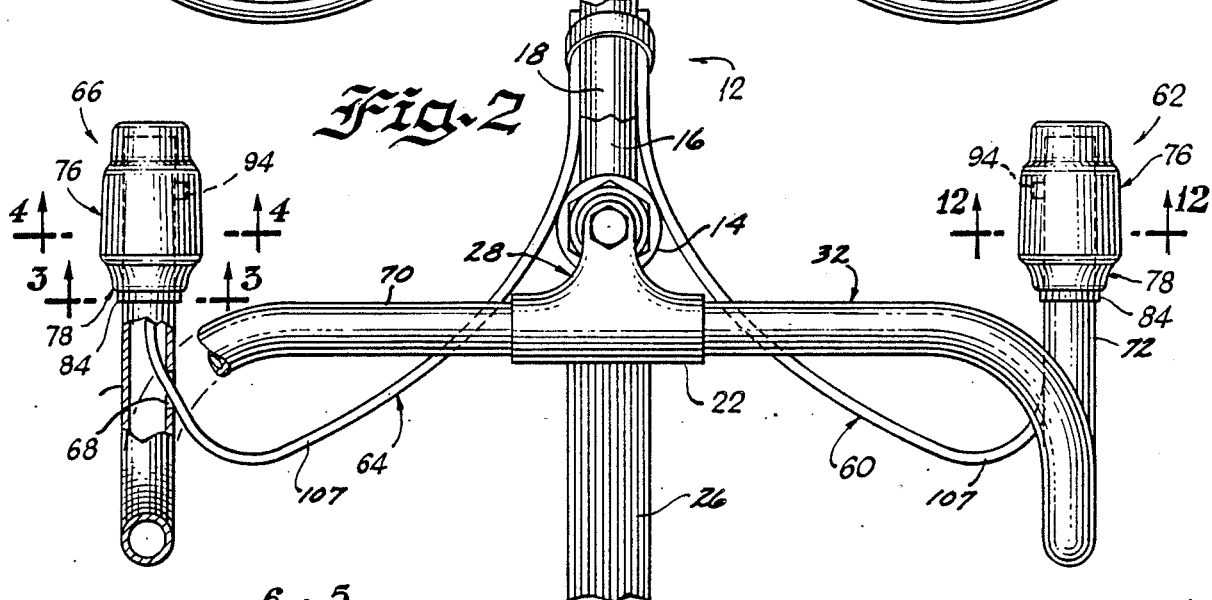
Fig. 2
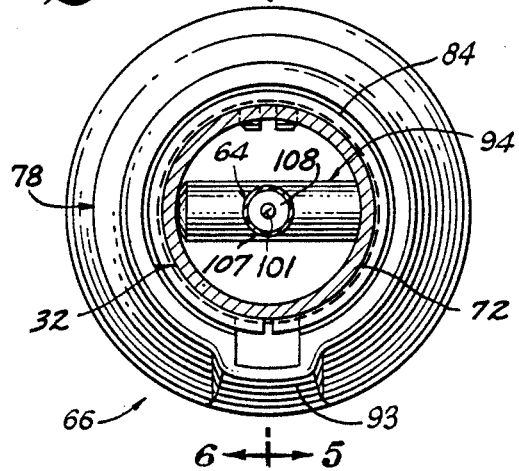
Fig. 3
Fig. 4

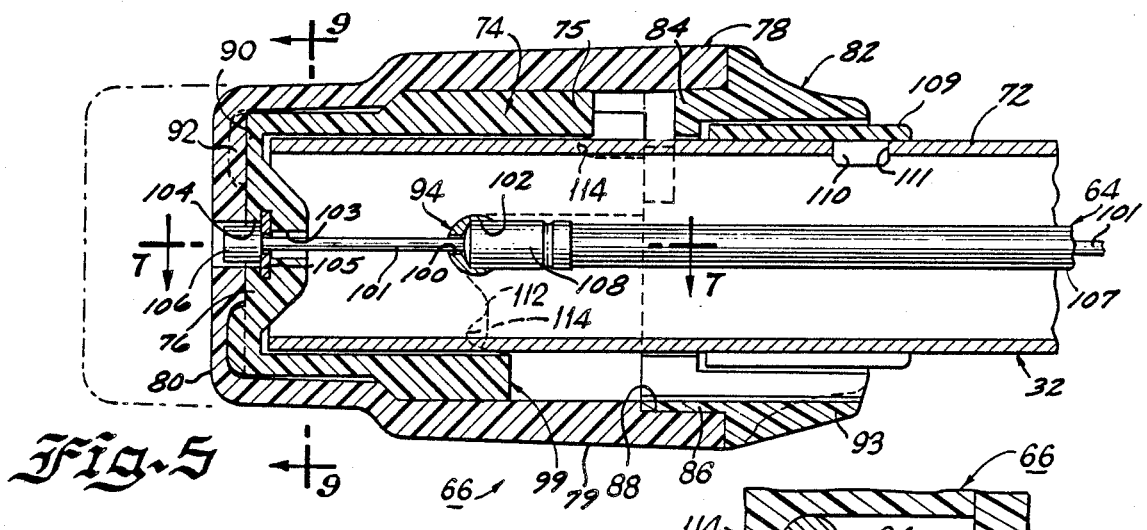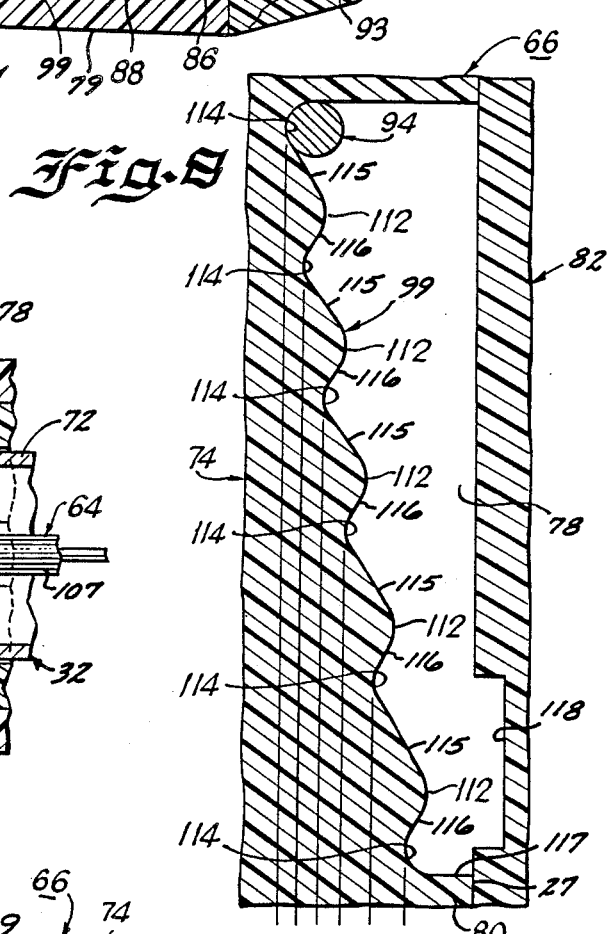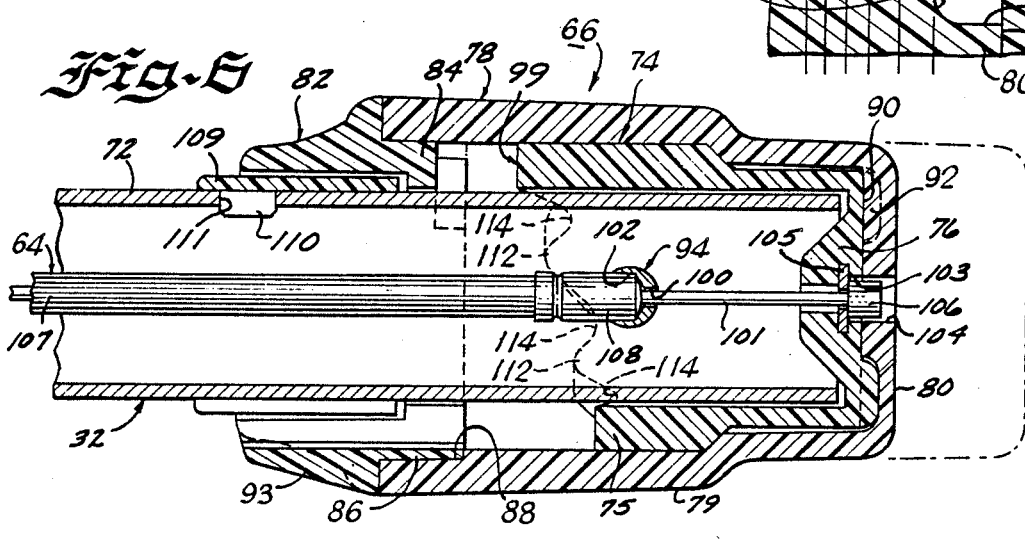

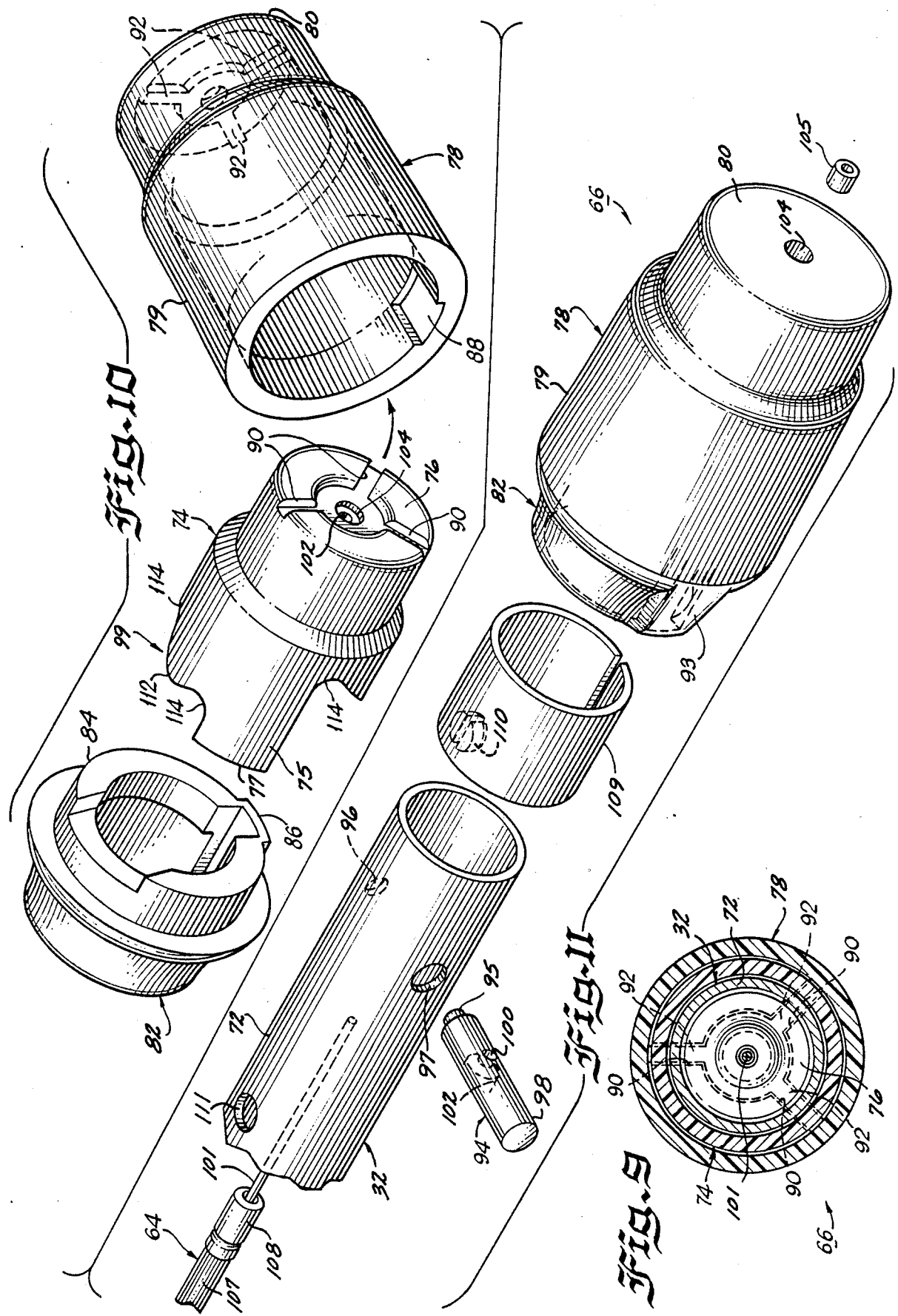

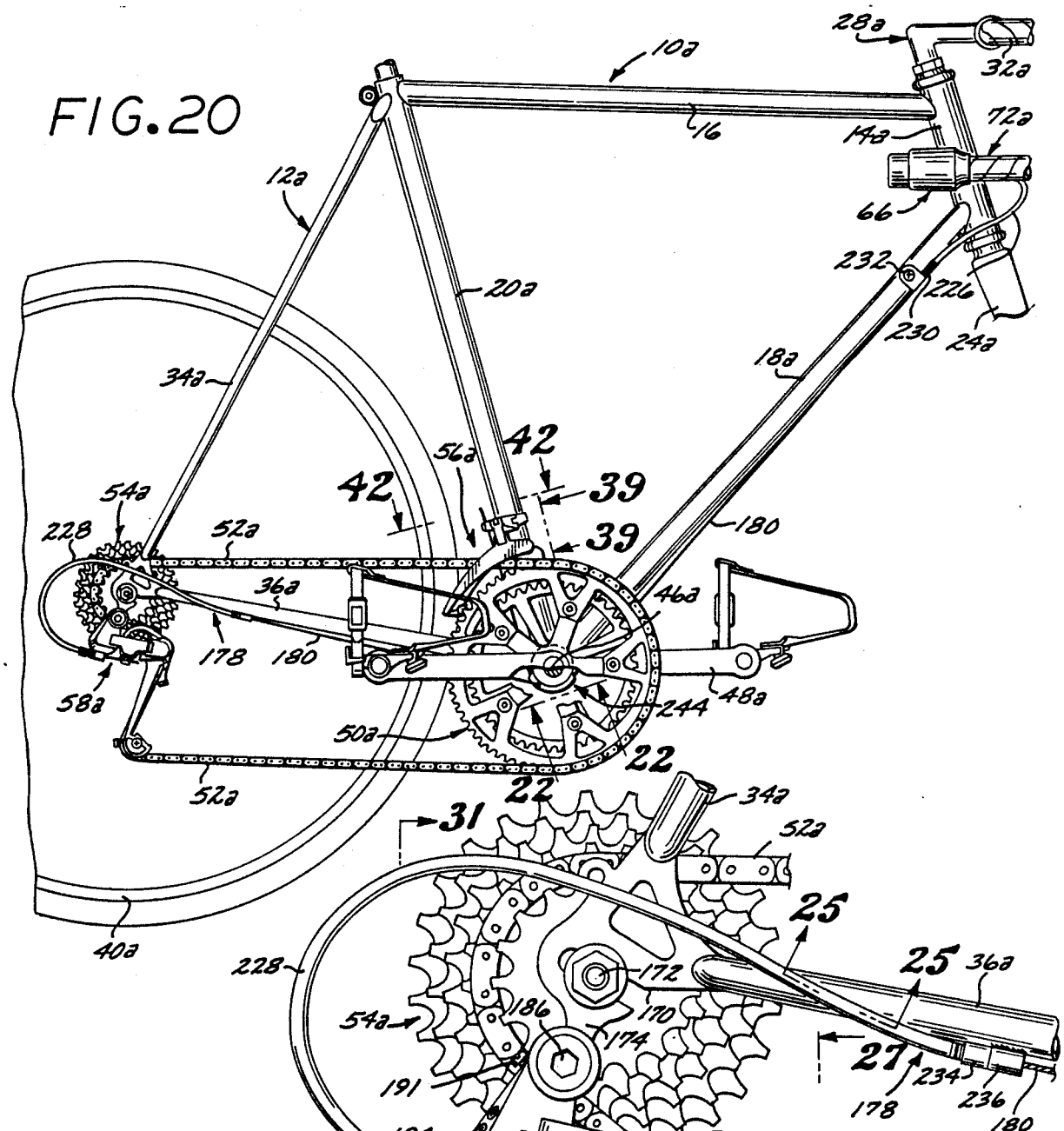

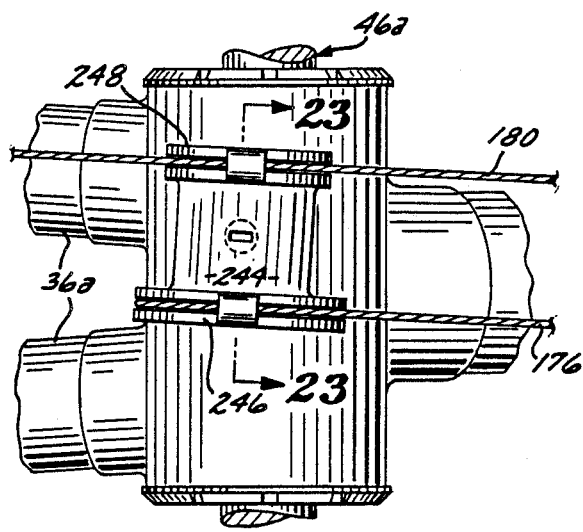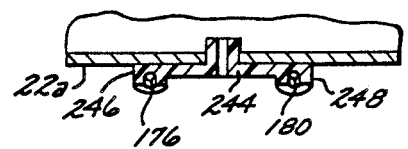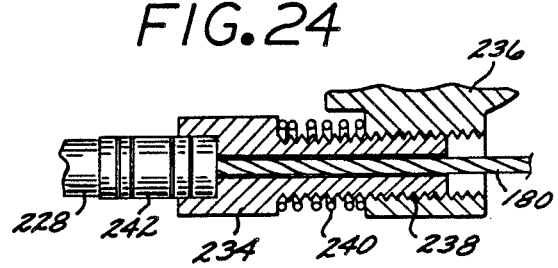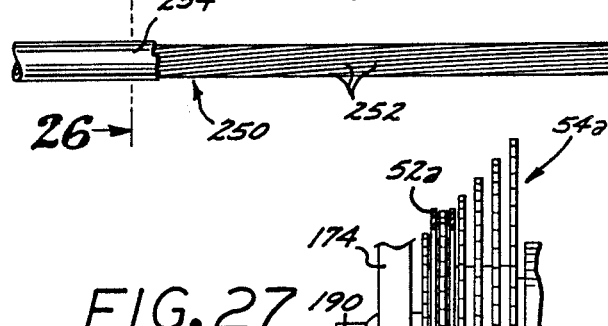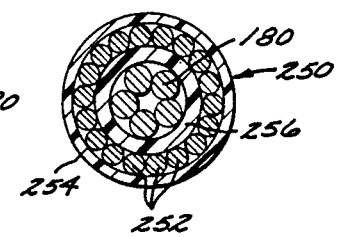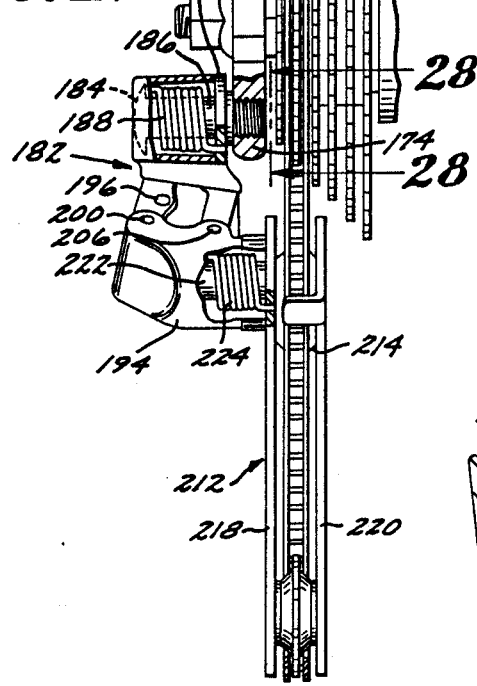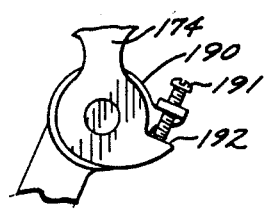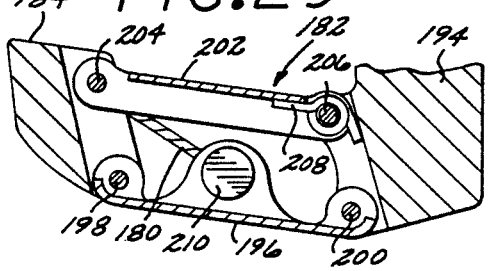

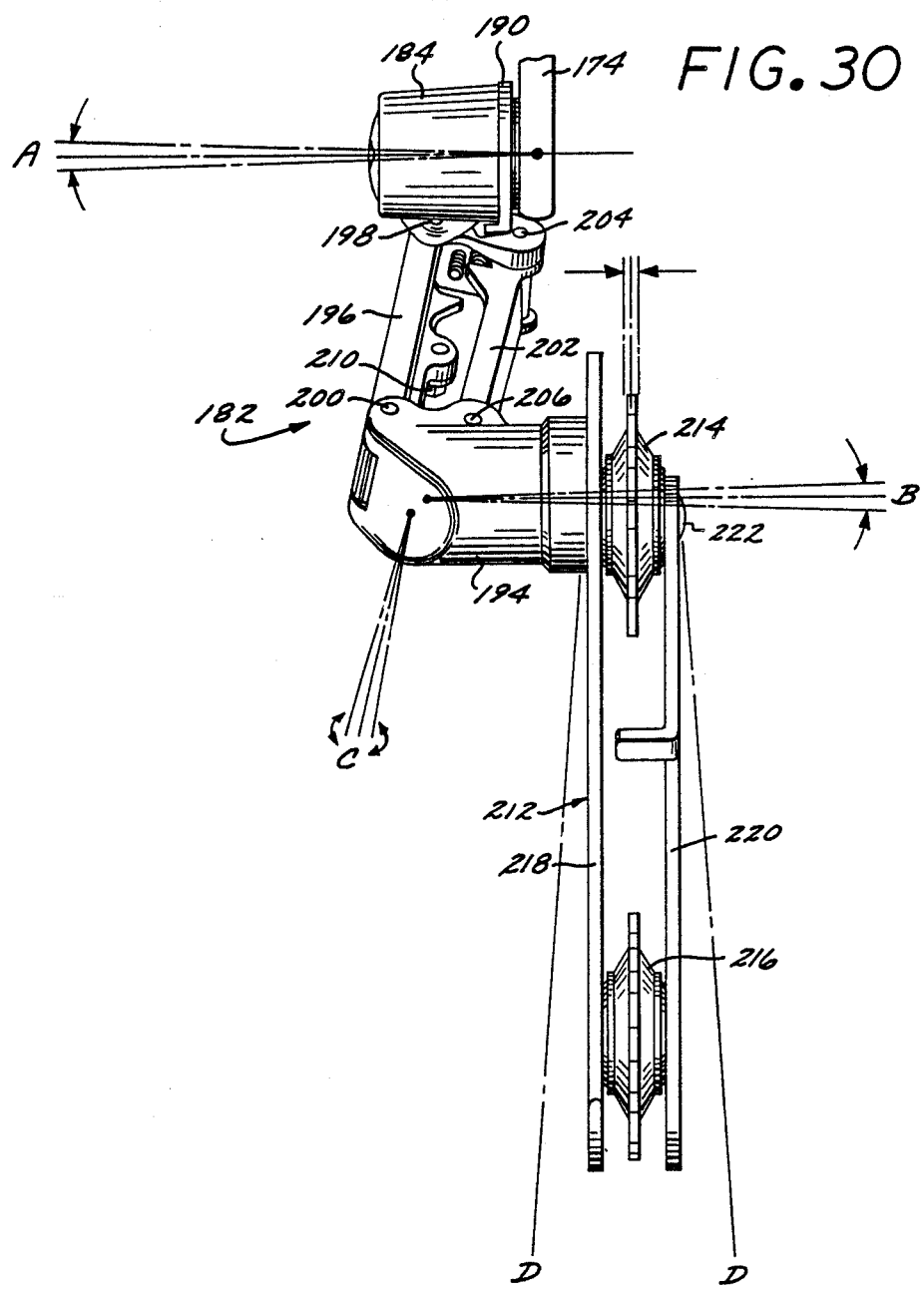

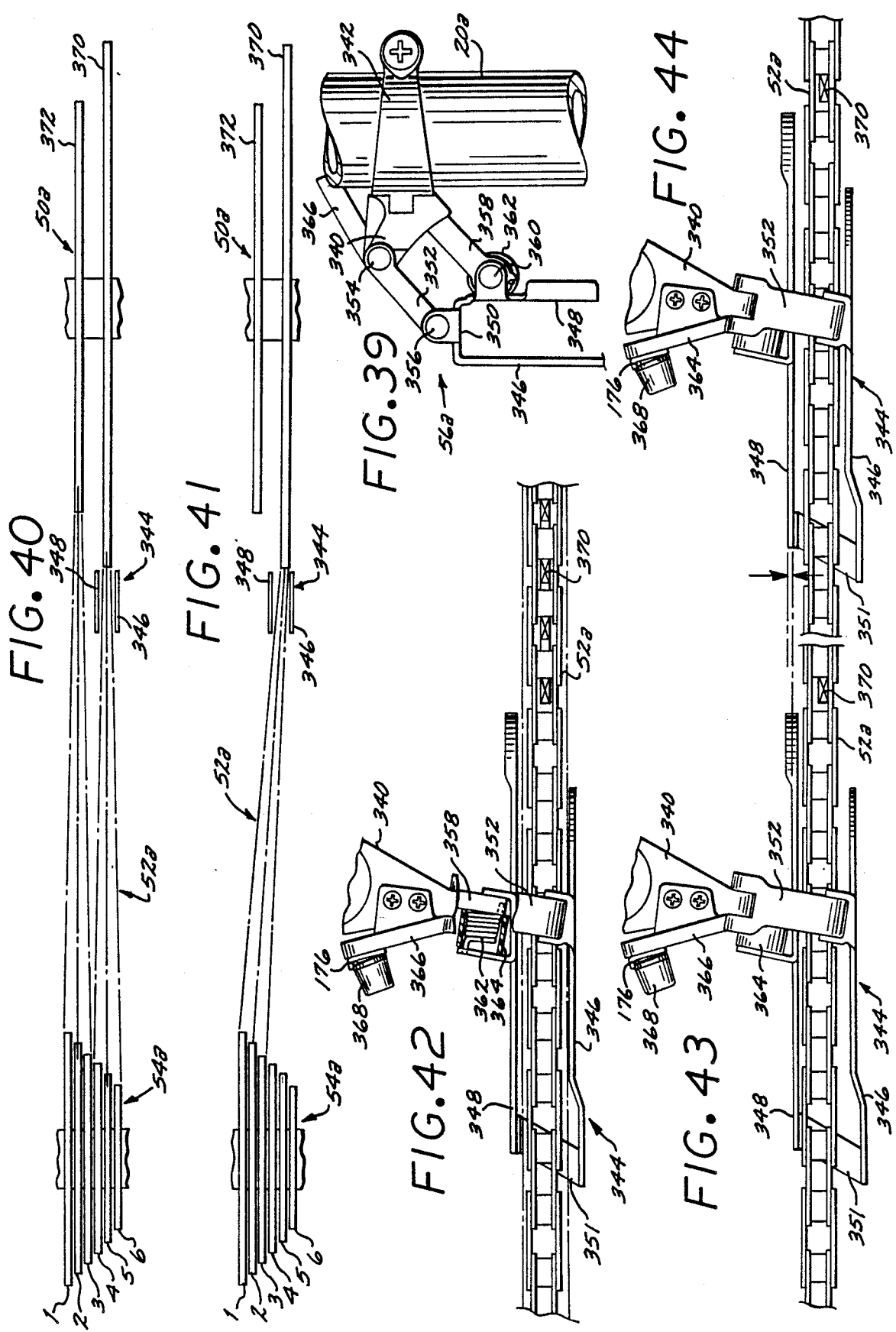

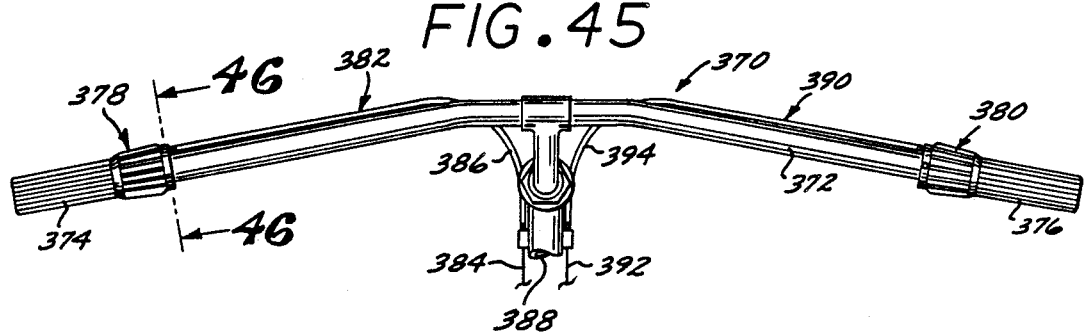
FIG. 45
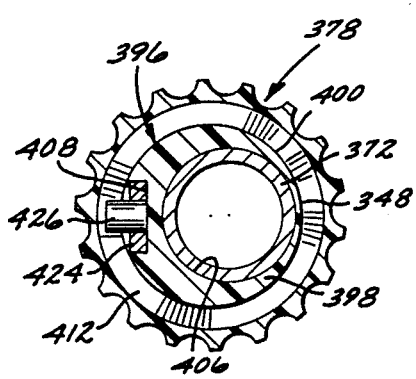
FIG. 46
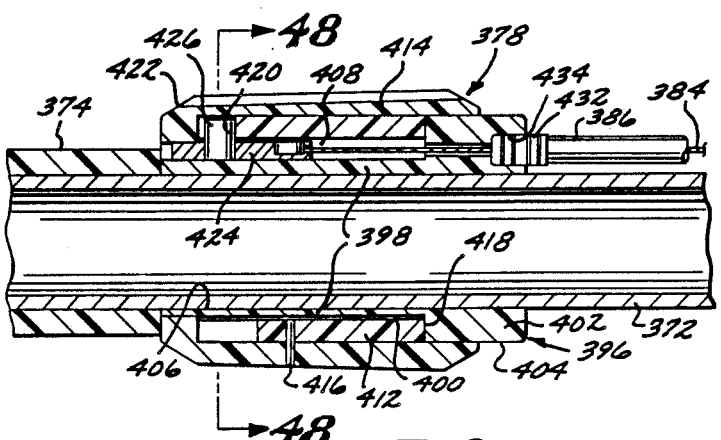
FIG. 47
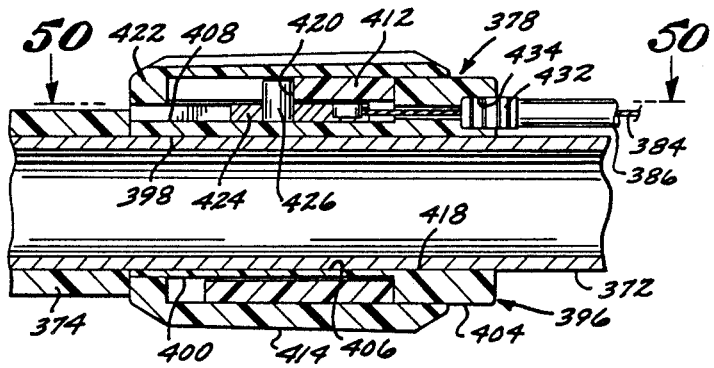
FIG. 48
FIG. 49
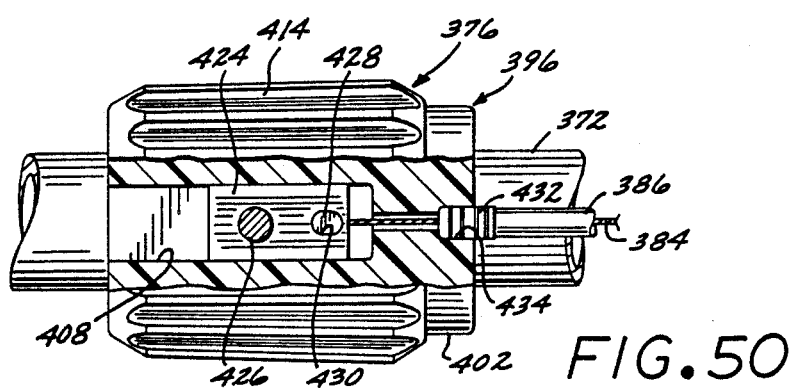
FIG. 50

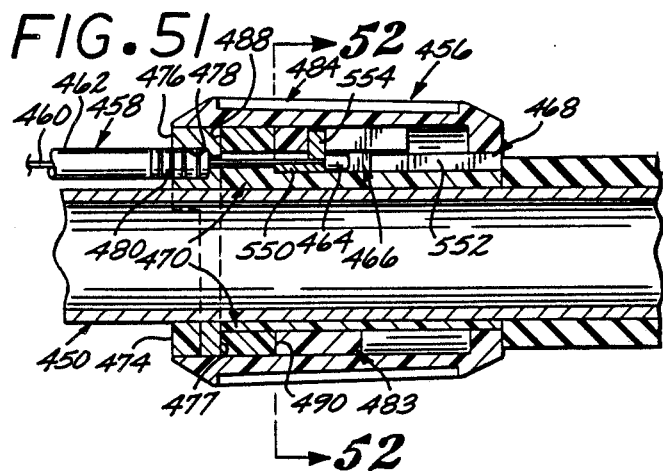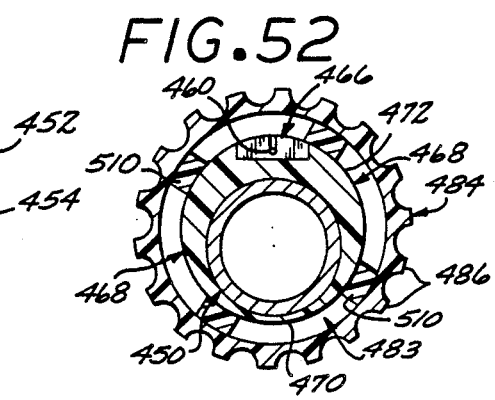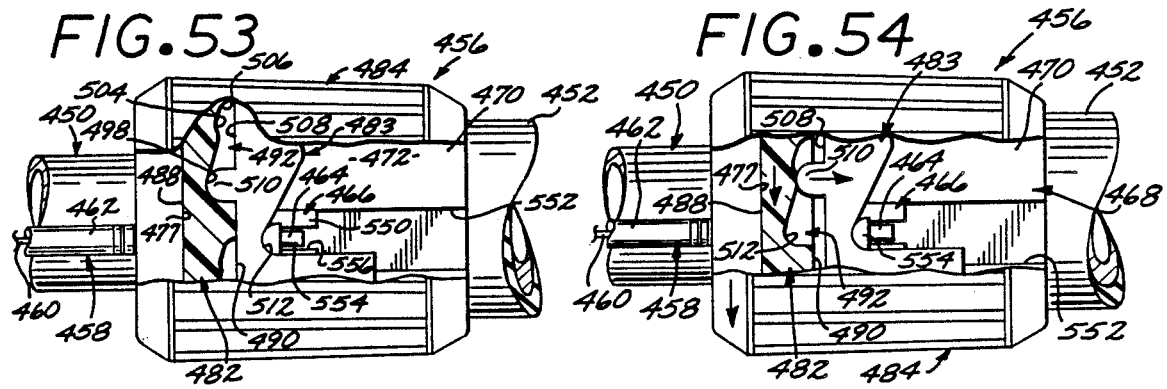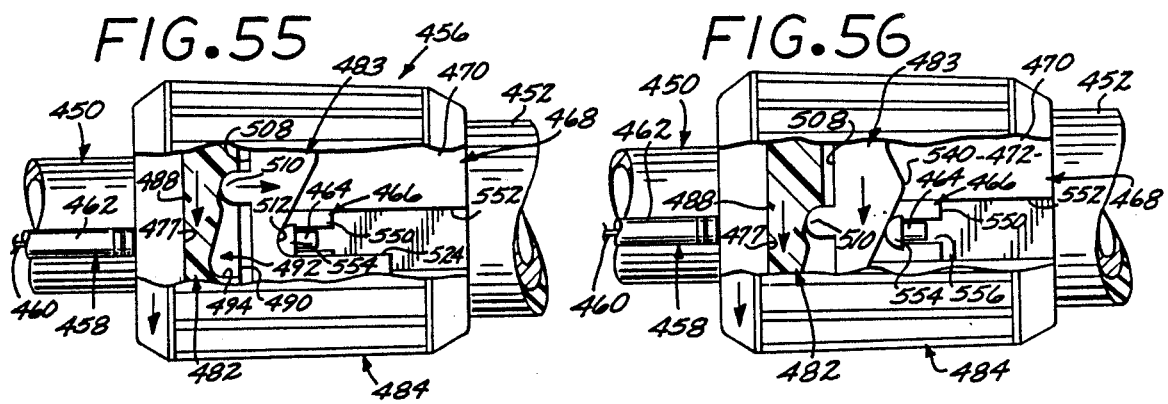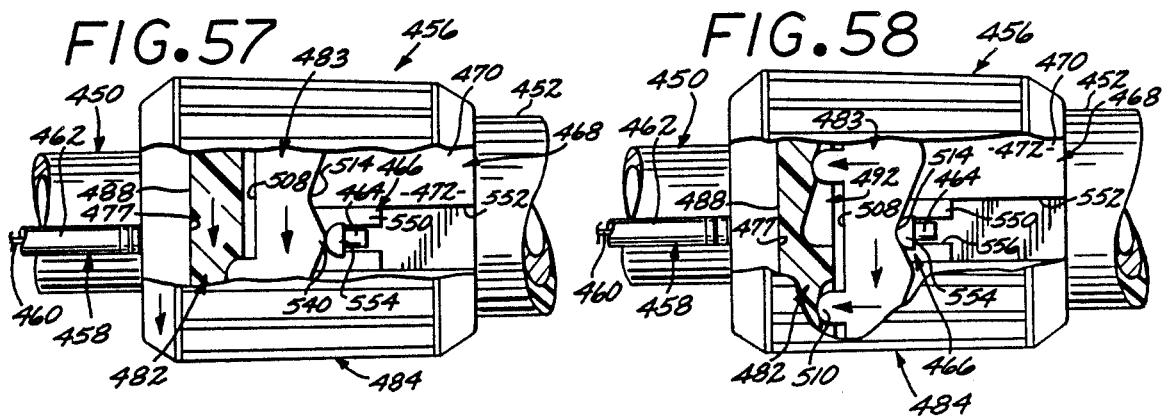

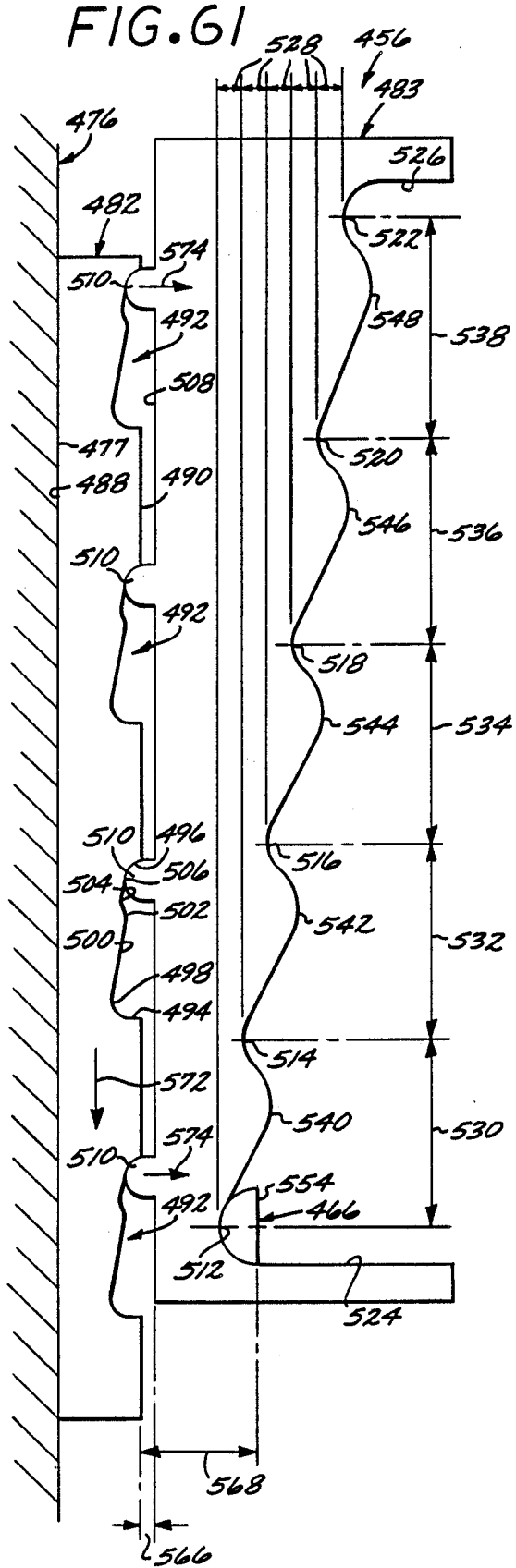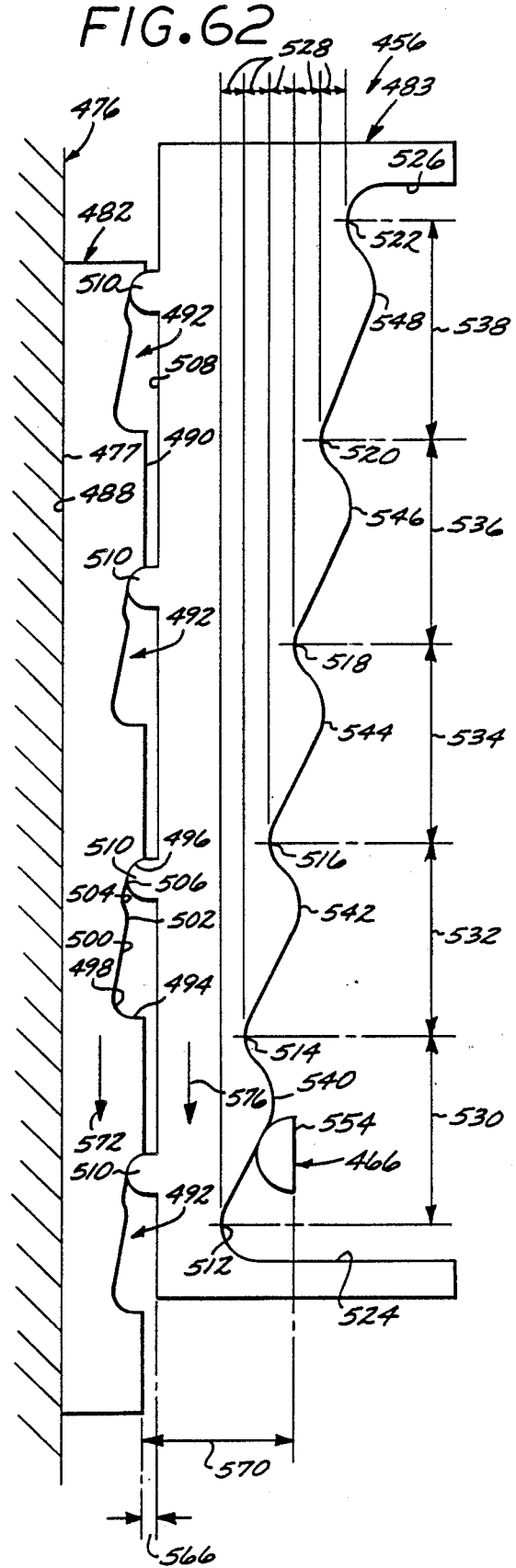

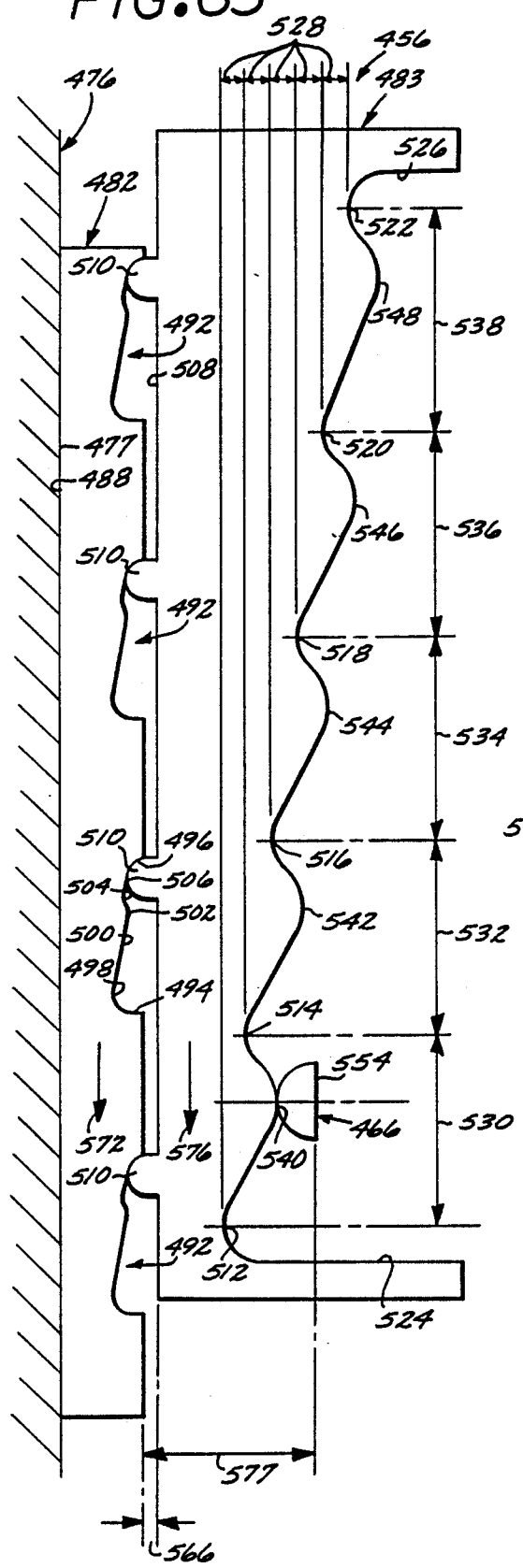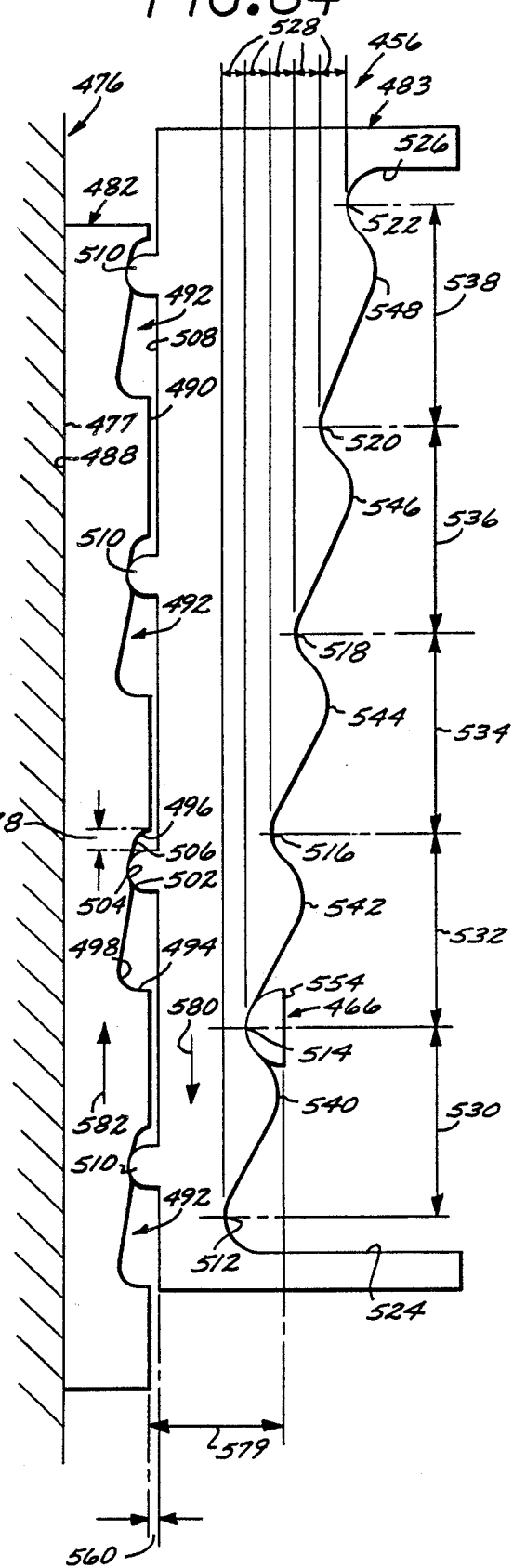

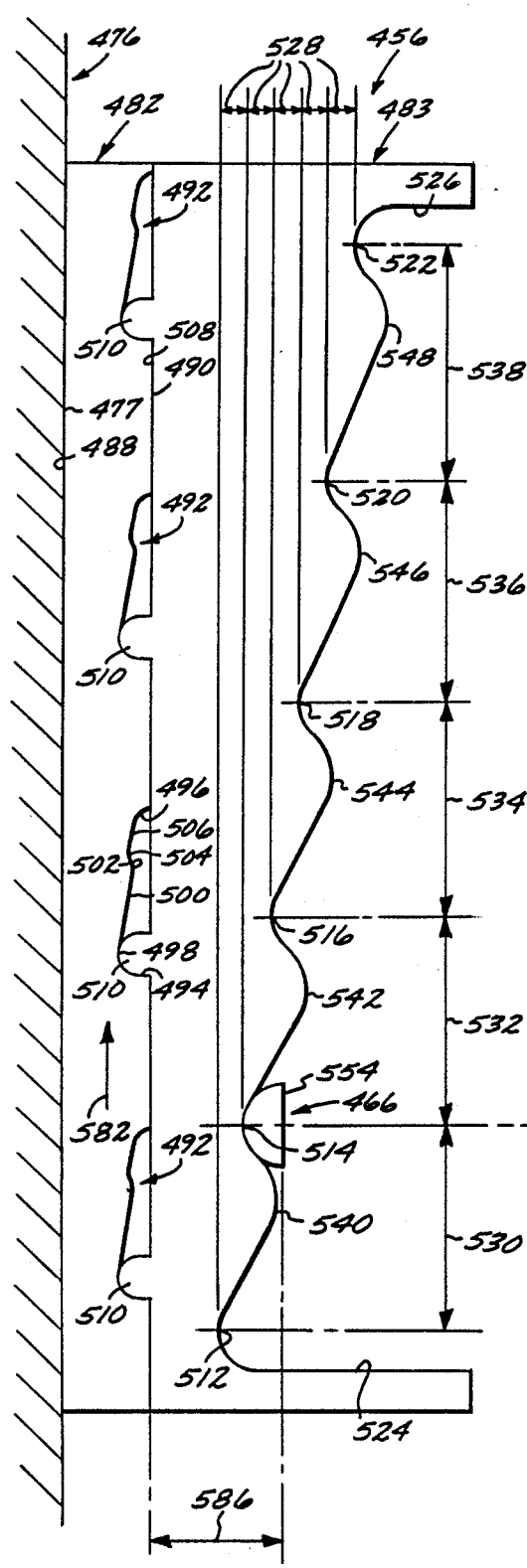
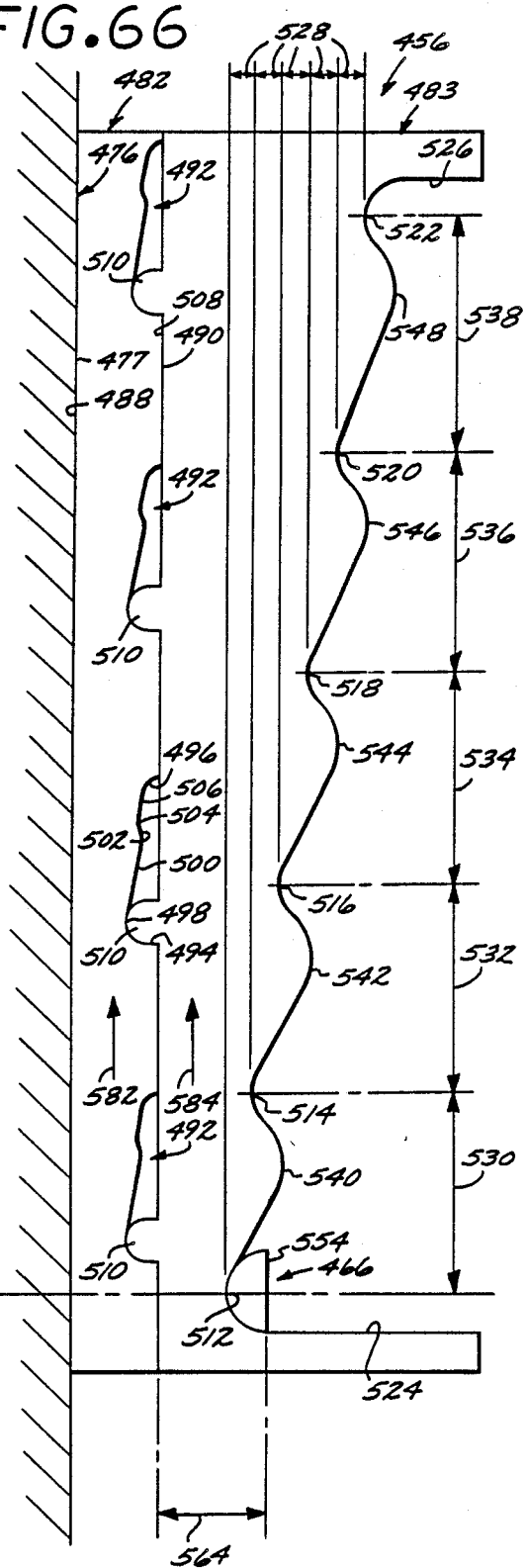

4,938,733

BICYCLE GEAR SHIFTING METHOD AND APPARATUS

RELATED APPLICATIONS

The present application is a continuation-in-part of application Ser. No. 07/293,521, filed Jan. 5, 1989 now U.S. Pat. No. 4,900,291 for BICYCLE GEAR SHIFTING METHOD AND APPARATUS, which was a continuation-in-part of application Ser. No. 07/291,359, filed Dec. 29, 1988 for BICYCLE GEAR SHIFTING SYSTEM, now abandoned, which in turn was a continuation of application Ser. No. 07/141,625, filed Jan. 6, 1988 for BICYCLE GEAR SHIFTING SYSTEM, now abandoned.

BACKGROUND OF THE INVENTION

1. Field of the Invention

The present invention relates in general to derailleur-type bicycle shifting systems, and more particularly to such a system wherein front and rear derailleur mechanisms are precisely controlled by respective rotatable handgrip shift actuators.

2. Description of the Prior Art

There has been a long-felt but previously unfulfilled need in the art for a bicycle derailleur shifting system which does not require that a hand, or least a thumb, be removed from the handlebar during shifting. Many derailleur shifting devices are actuated by levers mounted on the down tube of the frame, while some are mounted on the top tube and others on the handlebar. Such levers mounted on the down tube or the top tube all require that a hand be completely removed from the handlebar during shifting. Some derailleur shifting levers mounted on the handlebar can be actuated by taking a thumb off the handlebar and pushing the lever with the thumb, but this also diminishes control of the bicycle, and is awkward, so most riders simply take their hand off the handlebar to move the shift lever. For both safety and convenience, it is desirable to be able to shift derailleur mechanisms with both hands right on the handlebars. Despite a long-felt need for such a derailleur shifting system, applicant is not aware of any prior art derailleur shifting system where the shifting events can be accomplished with both hands on the handlebar.

Typical prior art derailleur shifting mechanisms which require removal of the hand, or at least the thumb, from the handlebar are disclosed in the following U.S. Pat. Nos.: Ross 4,055,093; Hedrich 4,194,408; Cirami 4,201,095; Bonnard 4,384,864; and Strong 4,548,092.

There has also been a long-felt but previously unfulfilled need in the art for a bicycle derailleur shifting system which is capable of "overshifting," yet which is not undesirably complicated and expensive. Overshifting is movement of the chain beyond the destination sprocket, and then back into alignment with the destination sprocket. It has long been known in the art that such overshifting is desirable during down-shifting events for earlier and smoother shifts. Most derailleur shifting systems do not have any built-in mechanism for accomplishing such overshifting, and require that the rider deliberately move the shifting lever beyond the location of the destination sprocket and then back to the destination sprocket. This requires two rider inputs, one being a determination of the desired extent of overshift, and the other being the time duration of the overshift. Satisfactory overshifting by this means requires considerable skill.

Applicant is aware of two prior art patents which disclose bicycle derailleur shifting apparatus having a built-in overshift feature. These are Yamasaki U.S. Pat. No. 4,267,744 and Bonnard U.S. Pat. No. 4,384,864. Both of these are very complicated mechanisms. Each of these devices has a built-in determination of the amount of overshift travel, yet neither of them determines the timing of the overshift. This is left up to the rider, who must first move a lever to the overshift position, and then move the lever back to the normal shift position.

Another problem with the Yamasaki and Bonnard overshift mechanisms is that they each provide the same amount of overshift travel for each one of the sprockets of a rear derailleur freewheel. The problem with this is that in most, if not all, derailleur systems, the most advantageous extent of overshift travel varies for different freewheel sprockets. The "chain gap" or chain span between the derailleur guide pulley and a freewheel sprocket is considerably larger for the smaller, higher gear freewheel sprockets than for the larger, lower gear freewheel sprockets, and a relatively long chain gap generally requires a larger amount of overshift than a relatively short chain gap for optimum shifting. Another problem with the built-in overshift features in both Yamasaki and Bonnard is that an optimum amount of overshift for the other freewheel sprockets is generally too much for the #1, lowest gear sprocket closest to the wheel. An optimum amount of overshift travel for the other freewheel sprockets is likely to cause derailling from the #1 sprocket, which could seriously damage the bicycle. Thus, since the overshift amount is the same for all sprockets, it is inherent that neither of the Yamasaki or Bonnard overshift mechanisms produces sufficient overshift travel for optimum down-shifting.

In high quality, relatively expensive derailleur systems which have overshift programmed into the shifting mechanisms, at the end of a down-shifting event when the overshift is released, typically the chain will return to substantial alignment with the destination sprocket. However, in relatively inexpensive "mass market" derailleur systems, which tend to have undesirably long chain gaps and undesirably large amounts of lost motion, at the end of a down-shifting event where overshift is programmed into the shifting mechanism, the chain frequently will return too far so as to be out of alignment with the destination sprocket. Accordingly, with such relatively inexpensive mass market derailleur mechanisms, it is desirable to not only provide overshifting of the chain beyond the destination sprocket during a down-shifting event, but to also provide an overshift boost increment of movement of the chain relative to the destination sprocket which remains in effect after the down-shifting event, to assure substantial alignment of the chain with the destination sprocket at the termination of the down-shifting event. Applicant is not aware of any prior art overshift system which performs this function.

Another long-noted problem in the art which has heretofore been unsolved is the provision of an accurate front derailleur system capable of handling not only "parallel riding" but also "cross-over riding." For example, with a 2-chain wheel front derailleur system, for parallel riding the larger chain wheel will service the smaller rear freewheel sprockets, and the smaller chain wheel will service the larger freewheel sprockets. With cross-over riding, the chain may be crossed over from the larger chain wheel to relatively large freewheel sprockets, or the chain may be crossed over from the smaller chain wheel to relatively small freewheel sprockets. Such crossed-over chain locations have a propensity for causing undesirable "chain rasp," and the prior art solution to this problem was simply to provide a front derailleur chain cage having a relatively wide gap between the cage plates. While this may reduce chain rasp, it causes the further problems of inaccuracy in shifting, and frequent chain derailling.

In the case of front derailleur systems embodying three chain rings, chain rasp is often a serious problem after either a down-shifting event or an up-shifting event. Accordingly, it would be desirable to embody in the front derailleur shifting mechanism a means for relieving such chain rasp after both down-shifting and up-shifting events. Applicant is not aware of any front derailleur shifting system for a 3-chain wheel front derailleur for relieving such chain rasp, while at the same time embodying a relatively narrow and accurate front derailleur chain cage.

A further problem in the art, which relates primarily to rear bicycle derailleur shifting systems, is that there are numerous points of lost motion in both the derailleur mechanism and its actuating cable which cumulatively add up to a considerable amount of overall lost motion, as for example from about 0.040 to about 0.070 inch. Applicant has found that for accurate index shifting, substantially all of this cumulative lost motion must first be taken up at the shift actuator before the actual shift increment of travel between adjacent sprockets is applied during a down-shifting event. Applicant is not aware of any specific consideration of this problem in the prior art, and in particular of any specific compensation for such cumulative lost motion for each of the various types of derailleur and cable systems currently available.

It has long been recognized in the art that rotary handgrip devices can be useful for controlling vehicle mechanisms, particularly on motorcycles, but also on bicycles. Several of such devices are disclosed in French patent No. 829,283 to Braumandl. However, applicant is not aware of any such device having previously been employed in cooperation with derailleur bicycle shifting apparatus, and such is not taught or suggested by Braumandl.

SUMMARY OF THE INVENTION

In view of these and other problems in the art, it is a general object of the present invention to solve the problems associated with prior art bicycle derailleur shifting systems.

Another object of the invention is to provide a bicycle derailleur shifting system which embodies a shift actuator that is conveniently rotatably mounted about the handlebar and so located as to not require the rider to remove a hand, or even a thumb, from the handlebar to effect a shifting event, thereby providing improved shifting convenience and safety.

Another object of the invention is to provide a bicycle derailleur shifting system embodying a shift actuator which is particularly simple in construction and economical to manufacture, yet which, in combination with the derailleur mechanism, has improved performance over prior art derailleur shifting systems in all respects.

Another object of the invention is to provide a bicycle derailleur shifting system having a handgrip shift actuator embodying a generally helical cam which defines the derailleur mechanism movements.

Another object of the invention is to provide a bicycle derailleur shifting system which completely accounts and compensates for numerous lost motions in the derailleur mechanism and its actuating cable, thereby enabling precise index shifting to be accomplished.

A further object of the invention is to provide a bicycle derailleur shifting system wherein cable lost motion factors such as cable housing compressibility and warp are minimized and made very predictable to assist in accurately determining and compensating for all cumulative lost motion factors.

Another object of the invention is to provide a bicycle derailleur shifting system in which a rotary handgrip shift actuator cooperates with the derailleur mechanism so as to enable down-shifting to be easily accomplished with substantially uniform twisting effort by the rider for down-shifting through all of the gears, despite progressively increasing derailleur return spring loading for increasingly lower gear ratios.

A further object of the invention is to provide a bicycle derailleur shifting system in which a rotary handgrip shift actuator cooperates with the derailleur mechanism in compensating for variations in chain gap length.

A further object of the invention is to provide a bicycle derailleur shifting system in which a rotary handgrip shift actuator cooperates with the derailleur mechanism in providing an optimum amount of overshift for down-shifting to each of the gears, despite variations that may be present in spacing between different rear freewheel sprockets and variations in chain gap for different freewheel sprockets.

A further object of the invention is to provide a bicycle derailleur shifting system wherein a rotary handgrip shift actuator has built-in overshift capability, yet is very simple in construction.

A further object of the invention is to provide a bicycle derailleur shifting system which has built-in overshift capability, yet does not require manual input to define all or part of the overshift actuation.

A further object of the invention is to provide a bicycle derailleur shifting system wherein a rotary handgrip shift actuator effects overshift increments an optimum amount relative to each rear derailleur freewheel sprocket for the most positive and accurate index shift events possible.

A still further object of the invention is to define optimum and preferred minimum and maximum shifting limits for rear derailleur mechanisms, and to teach how these limits may be achieved by the use of rotary cam actuator means.

A still further object of the invention is to provide a bicycle derailleur shifting system wherein a front derailleur mechanism is actuated by a rotary handgrip shift actuator capable of fine-tuning the shift positions to accommodate cross-over riding.

Another object of the invention is to provide a bicycle derailleur shifting system having built-in overshift, wherein the overshift timing is automatically established by the natural shifting movement, and does not require separate rider input.

Another object of the invention is to provide a bicycle derailleur shifting system having a handgrip shift actuator rotatably mounted over the end of a handlebar.

Another object of the invention is to provide a bicycle derailleur shifting system having a handgrip shift actuator rotatably mounted on a handlebar inboard of the handlebar end.

Another object of the invention is to provide a bicycle derailleur shifting system wherein a secondary slip cam actuates a primary helical shifting cam to produce a transient overshift boost during down-shifting events which is unloaded during up-shifting events.

Another object of the invention is to provide a bicycle derailleur shifting system wherein the aforesaid secondary slip cam overshift boost enables the primary helical cam to have a lowered cam lobe profile for easier shifting actuation, or alternatively a shorter length for minimizing the overall amount of shift actuator rotation through the gears.

A further object of the invention is to provide a bicycle derailleur shifting system of the character described wherein the secondary slip cam has a profile such as to provide both a transient overshift boost and a permanent overshift boost which remains operative during a single down-shifting event or a plural sequence of down-shift events, such permanent overshift boost being particular useful for inexpensive "mass market" bicycles which tend to have undesirably long chain gaps and undesirably large amounts of lost motion in their derailleur systems.

A further object of the invention is to provide a handgrip shift actuator embodying both a primary helical shifting cam and a secondary cam which slips relative to the primary cam, wherein the secondary slip cam applies an overshift boost to the primary helical cam during down-shifting events which is unloaded during up-shifting events to place the up-shifted chain substantially on center with the destination sprocket.

A still further object of the invention is to provide a bicycle derailleur shifting system of the character described wherein the secondary slip cam is particularly adapted for high quality derailleur systems which have a minimum amount of lost motion, the secondary slip cam applying a transient boost during down-shifting events which is automatically unloaded to place the chain substantially on center with the destination sprocket at the end of any single down-shifting event or plural sequence of down-shifting events.

Yet a further object of the invention is to provide a bicycle derailleur shifting system of the character described wherein the secondary slip cam is adaptable for fine-tuning of a front derailleur chain cage to avoid chain rasp, which is a particularly useful feature where there are three front derailleur chain wheels and chain rasp tends to be a difficult problem.

According to the invention, a bicycle equipped with front and rear derailleurs has front and rear handgrip shift actuators rotatably mounted over the handlebar, the front handgrip shift actuator being operatively associated with the front derailleur mechanism for shifting the front derailleur, and the rear shift actuator being operatively associated with the rear derailleur mechanism for shifting the rear derailleur. The rear handgrip shift actuator is preferably mounted on the right side of the handlebar and the front handgrip shift actuator mounted on the left side of the handlebar to accommodate most riders, since the rear derailleur is shifted more frequently than the front derailleur. Each handgrip shift actuator contains a generally cylindrical primary cam member having a generally helical operating face configured with a plurality of spaced detents or valleys with a cam peak or lobe between each pair of adjacent detents. A housing covers and is keyed to the primary cam member. Thus, a front handgrip actuator which cooperates with a front derailleur having two chain rings will have a primary cam member having an operating face with two primary detents and one intervening peak. Similarly, a rear handgrip shift actuator for cooperation with a rear derailleur having a 6-sprocket freewheel will have a primary cam member with an operating face having six successive detents and five intervening peaks.

One form of handgrip shift actuator according to the invention is conveniently mounted over an end of the handlebar, as for example over an end of a traditional drop bar-type handlebar. In this type of handgrip shift actuator, the primary cam operating face faces inwardly away from the handlebar end, and engages a cam pin which is rigidly diametrically affixed to the handlebar with an operating end projecting outwardly from the handlebar. The derailleur actuating cable and cable jacket enter the inside of the handlebar through a suitable opening, and the cable passes through a hole in the pin and thence through a generally flat outer end portion of the cam member, with an enlargement crimped or cast on the end of the cable which bears against an outwardly facing surface on the end portion of the cam member. The cable jacket terminates in a counterbore of the pin hole. The other end of the cable is attached to the parallelogram of the derailleur mechanism and the cable is tensioned by the derailleur return spring associated with the parallelogram. Rotation of the handgrip actuator in one direction causes the primary cam face to ride upwardly, i.e., outwardly relative to the handlebar end, so as to pull the cable in down-shifting increments from detent to detent on the cam face. Rotation of the handgrip actuator in the opposite direction releases cable tension causing the derailleur mechanism to upshift from detent to detent on the cam face under the influence of the derailleur return spring.

Another form of handgrip shift actuator according to the invention which is particularly suitable for mountain bikes is mounted over the handlebar inboard of the handlebar end so as to leave room for a fixed handgrip proximate the end of the handlebar. In this form of grip shift actuator, a tubular support body is slipped over the outside of the handlebar and keyed to the handlebar. A cam follower plate slides in a slot in the tubular support body, and supports a cam follower pin. The generally cylindrical cam member is rotatably mounted over the support body, but does not move axially relative to the support body and handlebar; instead, the generally helical cam operating face, which faces outwardly toward the handlebar end, engages the cam follower pin and causes the pin and its plate to shift generally axially relative to the shift actuator and handlebar according to the primary cam face configuration. The derailleur actuator cable is connected to the cam follower, biasing the follower against the cam operating face because of tension on the cable from the derailleur mechanism return spring. The cable jacket end seats in a recess in the actuator support body. A generally cylindrical housing encompasses the cam member and a portion of the support body, being keyed to the cam member but being rotatable relative to the support body. Rotation of the housing and cam member in one direction will cause the cam follower to ride upwardly on the primary cam operating face or toward the end of the handlebar, pulling the cable in successive down-shifting increments from detent to detent along the cam face, and rotation of the actuator in the opposite direction will cause the cam follower to release the cable in up-shifting increments from detent to detent along the cam face under the influence of the derailleur return spring.

An important aspect of the present invention is the coaction between the rotary handgrip shift actuator and any one of a number of different derailleur systems. Each of the various derailleur systems has its own special operating characteristics which must be accounted for in a handgrip cam of the invention, these characteristics including a variety of lost motions in both the derailleur mechanism and its cable system, varying chain gap for the different freewheel sprockets, varying spacings between the freewheel sprockets, derailleur return spring force and the rate of variation of that force as the derailleur mechanism shifts the chain either downwardly toward larger freewheel sprockets or upwardly toward smaller freewheel sprockets, and the like. Applicant preferably provides a special handgrip cam with a cam face specially configured to account and/or compensate for all of these special characteristics of any particular derailleur system, to the end that each shift from one freewheel sprocket to another is an early, positive, and accurately aligned index shift. Thus, applicant's rear shift actuator cam cooperates with the rear derailleur system in compensating for the sum of all of the lost motions in the derailleur system and its cable system, in compensating for variations in chain gap length, and in providing an optimum amount of overshift for down-shifting to each of the gears. The operating characteristics of front derailleur mechanisms are similarly accounted and compensated for.

Built-in overshift is programmed on applicant's handgrip shift actuator cams so as to provide optimum overshift for each down-shift event. Such overshift does not require separate manual input for the timing of the overshift; the natural rotational movement of the handlebar shift actuator automatically times the overshift.

Another important part of the invention is the definition of optimum and preferred minimum and maximum shifting limits for rear derailleur mechanisms, and the programming of the cam operating faces of the handgrip shift actuators of the invention to accurately achieve such shifting limits for each available derailleur system.

The front handgrip shift actuator cam has respective primary detents for chain alignment with each front derailleur chain wheel. A form of the front actuator cam also embodies secondary, fine-tune detents to fine-tune the chain alignment for accommodation of crossover riding. This allows a relatively narrow chain cage to be employed, for accurate shifting and for avoidance of chain derailling.

In a presently preferred form of the invention, the handgrip shift actuator for either the front derailleur system or the rear derailleur system, or both, embodies a secondary slip cam operatively associated in tandem with the primary helical cam to provide an overshift boost in the down-shifting direction that is automatically unloaded in the up-shifting direction. This downshifting overshift boost by the secondary slip cam is applied sequentially prior to the primary shifting action of the primary helical cam, enabling the primary helical cam to have a lowered cam lobe profile for easier shifting action, or alternatively a shorter length for minimizing the overall amount of shift actuator rotation through the gears.

One secondary slip cam form of the invention is particularly applicable to high quality bicycle derailleur systems having a minimum amount of lost motion and minimum chain gaps, the secondary slip cam having a cam operating face with a transient boost slope which applies an overshift boost to the primary helical cam during either a single down-shifting event or a plural series of down-shifting events, the overshift boost being automatically unloaded under the influence of the derailleur return spring at the end of the down-shifting event or events.

Another slip cam form of the invention is particularly useful for inexpensive mass market bicycles which tend to have undesirably long chain gaps and undesirably large amounts of lost motion in their derailleur systems. In this form of the invention, the transient overshift boost is programmed into the secondary slip cam profile along with a permanent overshift boost valley/detent arrangement which maintains the primary helical cam in an overshift-boosted position during a single down-shifting event or any plural sequence of down-shifting events.

BRIEF DESCRIPTION OF THE DRAWINGS

These and other objects of the invention will become more apparent in reference to the following description and the accompanying drawings, wherein:

FIG. 1 is an elevational view of a bicycle embodying the present invention;

FIG. 2 is a plan view partially broken away along the line 2—2 in FIG. 1;

FIG. 3 is a cross-sectional view taken on the line 3—3 in FIG. 2;

FIG. 4 is a cross-sectional view taken on the line 4—4 in FIG. 2;

FIG. 5 is a cross-sectional view taken on the line 5—5 in FIG. 3;

FIG. 6 is a cross-sectional view taken on the line 6—6 in FIG. 3;

FIG. 7 is a plan sectional view taken on the line 7—7 in FIG. 5;

FIG. 8 is a developed view indicated at line 8—8 in FIG. 4 illustrating one cam profile of the present invention;

FIG. 9 is a cross-sectional view taken on the line 9—9 in FIG. 5;

FIG. 10 is an exploded, perspective view of a handgrip shift actuator according to the invention;

FIG. 11 is an exploded, perspective view illustrating installation of a handgrip shift actuator according to the invention;

FIG. 16 a cross-sectional view similar to FIG. 4 illustrating an alternative embodiment with the cam and cam housing combined;

FIG. 20 is a fragmentary side elevational view of another bicycle embodying front and rear derailleurs;

FIG. 21 is an enlarged fragmentary elevational view of the rear derailleur system of FIG. 20;

FIG. 22 is a further enlarged, fragmentary view taken on the line 22—22 in FIG. 20;

FIG. 23 is a fragmentary view taken on the line 23—23 in FIG. 22;

FIG. 24 is a fragmentary view, partly in section and partly in elevation, taken on the line 24—24 in FIG. 21;

FIG. 25 is an elevational view with portions broken away taken on the line 25—25 in FIG. 21;

FIG. 26 is a cross-sectional view taken on the line 26—26 in FIG. 25;

FIG. 27 is a fragmentary elevational view, with portions broken away, taken on the line 27—27 in FIG. 21;

FIG. 28 is an enlarged fragmentary elevational view illustrating an adjustment feature of the rear derailleur mechanism of FIG. 21;

FIG. 29 is a fragmentary sectional view taken on the line 29—29 in FIG. 21;

FIG. 30 is a perspective view of a portion of the derailleur mechanism shown in FIG. 21 indicating various points of lost motion;

FIG. 39 is a fragmentary elevational view of a front derailleur mechanism;

FIG. 40 is a diagrammatic view illustrating parallel riding;

FIG. 41 is a diagrammatic view illustrating crossover riding;

FIG. 42 is a fragmentary plan view illustrating parallel riding;

FIG. 43 is a view similar to FIG. 42 illustrating cross-over riding;

FIG. 44 is a view similar to FIGS. 42 and 43 illustrating correction of the cross-over of FIG. 43 by means of a fine-tune cam detent;

FIG. 45 is a fragmentary elevational view of the front end of the mountain bike;

FIG. 46 is a cross-sectional view taken on line 46—46 in FIG. 5;

FIG. 47 is a fragmentary longitudinal sectional view taken on the line 47—47 in FIG. 46;

FIG. 48 is a cross-sectional view taken on the line 48—48 in FIG. 47;

FIG. 49 is a view similar to FIG. 47, but with the cam rotated to a different position;

FIG. 50 is a view taken on the line 50—50 in FIG. 49;

FIG. 51 is a view similar to FIG. 47 but reversed, being a fragmentary longitudinal section illustrating a rear derailleur system handgrip shift actuator of the inboard type embodying the new secondary slip cam in tandem with the primary helical cam;

FIG. 52 is a cross-sectional view taken on the line 52—52 in FIG. 51;

FIGS. 53-58 are fragmentary side elevational views of the apparatus of FIGS. 51 and 52, with portions broken away, sequentially illustrating a single down-shifting event;

FIGS. 59-64 diagrammatic developed views in which the primary helical cam and secondary slip cam are laid out flat, sequentially illustrating this single down-shifting event;

FIGS. 65 and 66 are diagrammatic views similar to FIGS. 59-64, but illustrating a single up-shifting event;

DETAILED DESCRIPTION

Figure 12:
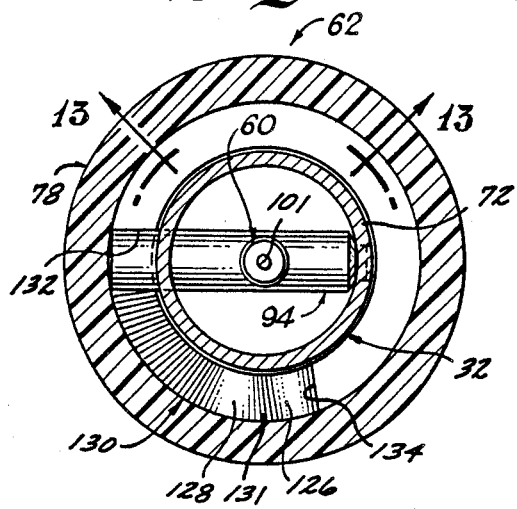
FIG. 12 is a cross-sectional view taken on the line 12—12 in FIG. 2 showing a front handgrip shift actuator of the invention.

FIGS. 1 and 2 illustrate a 12-speed bicycle, generally designated 10, in which a 6-sprocket rear derailleur mechanism is actuated by a rear handgrip shift actuator according to the invention, and a 2-chain wheel front derailleur mechanism is actuated by a front handgrip shift actuator according to the invention. It is to be understood, however, that the principles of the present invention are equally applicable to any multi-speed bicycle embodying derailleur-type shifting, including three, five, six, seven, ten, twelve, fourteen, and eighteen-speed bicycles, and the like. Bicycle 10 has a primary frame which is generally triangle-shaped, including a head tube 14, a generally horizontal top tube 16 connected at its front end to head tube 14, a main down tube 18 extending downwardly and rearwardly from head tube 14, and a seat tube 20 connected to the rear end of top tube 16 and extending downwardly and forwardly therefrom. Main down tube 18 and seat tube 20 are joined at their lower ends to bottom bracket 22, shown in phantom, within which the pedal crank is horizontally journalled.

A front fork 24 defines the axis 26 of front wheel 27. A steering tube (not shown) at the upper end of front fork 24 extends upwardly into head tube 14, and is wedge-clamped to a handlebar stem generally designated 28 which extends down into the steering tube within head tube 14. Handlebar stem 28 includes a handlebar clamp 30 at its upper end for gripping handlebar 32. The handlebar 32 which is illustrated in FIGS. 1 and 2 is of the traditional drop bar type, although it is to be understood that the invention is equally applicable to any type of bicycle handlebar.

A down fork 34 consisting of left and right seat stays extends downwardly and rearwardly from the upper portion of seat tube 20, and a bottom fork 36 consisting of left and right chain stays extends rearwardly from bottom bracket 22. The left sides of down fork 34 and bottom fork 36 are connected at their rear ends, and similarly the right sides of down fork 34 and bottom fork 36 are connected at their rear ends, and these rear end connections support rear wheel dropouts which define the axis 38 of rear wheel 40.

Figure 14:
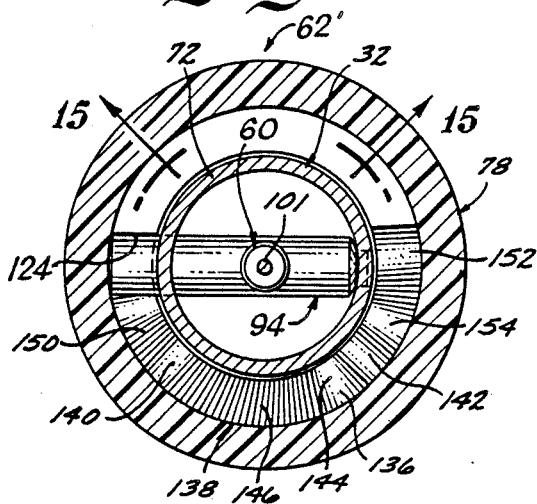
FIG. 14 is a cross-sectional view similar to FIG. 12 showing an alternative cam having fine-tune detents.
Figure 15:
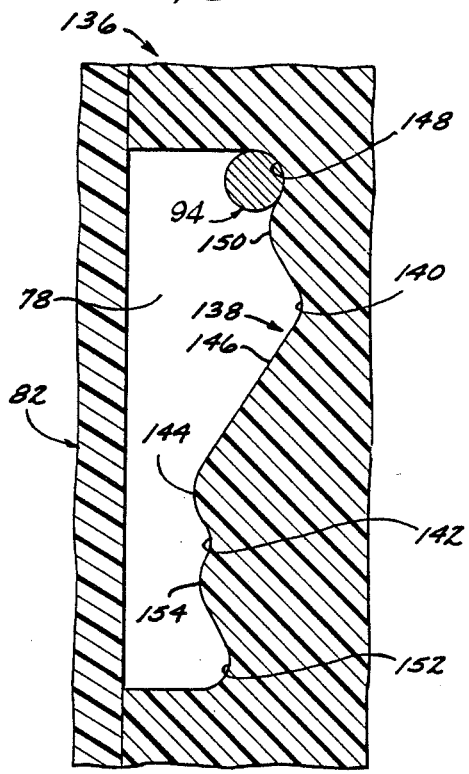
FIG. 15 is a developed view indicated at line 15—15 in FIG. 14 illustrating the cam profile.
Figure 17:
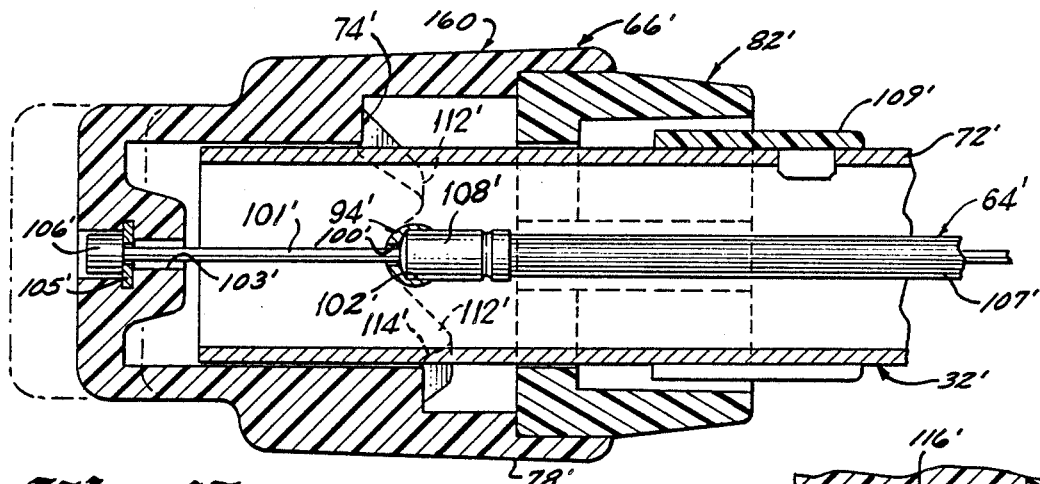
FIG. 17 is a cross-sectional view taken on the line 17—17 of FIG. 16.
Figure 18:
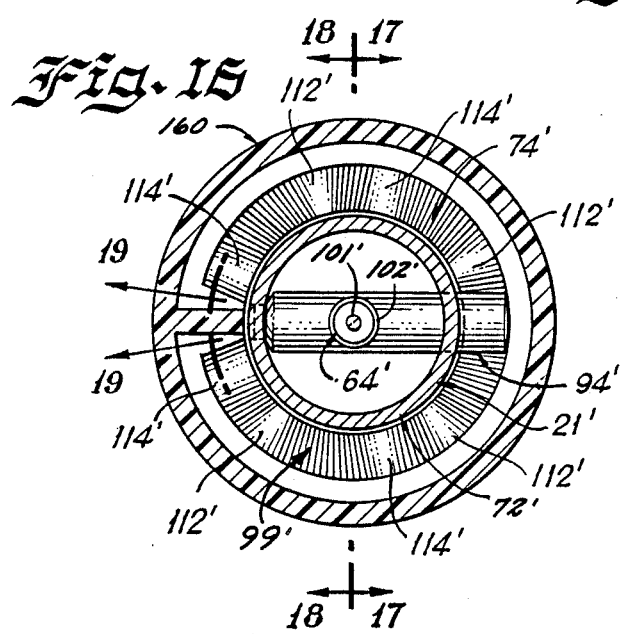
FIG. 18 is a cross-sectional view taken on the line 18—18 in FIG. 16.

Seat stem 42 is engaged in the upper end of seat tube 20 and is releaseably secured by seat clamp 44. The pedal crank, generally designated 46, is rotatably journalled in bottom bracket 22, and includes right and left crank arms 48. A chain wheel cluster generally designated 50 is rigidly supported on pedal crank 46, and constitutes the sprocket cluster of the front derailleur assembly. Most commonly, the chain wheel cluster will embody two chain wheels, although it is also common to have chain wheel clusters with three chain wheels. The front handgrip shift actuator shown in FIGS. 2, 12, and 13, and the front handgrip shift actuator shown in FIGS. 14 and 15, are both adapted for utilization with a chain wheel cluster 50 embodying two chain wheels. An endless drive chain 52 transmits power from the chain wheel cluster 50 to a multiple freewheel 54 that is operatively connected to the rear wheel hub mechanism in a conventional manner.

A front derailleur mechanism generally designated 56 cooperates with chain wheel cluster 50 to shift chain 52 laterally between the two chain wheels of cluster 50, down-shifting from the smaller chain wheel to the larger chain wheel, or up-shifting from the larger chain wheel to the smaller chain wheel. A rear derailleur mechanism 58 is pivotally connected to the frame proximate the confluence of the right side portions of down fork 34 and bottom fork 36 for shifting chain 52 laterally from sprocket to sprocket of the multiple freewheel 54, either down-shifting from a smaller sprocket to a larger sprocket or up-shifting from a larger sprocket to a smaller sprocket. A front control cable 60 operatively connects a front handgrip shift actuator 62 to the front derailleur mechanism 56 such that the front handgrip shift actuator 62 cooperates with and controls the shifting of front derailleur mechanism 56. Similarly, a rear control cable 64 operatively connects a rear handgrip shift actuator 66 to the rear derailleur mechanism 56 such that the rear handgrip shift actuator 66 cooperates with and controls the shifting of the rear derailleur mechanism 58.

The handgrip shift actuators of the invention illustrated in FIGS. 1-19 are all adapted for mounting over the ends of the bicycle handlebar 32, with each of the respective cables 60 and 64 being operatively connected to the respective shift actuators 62 and 66 through respective end portions of handlebar 32. Accordingly, each of the cables 60 and 64 is threaded through a respective aperture 68 in the wall of handlebar 32 from the outside to the inside of the wall of handlebar 32 for coupling with the respective shift actuators 62 and 66.

The traditional drop bar-type handlebar 32 shown in FIGS. 1 and 2 consists of a generally straight transverse portion 70 with down-turned U-shape side portions having generally straight rearwardly directed end portions 72 over which handgrip shift actuators 62 and 66 of the invention are mounted. In the normal operation of a bicycle equipped with both front and rear derailleurs, the rear derailleur mechanism is shifted more frequently than the front derailleur mechanism. Accordingly, as a convenience to most riders, rear shift actuator 66 is preferably mounted on the right-hand end portion 72 of the handle bar, and front shift actuator 62 is mounted on the left-hand end portion 72 of the handlebar.

During cycling while not shifting, a cyclist will normally grip the lower, end portions 72 of handlebar 32 forward of the handgrip shift actuators 62 and 66. Since shift actuators 62 and 66 occupy a portion of the normal grip space on the handle bar end portions 72, it is preferable to provide a handlebar 32 which has end portions 72 somewhat longer than those found on a conventional drop bar-type handlebar.

Rear handgrip shift actuator 66 will next be described in detail in connection with FIGS. 3-11. A rotary cam member 74 having a generally helical operating face is the heart of the rear handgrip shift actuator 66 and cooperates with the rear derailleur mechanism 58 for positive, smooth, and easy shifting in both the down-shift direction and the up-shift direction. There are currently approximately ten different derailleur mechanisms available on the market, and each one has different shifting characteristics, both in general for down-shifting and up-shifting through all of the rear gears, and specifically for down-shifting and up-shifting in each individual gear. For positive index shifting of each type of rear derailleur currently available, it is preferred to have a cam member 74 the operating face of which is specifically contoured to cooperate with that type derailleur for positive index down-shifting and up-shifting to each gear. Accordingly, for the approximately ten different rear derailleur mechanisms available, it is preferred to have approximately ten respective differently contoured cam members 74 of the invention. Nevertheless, because of the way rear handgrip shift actuator 66 is constructed, all of the other parts of shift actuator 66 may be the same for the various types of rear derailleur mechanisms.

Figure 13:
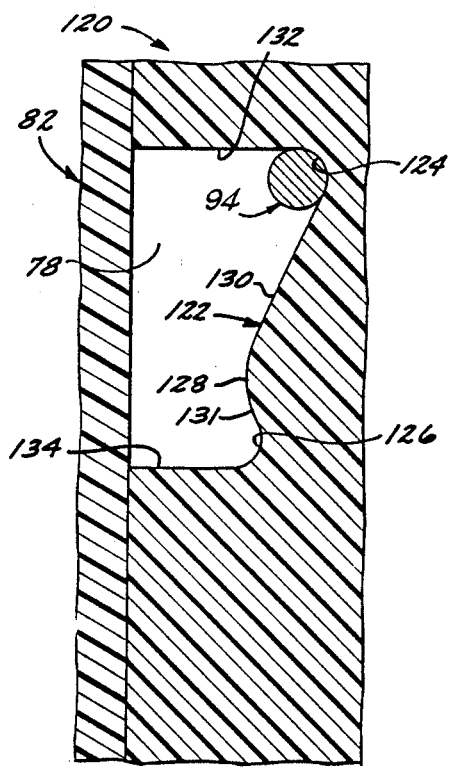
FIG. 13 is a developed view indicated at line 13—13 in FIG. 12 illustrating a simple 2-position cam profile for the front actuator.

Similarly, the approximately ten different front derailleur mechanisms currently available also have different operating characteristics, and for positive and easy front derailleur index shifting it is preferred to have a separate cam contoured for cooperation with each different front derailleur mechanism, one type cam for the front handgrip shift actuator 62 being shown in FIGS. 12 and 13, and another type cam for the front shift actuator 62 being shown in FIGS. 14 and 15.

As described in detail hereinafter, the close cooperation between front and rear shift actuators 62 and 66 and respective front and rear derailleur mechanisms 56 and 58 is such that the present invention resides in the combination of a handgrip shift actuator 62 or 66 and a respective derailleur mechanism 56 or 58. This is borne out by the fact that for uniform, easy, positive index shifting, the cam member of the respective front or rear shift actuator 62 or 66 is preferably constructed to accommodate the peculiar characteristics of any particular front or rear derailleur mechanism, such as chain gap variations through the gears, actuation ratios through the gears, return spring strength and variations through the gears, takeup for lost motion in the cable system, derailleur pivots, guide pulley and the like, and fine-tune front shift actuator locations are provided to accommodate chain cross-over between front and rear derailleur sprockets without chain rasp in the front derailleur cage.

FIGS. 3-11 illustrate the details of construction of the rear handgrip shift actuator 66. The primary operative member in shift actuator 66 is a generally cup-shaped cam member 74 having a generally cylindrical cam portion 75 that is arranged coaxially of the respective handlebar end portions 72, and a generally flat outer end portion 76 which is transverse to the axis of handlebar end portion 72. The generally cylindrical portion 75 of cam member 74 terminates inwardly at an inner end 77 which is also transverse to the axis of handlebar end portion 72.

Cam member 74 nests within a generally complementary cam cover member 78 which has a generally cylindrical barrel portion 79 that overlies the cam portion 75, and a generally flat, transverse end portion 80 that overlies the cam portion 76. The generally cylindrical portions 75 and 79 of the respective cam and cover members 74 and 78 are preferably of stepped configuration as illustrated, the inner part of the cylindrical cam portion 75 being radially thickened to provide a relatively wide cam operating surface and increased hand torquing radius, and the inner part of the cover barrel portion 79 being thickened for further hand torquing radius. After cam member 74 has been assembled within cover member 78, a cover bushing 82 is mounted on the inner end of cover member 78, bushing 82 having a skirt portion 84 which is engaged within cover member 78. Bushing 82 is permanently bonded to cover member 78, preferably by ultrasonic welding, or alternatively by adhesive means.

Cam member 74 is preferably molded from a high-strength, chemically lubricated plastic material such as Delrin 500CL that provides a durable and lubricious cam operating face, as well as freedom of rotation of cam member 74 about the handlebar end portion 72. Cover member 78 and its bushing 82 are preferably molded from a plastic material such as ABS which has high resistance to ultraviolet light penetration and will therefore protect cam member 74 from ultraviolet deterioration.

Cam member 74, cover member 78, and bushing 82 are registered such that all three members rotate together. Two registration systems are provided, one registering cam member 74 to cover member 78, and the other registering bushing 82 to cover member 78. FIG. 10 best illustrates these two registration systems.

The registration of bushing 82 to cover member 78 includes a generally axially directed external key 86 on bushing skirt 84, key 86 being received in a complementary generally axially directed keyway recess 88 in the cover barrel portion 79.

The registration system between cover member 78 and cam member 74 consists of one or more generally radially directed slots formed in the outside of cam end portion 76, and a similar number of registering, generally radially directed ribs projecting from the inside of the cam cover end portion 80. In the embodiment illustrated in FIGS. 3-11, there are three of such slots 90 and ribs 92, and these are irregularly spaced about the center axes of cam member 74 and cover member 78 so that the cam and cover members 74 and 78, respectively, can only be assembled in one position of relative rotation. This is so that a tactile sensor 93 on the outside of cover bushing 82 will also have a single, fixed rotational position relative to cam member 74, so as to provide an indication to the cyclist of the particular gear which is engaged. The tactile sensor 93 is best seen in FIGS. 5 and 11, being shown in the six o'clock position in FIG. 5. For convenience in molding, the tactile sensor 93 is axially aligned with bushing key 86. As handgrip shift actuator 66 is rotated to shift the derailleur mechanism from gear to gear, sensor 93 rotates an equivalent amount, thus providing the cyclist with a tactile indication of the selected gear ratio.

The operating surface of cam member 74 engages and rides over a cam pin 94 which is fixedly attached to the handlebar end portion 72. As seen in FIGS. 3, 4, 7 and 11, cam pin 94 is generally cylindrical in shape and has a reduced diameter portion 95 at one end. Cam pin 94 is mounted in the handlebar end portion 72 with its reduced diameter portion 95 located in an aperture 97 through the wall of handlebar portion 72 so as not to extend beyond the outer surface of handlebar portion 72. Cam pin 94 extends diametrically across the inside of handlebar portion 72, projecting outwardly through a larger aperture 97 in the wall of handlebar portion 72, with a cam-operating end portion 98 of cam pin 94 extending radially outwardly from the outer surface of handlebar portion 72 to provide a fixed, smooth, rounded bearing member against which the cam operating face or surface 99 of cam member 74 rides.

Cam pin 94 serves two functions. First, its external portion 98 provides the aforesaid bearing surface which is engaged by cam operating face 99. Second, cam pin 94 provides a locator for the end of the cable housing or casing. A bore 100 is provided diametrically through cam pin 94 at a location radially centered within the handlebar portion 72 and axially aligned with handlebar portion 72. The rear derailleur shifting cable 101 passes through this bore 100. A counterbore 102 of bore 100 presents a shoulder that faces inwardly of the handlebar end. Registering center apertures 103 and 104 extend through the cam and cover member ends 76 and 80, respectively, and an annular bearing plate 105 is molded into the cam member end 76 so as to present a metal bearing surface in a direction outwardly of the handlebar end. After cable 101 extends through cam pin bore 100, it passes through the cam member end bore 103 and bearing plate 105, and terminates at either a crimped collar or cast-on metal bead 106, which may be made of lead. The housing or casing 107 for cable 101 has a ferrule 108 crimped over its end, and ferrule 108 seats within the cam pin counterbore 102, thus providing a fixed location for cable housing 107 relative to cable 101.

The return spring of rear derailleur mechanism 58 constantly tensions the cable 101, which in turn constantly biases the cam operating face 99 against the cam pin operating end 98. When cable 101 is pulled outwardly by cam operating surface 99 relative to the handlebar end, the other end of cable 101 will actuate rear derailleur mechanism 58 in a down-shift movement to a larger freewheel sprocket closer to the wheel 40; while release of cable 101 by cam operating face 99 will allow the return spring of rear derailleur mechanism 58 to pull cable 101 toward the derailleur mechanism 58 and cause derailleur mechanism 58 to up-shift the chain away from wheel 40 to a smaller sprocket. The generally helical, stepped operating face 99 of cam member 74 is preferably arranged to move axially outwardly of the handlebar end when twisted clockwise as viewed by a cyclist, thereby pulling cable 101 outwardly and shifting rear derailleur mechanism 58 to a larger sprocket and larger gear ratio. Conversely, when cam member 74 is twisted counterclockwise by the cyclist, derailleur return spring tension on cable 101 will cause cam member 74 to move inwardly of the handlebar end, allowing derailleur mechanism 58 to shift upwardly to a smaller sprocket.

Preferably, a portion of cover bushing 82 overlies a collar 109 fixedly mounted on the handlebar end portion 72, such that bushing 82 and collar 109 cooperate as a baffle to minimize entry of dust into the shift actuator mechanism, which might otherwise cause premature wear in the mechanism. Collar 109 has a locator button 110 thereon which seats in a handle bar hole 111 to fixedly position collar 109 on handlebar end portion 72.

FIG. 8 illustrates the profile of operating face or surface 99 of cam member 74, laid out flat for convenience in understanding. Cam operating face 99 consists of a series of peaks or crests 112 and intermediate detent valleys 114. The operating face 99 has six detents and five intermediate peaks, to serve a 6-sprocket rear derailleur freewheel as seen in FIG. 1. As seen in FIG. 8, the rear shift actuator 66 is twisted all of the way to its highest gear, smallest sprocket position, with cam pin 94 located in the uppermost, first detent 114. As shift actuator 66 is rotated from the position of FIG. 8, a first cam ramp 115 rides upwardly against cam pin 94, and the first peak 112 rides over pin 94 so that the pin then becomes located in the second detent 114. At the first detent position, which is shown, the rear derailleur mechanism 58 substantially aligns chain 52 with sprocket #6, which is the smallest sprocket of freewheel 54. At the second detent 114, rear derailleur mechanism 58 substantially aligns chain 52 with sprocket #5, which is the second smallest sprocket of freewheel 54. As rear shift actuator 66 is progressively rotated to move the cam operating surface 99 upwardly as viewed in FIG. 8, successive detents 114 engage over pin 94 to substantially align chain 52 with successively larger freewheel sprockets for successively lower gear ratios until pin 94 is lodged in the lowermost detent 114 as viewed in FIG. 8, in which location the rear derailleur mechanism 58 has moved chain 52 substantially into alignment with sprocket #1 of freewheel 54, which is the lowest gear ratio.

As rear shift actuator 66 is thus shifted from the smallest, highest gear freewheel sprocket position as shown in FIG. 8 to successively larger, lower gear freewheel sprockets, it pulls cable 101 against the return spring of rear derailleur mechanism 58 outwardly relative to the handlebar end portion 72, to the left as viewed in FIGS. 5, 7 and 8, and to the right as viewed in FIG. 6. As rear shift actuator 66 is rotated the other way to shift upwardly from the largest freewheel sprocket in which the lowermost detent 114 of FIG. 8 is engaged over cam pin 94 towards successively smaller and higher gear freewheel sprockets, the return spring of rear derailleur mechanism 58 draws cam member 74, together with its cover member 78 and bushing 82, incrementally to the right as viewed in FIGS. 5, 7 and 8, and to the left as viewed in FIG. 6. The position illustrated in FIGS. 5-8 is the smallest freewheel sprocket, highest gear ratio position, while the phantom line position illustrated in FIGS. 5 and 6 represents the largest freewheel sprocket, lowest gear ratio position. In all axial positions of cam member 74, bushing 82 will overlie handlebar collar 109 to serve the function of inhibiting entry of dust or dirt into the shift actuator mechanism.

Each of the cam face detent valleys 114 serves two functions. First, it serves to axially locate cam member 74 relative to handlebar end portion 72, and hence correspondingly axially locate cable 101, and thereby position derailleur mechanism 58 for alignment of drive chain 52 with a respective sprocket of freewheel 54. Each of the cam face detent valleys 114 also serves as a detent for positively rotationally locating, and hence indexing, cam member 74 relative to the handlebar end portion 72, thereby effecting positive index shifting. Nevertheless, both the cam ramp slopes 115 and the back slopes 116 of cam operating face 99 are gentle enough slopes so that, together with the rounding of peaks 112, both down-shifting and up-shifting are effected easily and smoothly.

As will be described in detail hereinafter in connection with detailed illustrations of a derailleur mechanism and associated cable actuation system, according to the present invention for the down-shift direction of rotation of cam member 74 toward larger freewheel sprockets, the heights of the cam face peaks 112 above the preceding detents 114 are calculated to first take out all lost motion in the derailleur mechanism and in the cable system, next actuate the derailleur mechanism a shift increment of movement in which the chain is brought into alignment with the next larger sprocket, and then further actuate the derailleur mechanism in an overshift increment of movement. Then, as cam member 74 completes such down-shift to the next higher detent 114, there is first a backlash in which the lost motion originally taken up is released, and then the overshift increment is released. By this means, both the derailleur mechanism and the cable move in the up-shift direction at the completion of each down-shifting event. This restores all of the lost motion locations in both the derailleur mechanism and the cable system at the end of a down-shifting event to exactly their same positions as if an up-shift to a smaller sprocket had been effected, and it also places the cable friction direction the same as for an up-shifting event, whereby the same precise derailleur positioning, and hence cable locating, will occur at any freewheel sprocket destination, whether that destination was arrived at after an up-shift or a down-shift.

As noted above, the specific profile of cam operating face or surface 99 is determined by the operating characteristics of the specific derailleur mechanism with which it is used. The profile of cam operating face or surface 99 illustrated in FIG. 8 is adapted for use in cooperation with a Shimano Model No. RD-7401 derailleur.

As best illustrated in FIG. 8, a stop projection 117 is provided adjacent the lowest gear detent 114. This is for the purpose of blocking further rotation of shift actuator 66 and thereby avoiding the possibility of cam face 99 riding off pin 94 and jumping to the highest gear detent 114. As also best seen in FIG. 8, a notch or cutout 118 is provided in the inner edge of bushing 82. This is to provide clearance for cam pin 94 as cam member 74 is shifted from the next lowest gear detent 114 to the lowest gear detent 114.

The detent function of cam surface detent valleys 114 provides for self-locking of cam member 74 at each gear position without reducing the ease of operation of handgrip shift actuator 66. For example, in some known index shifting systems which include a detent mechanism comprised of a ball and slip plate, the locking feature is added to the system by increasing the tension between the ball and slip plate, which makes the shifting mechanism relatively difficult to operate. In the present invention, the self-locking feature does not require any increased tension on any of the component parts of the system, thereby providing self-locking without reducing the ease of operation of shift actuator 66.

FIGS. 12 and 13 illustrate one form of front handgrip shift actuator 62 which employs a 2-position cam member, generally designated 120. The front shift actuator 62 with cam member 120 cooperates with and controls the front derailleur mechanism 56 for shifting between the two chain wheels of a 2-chain wheel front sprocket cluster 50. The front handgrip shift actuator 62 is similar to the rear handgrip shift actuator 66 heretofore described, except for the profile of operating face or surface 122 of cam 120. FIG. 13 is a view in which the cylindrical cam member 120 has been opened out to a flat plan for ease of understanding, but in FIG. 13 cam operating surface 122 is shown facing generally opposite the direction in which cam operating face 99 is shown in FIG. 8.

Cam operating face or surface 122 has a first detent valley 124 for the smaller, higher gear ratio chain wheel of cluster 50, and a second detent valley 126 for the larger, lower gear chain wheel of cluster 50. Cam operating face 122 has a single rounded peak 128 between the two detents 124 and 126, with a cam ramp 130 extending between small chain wheel detent 124 and peak 128, and backslope 131 being disposed between peak 128 and large chain wheel detent 126. Cam stop surfaces 132 and 134 are provided adjacent the respective detents 124 and 126 to prevent inadvertent over-actuation of front shift actuator 62.

Cam 120 of FIG. 13 may, if desired, be modified to accommodate a derailleur system having a 3-chain wheel cluster, such as the Shimano Hyperglide derailleur system. This can be done by embodying three successive detents with two intervening peaks, instead of the two detents 124 and 126 and single intervening peak 128.

The profile of cam operating face 122 will vary according to the particular derailleur mechanism with which it is utilized. As with rear shift actuator 66, front shift actuator 62 cooperates in its mode of operation with the particular front derailleur mechanism 58 for which it is constructed, through the front control cable 60, and it is this overall combination which constitutes the front derailleur aspect of the present invention. Front handgrip shift actuator 62 provides positive index shifting of front derailleur mechanism 56 in substantially the same manner as rear handgrip shift actuator 66 provides positive index shifting of rear derailleur mechanism 58.

FIGS. 14 and 15 illustrate an alternative front handgrip shift actuator 62' having a cam member 136 with an operating face 138 that has two primary detents 140 and 142 separated by a primary cam peak 144 and cam ramp 146. Primary detent 140 is for the smaller, higher gear ratio chain wheel of cluster 50, and primary detent 142 is for the larger chain wheel of cluster 50 for "parallel riding"; i.e., the primary detents 140 and 142 are the parallel riding positions of cam 136. Parallel riding positions are when the smaller chain wheel is driving the larger sprockets of the rear multiple freewheel 54, or the larger chain wheel of cluster 50 is driving the smaller sprockets of multiple freewheel 54.

There is a propensity for chain 52 to rasp against the side plates of the front derailleur cage when the rider is "riding cross-over," i.e., when the smaller chain wheel of cluster 50 is driving the smaller sprockets of multiple freewheel 54, or when the larger chain wheel of cluster 50 is driving the larger sprockets of multiple freewheel 54. The conventional means for avoiding such rasping is by providing an undesirably wide front derailleur cage, which tends to result in inaccurate and undesirably difficult shifting between the two chain wheels of cluster 50 and leads to frequent derailling. Cam member 136 completely solves this problem and enables a relatively narrow and therefore accurate front derailleur cage to be employed by providing a secondary detent adjacent each of the primary detents 140 and 142. Thus, a secondary detent 148 is provided adjacent the smaller chain wheel primary detent 140, with a peak 150 between detents 140 and 148; and similarly, a secondary detent 152 is provided adjacent the larger chain wheel detent 142, with an intermediate peak 154 between detents 142 and 152.

When riding cross-over with chain 52 engaged over the smaller chain wheel of cluster 50, the chain angles from the smaller chain wheel rearwardly and outwardly toward smaller sprockets of the rear freewheel 54. When the smaller chain wheel secondary detent 148 is engaged over cam pin 94, cam 136 is raised to pull the front derailleur cage laterally toward the larger chain wheel, thereby relieving engagement of the front derailleur cage against chain 52 and avoiding rasping. Conversely, when chain 52 is engaged over the larger chain wheel of cluster 50, in the cross-over position, chain 52 angles rearwardly and inwardly toward larger sprockets of freewheel 54, again tending to rasp against the front derailleur cage. In this situation, by shifting cam member 136 so that the larger chain wheel secondary detent 152 is engaged over cam pin 94, the front derailleur cage is enabled to be pulled by its return spring back toward the smaller chain wheel of cluster 50, thereby again relieving rasping of chain 52 against the chain cage.

The parallel and cross-over riding positions will be discussed further hereinafter in connection with FIGS. 40–43, which illustrate these riding positions.

Secondary detents 148 and 152 constitute "fine-tune" cam positions which enable fine-tuning of the front derailleur cage regardless of the relative sprocket positions of chain 52 on the front chain wheel cluster and the rear freewheel, eliminating chain rasping and enabling a relatively narrow front derailleur cage to be employed for accurate positive index shifting without likelihood of derailling.

It is to be noted that the fine-tune detents 148 and 152 in cam operating face 138 are outside of the cam face range for the primary front derailleur shifting, which range extends from the smaller chain wheel primary detent 140 up cam ramp 146 and past the peak 144 to the primary large chain wheel detent 142. Thus, as viewed in FIG. 15, the fine-tune detent 148 for the smaller chain wheel is located above the primary detent for the smaller chain wheel, while the fine-tune detent 152 for the larger chain wheel is located below the primary detent 142 for that chain wheel. With the fine-tune secondary detents 148 and 152 thus located, cam member 136 will not "trip over" either of the fine-tune detents when a primary shift is effected either upwardly or downwardly between the two primary detents 140 and 142, thus avoiding rider confusion which tended to occur with prior art front derailleur fine-tune attempts where the mechanisms did tend to trip over the fine-tune and provide false indications to the rider as to the actual front derailleur shifting location.

FIGS. 16–19 illustrate an alternative rear handgrip shift actuator, generally designated 160, wherein the cam portion 74' and cover portion 78' of the shift actuator are combined as a unitary molded structure. A cover bushing 82' is secured within the end of cover portion 78', preferably by ultrasonic welding, or alternatively by adhesive means. Handlebar collar 109' remains in the system as an aid in baffling against entry of dust or dirt into the region of cam portion 74'. Although the embodiment having the combined cam and cover portions 74' and 78' is simpler and more economical to manufacture than the form shown in detail in FIGS. 3-11, the embodiment of FIGS. 3-11 is presently preferred, since cover members 78 and bushings 82 are universally adapted for use with any of the cams for the various derailleur mechanisms. Thus, the universally usable cover members and bushings require less custom molding. Moreover, the embodiment of FIGS. 3-11 is also preferable since the functional characteristics desired for the plastic used in the cover member 78 are different from the functional characteristics desired for the plastic of which cam member 74 is made. Specifically, in the embodiment of FIGS. 3-11, a high-strength chemically lubricated plastic such as Delrin 500CL is preferred for cam member 74. Such plastic, however, is not best suited for use in either cover member 78 or bushing 82 for several reasons. It does not provide an aesthetically pleasing appearance, it does not have good ultraviolet resistance, and it tends to be slippery when grasped. Thus, a different type of plastic is used for cover member 78 in the embodiment of FIGS. 3-11, such as ABS, which is easily molded and provides both an aesthetically pleasing appearance and good ultraviolet resistance.

Figure 19:
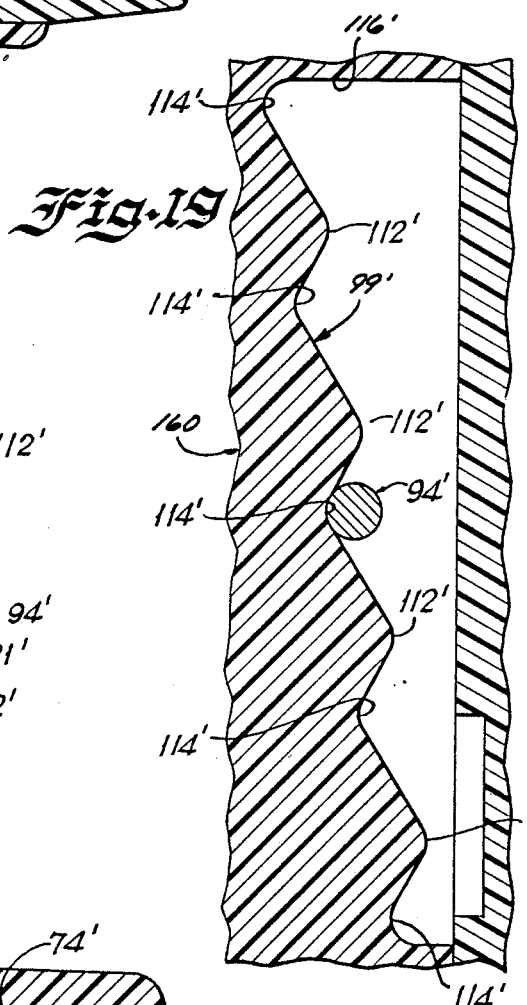
FIG. 19 is a developed view indicated at line 19—19 in FIG. 16 illustrating another cam profile.
Figure 19:
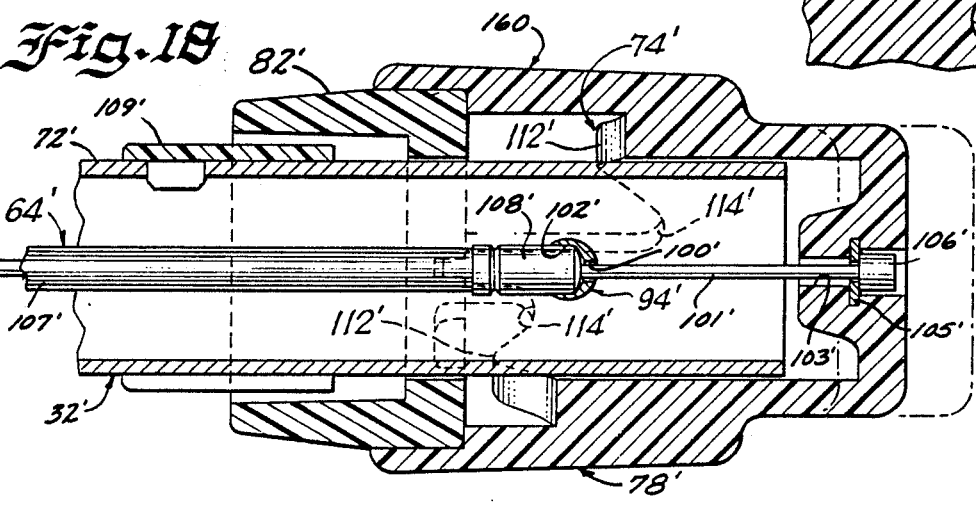

Nevertheless, the embodiment of FIGS. 16-19 wherein the cam and cover members are combined into a unitary structure 160 is contemplated within the scope of the present invention. When referring now to FIGS. 16-19, like reference numerals are used with primes for parts which correspond to those in the embodiment of FIGS. 3-11. Cam portion 74' is, by way of example and not of limitation, a 5-position cam wherein the cam operating face 99' has five detent valleys 114' separated by four rounded peaks 112'. As best seen in FIGS. 16 and 19, cam operating face 99' rides over a pin 94'. The 5-position cam operating face 99' cooperates through control cable 101' with a derailleur mechanism (not shown) embodying a 5-sprocket multiple freewheel. The middle detent 114' is shown engaged over cam pin 94' corresponding to engagement of the drive chain with the middle freewheel sprocket for the middle speed of the 5-speed system.

The rear handgrip shift actuator 66' shown in FIGS. 16-19 is rotatably mounted on the handlebar end portions 72' such that rotation of the combined cam and cover unit 160 causes axial displacement of control cable 101' operatively coupled to the derailleur mechanism. Control cable 101' extends through a diametrical bore 100' in cam pin 94', and thence through a bore 103' in the end portion of the combined cam and cover 160, terminating externally of such end portion in a crimped collar or cast-on metal bead 106' which bears against bearing plate 105' cast into the end portion of the combined cam and cover 160. Housing or casing 107' for control cable 101' has a ferrule 108' crimped on its end which is located within a counterbore 102' of the cam pin bore 100'.

Referring again to FIG. 19, the axial steps or spacings between successive detents 114 corresponding to successive freewheel sprocket destinations are approximately the same for the cam face profile 99' of cam portion 74'. This is enabled by the fact that cam portion 74' is matched to an overall rear derailleur system wherein cable 101' has minimal stretch, and the cable housing length is minimized in extent and is of a type having minimal compressibility and warp under cable tension. Such a cable system is shown in FIGS. 20-26, and described in detail in connection with those FIGURES. Thus, as viewed in FIG. 19, from the position of the uppermost detent 114' being engaged over cam pin 94', at which location the derailleur mechanism return spring has its minimum loading, to the position at which the lowermost detent 114' is engaged over cam pin 94', where the derailleur mechanism return spring has its maximum loading, detents 114' do not have to be axially separated by progressively greater increments to accommodate cable stretch and/or cable housing compression and warp, whereby substantially equal axial increments between successive detents 114' are suitable for providing chain alignment with successive freewheel sprockets.

To the contrary, cam face detents 114 of cam 74 as viewed in FIG. 8 have increasing axial increments or separations from the position shown where the uppermost detent 114 is engaged over cam pin 94 successively down to where the lowermost valley 14 is engaged over cam pin 94, so as to accommodate a cable system which has considerable sponginess in it, caused by stretch in cable 101 and/or compression and warp in cable housing 107 as the force of the derailleur mechanism return spring increases for this succession of detents 114 being engaged over cam pin 94.

FIGS. 20-30 illustrate another derailleur-equipped bicycle, generally designated 10a, showing details of the derailleur apparatus, a presently preferred derailleur actuating cable system, and defining locations in the derailleur and cable systems of lost motion or "slop" which are accurately accounted for in the present invention.

As with the bicycle 10 shown in FIG. 1, bicycle 10a has a frame 12a including a head tube 14a, top tube 16a, main down tube 18a, seat tube 20a, bottom bracket 22a, front fork 24a, handlebar stem 28a, handlebar 32a with end portions 72a, and down fork 34a and bottom fork 36a. The rear ends of down fork 34a and bottom fork 36a are connected to a pair of spaced dropouts 170 within which the rear axle bolt 172 is fixedly mounted for supporting rear wheel 40a. The wheel hub rotates on ball bearings about axle bolt 172, and a lateral extension of the wheel hub supports the derailleur freewheel on its outside, with ratchet means therebetween which engages when chain power is applied to the freewheel, and disengages to allow free rolling of the rear wheel relative to the derailleur freewheel. A derailleur hanger 174 is integrally formed with dropout 170, extending downwardly therefrom.

A pedal crank, generally designated 46a, is journalled in bottom bracket 22a, and includes a pair of pedal arms 48a on opposite sides of frame 12a, and chain wheel cluster 50a on the right-hand side of frame 12a inboard of right-hand pedal crank 46a. The chain wheel cluster shown has two chain wheels, the operation of which in connection with the present invention will be discussed in detail hereinafter. Drive chain 52a is shown engaged over the larger of the two chain wheels, and extends rearwardly therefrom into engagement with derailleur multiple freewheel 54a for applying power to rear wheel 40a. The multiple freewheel 54a shown has a 6-sprocket cluster.

The front derailleur mechanism is generally designated 56a, and the rear derailleur mechanism is generally designated 58a. Front control cable 176 connects front derailleur mechanism 56a to a front handgrip shift actuator 62 shown in FIGS. 2, and 12 or 13, connecting in the same manner that cable 101 connects to the rear shift actuator 66 as shown in detail in FIGS. 3–11. The housing, support and adjustment features for front control cable 176 are similar to those of the rear control cable, but somewhat simplified, and will be described in detail in connection with the description of the rear derailleur cable system.

The rear derailleur cable system is generally designated 178, and includes rear control cable 180 which extends from rear derailleur mechanism 58a to rear handgrip shift actuator 66 that is mounted on handlebar end portion 72a. The connection of rear control cable 180 to rear shift actuator 66 is the same as shown in FIGS. 3–11 and described in detail in connection with those FIGURES.

The Rear Derailleur Mechanism

The apparatus of rear derailleur mechanism 58a is best illustrated in FIGS. 21 and 27–30. The novel cooperative mode of operation of rear handgrip shift actuator 66, rear cable system 178, and rear derailleur mechanism 58a is illustrated in FIGS. 31–36, and will be described in detail in connection therewith.

At the heart of rear derailleur mechanism 58a is a parallelogram generally designated 182 which has a rear support body pivotally but laterally fixedly connected to hanger 174, a pair of parallel links extending forwardly from the support body, and a shifter body attached to the forward ends of the links that is shiftable laterally inwardly toward the bicycle frame 12a under the influence of cable tension, and shiftable laterally outwardly away from frame 12a under the influence of a derailleur return spring contained in the parallelogram.

The rear support or mounting body is designated 184, and is pivotally mounted on a mounting bolt 186 which is threadedly connected to hanger 174 as best seen in FIG. 27. A helical pivot spring 188 around pivot bolt 186 is housed in support body 184 and biases support body 184 clockwise or forwardly about bolt 186. One end of spring 188 bears against body 184, while the other bears against a plate 190 as best seen in FIGS. 27 and 28. A support body angle adjust screw 191 on plate 190 bears against a shoulder 192 on hanger 174 for adjusting the effective torque of spring 188.

The forward shifter body 194 of parallelogram 182 is held parallel to support body 184 by the parallelogram linkage, and shifts transversely inwardly and outwardly relative to the frame 12a, and in particular, relative to the multiple freewheel 54a. An outer parallelogram link 196 connects support body 184 and shifter body 194 by means of respective pivot pins 198 and 200; and an inner parallelogram link 202 connects support body 1984 and shifter body 194 through respective pivot pins 204 and 206.

Derailleur return spring 208 is best seen in FIG. 29, and is a helical spring with its coil located around pivot pin 206, and having respective arms which bear against shifter body 194 and link 202 so as to bias parallelogram 182 toward a flattened, more closed condition, thereby biasing shifter body 194 laterally outwardly relative to frame 12a and freewheel 54a. A cable clamp 210 seen in FIGS. 21, 27 and 29 is mounted on outer parallelogram link 196 for clamping the end of cable 180. Increased tension on cable 180 pulls parallelogram 182 toward a more open, rectangular configuration, thereby moving shifter body 194 inwardly relative to frame 12a and freewheel 54a.

A pulley cage 212 is pivotally supported on the inner end of shifter body 194, extending downwardly therefrom. An upper guide or jockey pulley 214 is freely rotatably supported in the upper part of pulley cage 212 adjacent shifter body 194, and a lower tension pulley 216 is freely rotatably mounted in the lower portion of pulley cage 212. Cage 212 consists of outer and inner cage plates 218 and 220, respectively, outer cage plate 218 being mounted on a cage pivot bolt 222 which projects from shifter body 194. Pulley cage 212 is biased clockwise or rearwardly by means of a cage pivot tension spring 224 inside shifter body 194 which works against body 194 and outer cage plate 218.

Chain 52a extends rearwardly from one of the two chain wheels of chain wheel cluster 50a over one of the six sprockets of multiple freewheel 54a, then downwardly and forwardly over the front of guide pulley 214, then downwardly and rearwardly over the rear of tension pulley 216, and then forwardly back to the chain wheel. Guide pulley 214 shifts laterally according to lateral movements of shifter body 194 under the influence of rear control cable 180 as directed by rear handgrip shift actuator 66 so as to shift chain 52a downwardly or upwardly from sprocket to sprocket of freewheel 54a. As chain 52a shifts from a larger to a smaller sprocket on freewheel 54a, more chain becomes available in the overall chain loop, and tension pulley 216 moves rearwardly under the influence of cage pivot tension spring 224 to take up this slack. Conversely, as chain 52a shifts from a smaller to a larger sprocket of freewheel 54a, tension pulley 216 gives way forwardly against the force of tension spring 224 to provide the necessary additional chain length for the added circumference of the larger freewheel sprocket.

Rear Derailleur Cable System

The rear derailleur cable system is constructed to minimize and strictly limit lost motions or "slop" commonly found in bicycle shift cables, and make whatever lost motions that are inevitable as predictable as possible so they can be accurately taken up and compensated by cam member 74 in handgrip shift actuator 66. Such lost motions commonly occur from cable housing flexure under down-shifting cable tension toward rounding out of the cable housing, looseness of the cable in its housing, cable housing compression, cable stretch, and lost motion in cable adjustment barrels. Cable system 178 is also constructed to minimize friction between the cable and its housing so as to further reduce cable housing flexure, and to make down-shifting easier by substantially reducing the friction vector between housing and cable which opposes cable down-shifting movement, particularly under the relatively high pulling force on the cable that is required for down-shifting.

With these factors in mind, the rear cable housing is provided in two relatively short sections, a forward cable housing section 226 which extends into the handlebar end portion 72 and operatively connects with shift actuator 66 as shown in FIGS. 5–7, and a rearward cable housing section 228 which extends from a rearward location on bottom fork 36a to the rear derailleur mechanism 58a. Most of the length of rear control cable 180 is thus free of housing, and has only minimal friction against a guide under bottom bracket 22a discussed hereinafter in connection with FIGS. 22 and 23. The shortness of cable housing sections 226 and 228 greatly reduces cable compression lost motion and makes it very predictable.

Cable compression is further greatly reduced by employing a substantially axially compressionless cable housing or casing described hereinafter in connection with FIGS. 25 and 26. The construction of such substantially compressionless cable housing also greatly reduces cable housing flexure under cable down-shifting tension, and makes such flexure and consequent lost motion very predictable.

Referring to FIG. 20, forward cable housing section 226 ends at a spring-loaded front cable housing adjustment barrel 230 through which cable 180 extends and which is adjustably threadedly engaged in a front bracket 232 that is affixed to the right-hand brazon near the upper end of down tube 18a. As seen in FIG. 21, the rearward cable housing section 228 ends at a rear housing adjustment barrel 234 through which cable 180 passes and which is threadedly adjustably engaged in a rear bracket 236 that is secured to derailleur support body 184. As best seen in FIG. 24, a reduced threaded portion 238 of adjustment barrel 234 carries a helical compression spring 240 which resists inadvertent rotation of barrel 234 relative to its bracket 236. There is inevitable clearance between the barrel and bracket threads, spring 240 shifting barrel 234 slightly to the left relative to bracket 236 when cable 180 is under relatively small tension when a shift is not being made. However, during a down-shift when cable 180 is under relatively large tension, barrel 234 will move toward bracket 236 through such thread clearance, which represents lost motion in the cable system. Similar lost motion will occur between front adjustment barrel 230 and its bracket 232. A ferrule 242 is crimped over the end of rearward housing section 228 and is engaged within an axial recess in adjustment barrel 234.

Referring now to FIGS. 22 and 23, a cable guide bracket 244 is secured underneath bottom bracket 22a, and supports a pair of grooved, arcuate cable guides 236 and 248 under which the respective front and rear cables 176 and 180 freely slide. The front derailleur cable system, including cable 176, is the same as the forward portion of rear derailleur cable system 178. Thus, front cable 176 extends upwardly and forwardly along the main down tube 18a, passing through an adjustment barrel like barrel 230 which is threaded into a bracket like bracket 232 mounted on the left-hand brazon, front cable 176 then having a cable housing section like section 226 of rear cable system 178 which extends from the adjustment barrel into the handlebar end portion and connects to the front handgrip shift actuator 62 in the manner best shown in FIGS. 5–7. The rear cable extends exposed from adjustment barrel 230 rearwardly alongside main down tube 18a, under its guide 248, and thence rearwardly along bottom fork member 36a to the rear housing adjustment barrel 234.

FIGS. 25 and 26 illustrate the substantially axially compressionless cable housing, designated 250, which is employed for both of the cables 176 and 180, but shown with rear cable 180 therein. The core of housing 250 is an annular series of closely packed, primarily axially oriented wires 252 made of a tough metal such as steel. Wires 252 are arranged in a very slow or long helix, as for example a revolution in only about every three inches of length. The annular array of wires 252 is held in its circular configuration between an outer plastic jacket 254 and an inner plastic guide tube or liner 256. Inner guide tube 256 is made of a tough anti-friction plastic material such as Delrin which, together with the short lengths of cable 250 in cable sections 226 and 228, greatly minimizes cable friction in the housing. Inner guide tube 256 is closely yet freely fitted about cable 180 to minimize lost motion in the curved portions of housing sections 226 and 228.

Applicant has determined that the substantially compressionless-type cable 250 not only substantially completely eliminates cable compression as a lost motion factor, but it also substantially minimizes the tendency for conventional cable to round out or give in a "monkey motion," thereby substantially eliminating two heretofore serious sources of lost motion.

Sources of Lost Motion in Rear Derailleur Mechanism

While the aforesaid cable system preferably employed as a part of the present invention has only minimal and very predictable lost motion, every derailleur system has numerous sources of lost motion which cumulatively add up to a substantial amount of lost motion at the cable connection 210, and this cumulative lost motion varies for almost every different derailleur system, over a range of from about 0.040 inch to about 0.070 inch. For positive index shifting with applicant's handgrip shift actuator 66, a separate cam member 74 is preferably provided for each type of derailleur mechanism so as to positively take up and account for the cumulative lost motion in each derailleur mechanism. The mode of operation of cam member 74 in this regard is described in detail hereinafter in connection with FIGS. 35 and 36.

FIG. 30 illustrates some of these points of lost motion or slop in conventional derailleur systems. First, there is a wobble type of lost motion of support body 184 on its pivot bolt 186 indicated at A in FIG. 30. Support body 184 torques downwardly or upwardly, depending upon whether the chain is being shifted inwardly to a larger freewheel sprocket or outwardly to a smaller freewheel sprocket. Next, there is lost motion at each of the four link pivot pins 198, 200, 204 and 206. When support body 184 torques or twists down as at A, then shifter body 194 twists upwardly, and when support body 184 torques or twists up, then shifter body 194 twists downwardly, these motions being indicated at B in FIG. 30. Whenever shifter body 194 twists, the parallelogram links 196 and 202 also twist as indicated at C in FIG. 30. Further, there is lost motion between cage pivot bolt 222 and shifter body 194, which translates into lost motion between pulley cage 212 and shifter body 194 as indicated at D in FIG. 30. Additionally, there is lateral lost motion of guide pulley 214 on its pivot axis.

Overshift

Shift actuator cam member 74 is not only configured at its operating face 99 to account and compensate for the cumulative lost motions referred to above, but also for an overshift increment in the down-shift direction to a larger freewheel sprocket. This overshift increment serves several functions. It is the lateral angle at which guide pulley 214 addresses the chain to the next larger freewheel sprocket which causes the larger sprocket teeth to snag the chain. By moving guide pulley 214 inwardly somewhat beyond the next larger sprocket so that the chain in effect angles across the teeth of the larger sprocket, the sprocket teeth more readily snag the chain plates to provide an earlier, more positive shift. The overshift increment also causes the chain to have its final movement during a down-shift event toward the destination sprocket from the direction of the next larger sprocket, whereby during a down-shifting event the chain makes its final approach to the destination sprocket in the same direction as it would for an up-shifting event. During an up-shifting event, as the chain approaches the smaller destination sprocket, cable tension is relaxed such that the cumulative lost motion has been relaxed or backlashed, and the force vector opposing cable movement to the final destination is small and stable because of low cable force laterally against the cable housing. The same factors hold true for a down-shift to a larger sprocket when overshift is employed so that the final destination is reached in the up-shift direction. Accordingly, both the down-shift and up-shift events to the same freewheel sprocket will result in the same accurate alignment of the chain with the sprocket. Initial alignment which is conveniently calculated for each freewheel sprocket during up-shifting thereby also provides the correct chain positioning for down-shifting to each sprocket.

Figure 31:
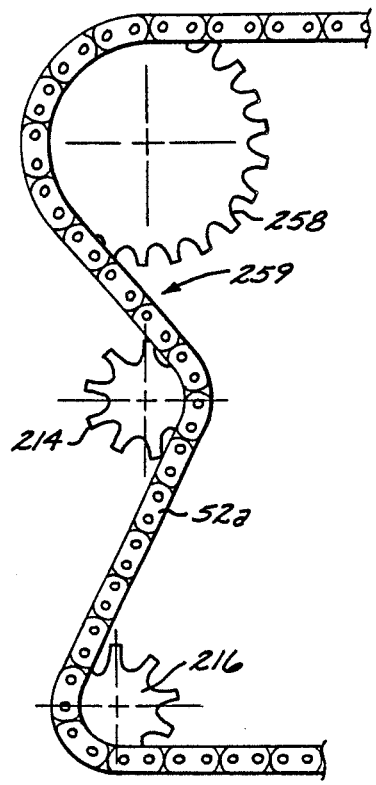
FIGS. 31 and 32 are diagrammatic views illustrating variations in chain gap.
Figure 32:
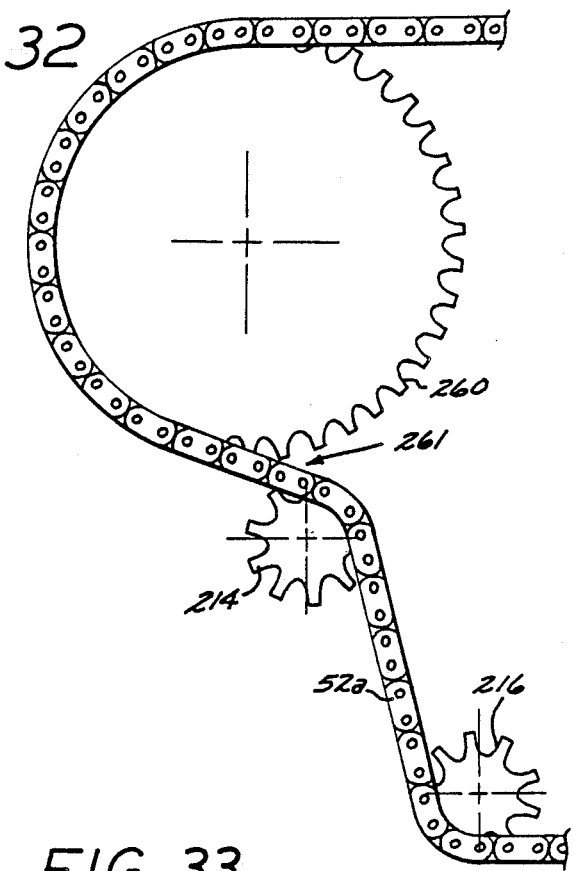

A factor which varies and which is accounted and compensated for in the cam operating face 99 of applicant's shift actuator cam member 74 is "chain gap." Chain gap is the length of chain between a particular freewheel sprocket and the derailleur guide pulley 214. For the purpose of the present description, chain gap is hereby defined as the length of chain between its tangent contacts with guide pulley 214 and a freewheel sprocket with which the chain is engaged or is to be engaged during a shifting event. Referring to FIGS. 31 and 32, FIG. 31 shows chain 52a engaged with the smallest sprocket 258 of freewheel 54a. This is the #6 sprocket, representing the highest gear ratio. It will be seen that the chain gap, designated 259, is relatively long. FIG. 32 shows chain 52a engaged with the largest sprocket 260 of freewheel 54a, and it will be seen that the chain gap 261 is relatively short. The chain gaps for the six freewheel sprockets vary successively from relatively long for the smaller freewheel sprockets to relatively short for the larger freewheel sprockets.

During down-shifting, the same lateral increment of movement of guide pulley 214 will cause the chain to approach a relatively small freewheel sprocket at a much shallower lateral angle than a relatively large freewheel sprocket, making it more difficult for the relatively small sprocket teeth to snag the chain than for the relatively large sprocket. Thus, for positive, early shifting, it is desirable to provide greater overshift for relatively small freewheel sprockets than is necessary for relatively large freewheel sprockets. For the relatively smaller sprocket, this will provide a steeper lateral angle of approach of the chain to the sprocket so that the sprocket teeth will more readily snag onto the chain and cause an earlier and more positive shift.

Figure 33:
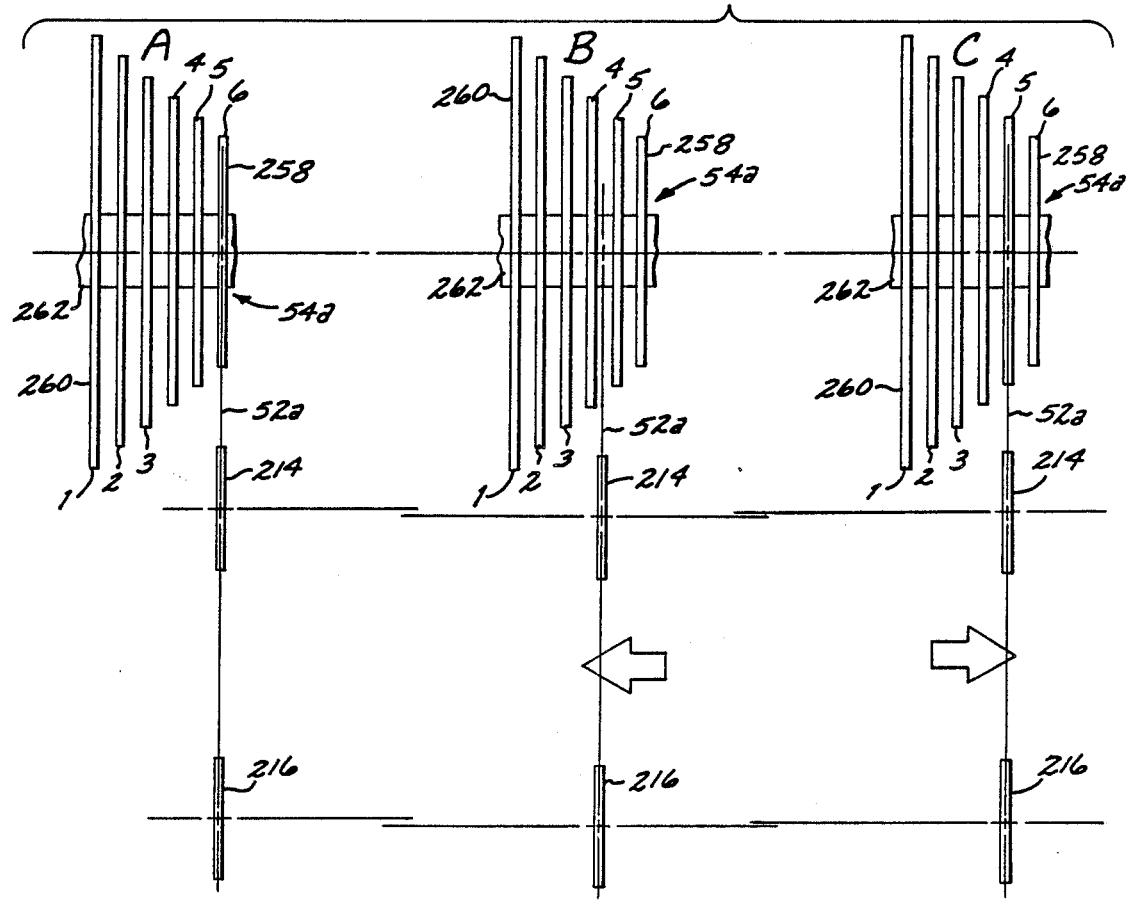
FIG. 33 is a diagrammatic view illustrating overshift.

FIG. 33 illustrates what is meant by "overshift." Each of FIGS. 33A, B and C diagrammatically illustrates rear derailleur freewheel 54a and its relationship to guide pulley 214 and chain 52a during a down-shifting event from freewheel sprocket #6, the smallest sprocket, to freewheel sprocket #5, the next smallest sprocket. The freewheel hub which overrides the wheel hub is diagrammatically illustrated as 262. The freewheel sprockets are numbered in their conventional order, from 1-6. In FIG. 33A, guide pulley 214 and chain 52a are operatively aligned with the #6 freewheel sprocket. A down-shift is to be made from sprocket #6 to sprocket #5, and FIG. 33B illustrates the overshift increment. Guide pulley 214 is moved or overshifted in the down-shifting direction substantially beyond alignment with the destination sprocket #5, moving chain 52a to this overshift position. Guide pulley 214 is then relaxed back to alignment with the destination sprocket #5, being moved under the influence of derailleur return spring 208 shown in FIG. 29, carrying chain 52a with it into accurate alignment with the destination sprocket #5 as shown in FIG. 33C. The final, aligned location of guide pulley 214 and chain 52a of FIG. 33C will be the same as the position of alignment for an up-shift from sprocket #4 to sprocket #5, the destination having been approached from the same direction with the cumulative lost motion released or backlashed, and the friction vector of the cable housing sections against the cable being the same.

Compensating for Variations in Derailleur Return Spring Force

Figure 34:
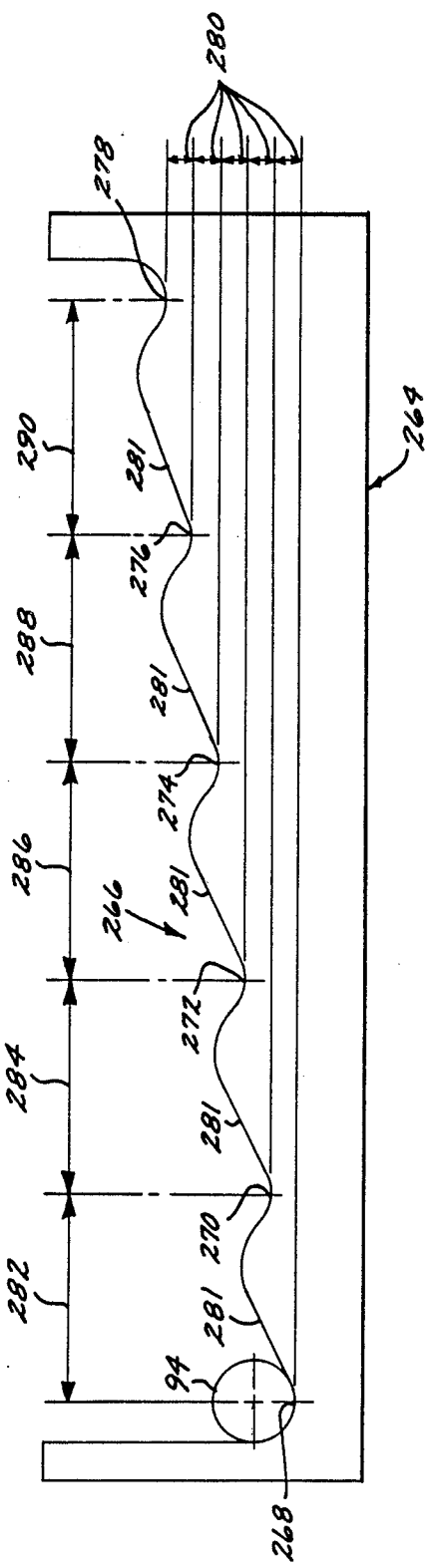
FIG. 34 is a diagrammatic view illustrating a cam face configuration which compensates for variations in derailleur return spring force.

FIG. 34 shows a 6-position cam member 264, laid out flat, for applicant's rear handgrip shift actuator 66 which has a cam operating face 266 configured for cooperation with a derailleur system embodying the cable system 178 described above. The successive cam detent valleys from the smallest sprocket, highest gear position to the largest sprocket, lowest gear position are designated 268, 270, 272, 274, 276 and 278. The axial spacings 280 between these successive detents are substantially the same, because with the cable system 178 there is no need for any material compensation in cam face 266 for conventional cable system lost motions.

However, down-shifting from the smallest sprocket position 268 to the largest sprocket position 278 successively increases the loading on derailleur return spring 208 during the shifts from freewheel sprocket to sprocket. To compensate for this progressively increasing return spring loading, cam ramps 281 of the successive cam lobes from the smallest sprocket detent 268 to the largest sprocket detent 278 are progressively flattened for progressively increasing mechanical advantage, thereby enabling the successive down-shifting increments to be effected with substantially the same amount of torque on handgrip shift actuator 66. Thus, the configuration of cam operating face 266 is such that the arcs of rotation between the successive shift locations will progressively increase, these successive arcs being designated 282, 284, 286, 288 and 290.

Down-Shift Event

Figure 35:
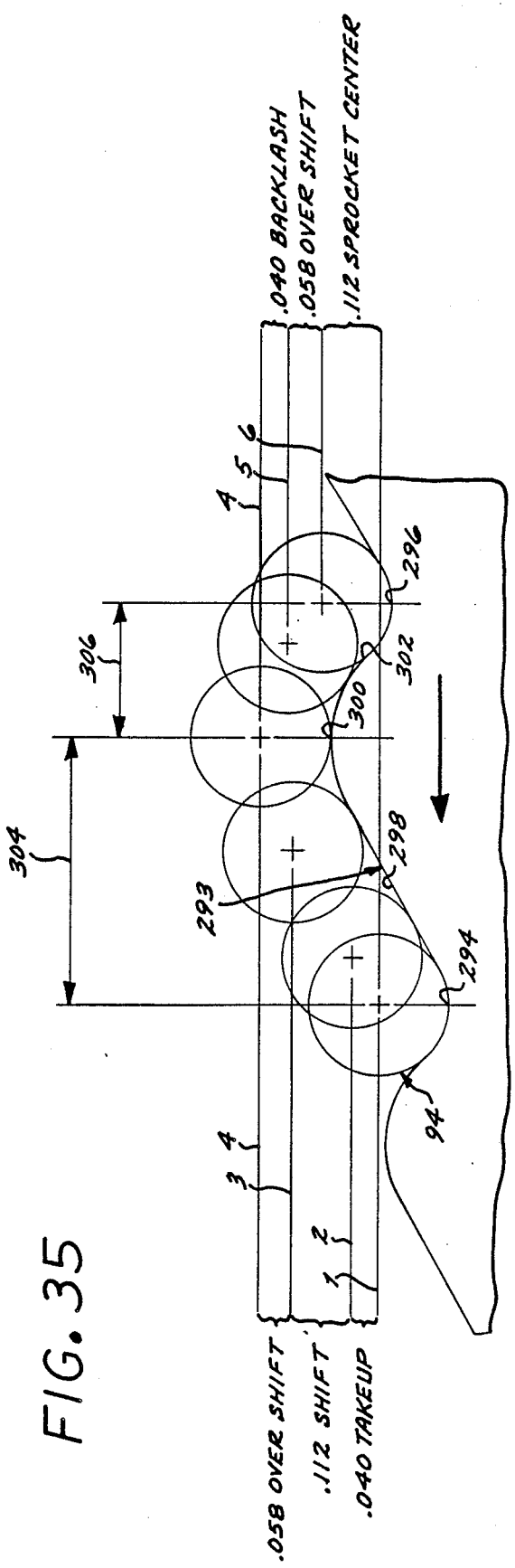
FIG. 35 is a diagrammatic illustration of a single down-shift event.

FIG. 35 diagrammatically illustrates a down-shift event controlled by a cam 292 embodied in a rear handgrip shift actuator 66 according to the invention. Cam 292 has an operating face 293 configured to produce a series of shifting increments which will reliably and repeatably produce positive index down-shifting events. As viewed, during the actual shifting event, cam pin 94 would be stationary in the horizontal rotational direction and movable by cam 292 in the vertical axial direction, while cam 292 would be movable to the left in the horizontal rotational direction. However, it is the relative rotational positioning between cam 292 and cam pin 94 which effects the shifting event, and for convenience of illustration cam 292 is shown stationary, and cam pin 94 is shown moving to the right in successive positions relative to cam 292.

During the shifting event, cam pin 94 is moved from a higher gear ratio detent 294 to the destination lower gear ratio detent 296, cam pin 94 riding from valley 294 up cam ramp 298, over peak 300, and down backslope 302 into valley 296. Cam operating face 293 is specifically configured for optimum positive index shifting of a Shimano Hyperglide rear derailleur mechanism, and the portion of cam operating face 293 illustrated in FIG. 35 is dimensioned for a down-shift event from freewheel sprocket #4 at detent 294 to freewheel sprocket #3 at detent 296. The successive axial positions of cam pin 94 relative to cam 292 are referenced to the center of cam pin 94, and are designated 1-6. In the actual mechanism of handgrip shift actuator 66, these six positions represent the successive axial positions of cam 292.

The combination of the Shimano Hyperglide rear derailleur mechanism 58a and applicant's rear derailleur cable system 178 have a cumulative lost motion of approximately 0.040 inch, and cam 292 first takes up this lost motion in its movement from position 1 to position 2. This rear derailleur mechanism 58a has a shift span from the center of freewheel sprocket 4 to the center of freewheel sprocket 3 of 0.112 inch. Accordingly, the next increment of movement of cam 292, from position 2 to position 3, causes this 0.112 inch lateral shifting movement in the derailleur mechanism 58a. Applicant's testing has determined that a 0058 overshift movement of derailleur mechanism 58a will produce optimum early and positive index shifting from sprocket #4 to sprocket #3 in this particular derailleur mechanism, and accordingly cam operating face 293 is configured to provide an overshift increment of 0.058 inch from position 3 to position 4 in FIG. 35. At position 4, cam peak 300 is axially aligned with cam pin 94.

As this shifting event progresses down backslope 302, the 0.040 inch takeup is first released as backlash between positions 4 and 5, and then the overshift increment of 0.058 inch is released between positions 5 and 6, position 6 being the destination position at which the chain is aligned with freewheel sprocket #3. A critical factor in the shift event depicted in FIG. 35 is the backlash release on cam backslope 302 of substantially the entire takeup increment of 0.040 inch. This assures that the derailleur mechanism 58a and cable system 178 are substantially completely relaxed to the same condition they would be in at the end of an up-shifting event, thereby assuring the same alignment between chain and sprocket for both a down-shifting event and an up-shifting event to the same destination freewheel sprocket.

The takeup increment of the cumulative lost motion (0.040 inch in the example) plus the shift increment (0.112 inch in the example) is considered by applicant to be a minimum limit for the axial shifting movement of the cam member during each down-shifting event. This minimum axial down-shifting movement of the cam is best stated in terms of cam lobe height, which, in FIG. 35, is the height between detent 294 and peak 300, or the height between positions 1 and 4. Therefore, the minimum cam lobe height according to the invention is hereby defined as a sufficient cam lobe height to substantially account for both the lost motion in the derailleur and cable systems (takeup) and the spacing between the centers of the origin freewheel sprocket and the destination freewheel sprocket (shift).

It is presently preferred that the cam lobe height be sufficient that it will cause the derailleur mechanism to move the chain a sufficient amount beyond the destination freewheel sprocket in a down-shifting event so that the chain will approach the destination sprocket in the same direction as it would in an up-shifting event, such cam lobe height being sufficient to first release the backlash on the lobe backslope 302, and then allow some reverse chain movement toward the destination sprocket. Such chain reversal is an observable phenomenon. In a conventional cable system, cable housing compression and warping are only substantially completely released or backleashed when the cable tension friction vector that opposes down-shift cable movement is reversed to the lesser cable friction vector of up-shift cable movement.

It is preferred that the cam lobe heights exceed these minimum and preferred lower limits to account for wear that will increase the cumulative lost motion in the derailleur system.

Applicant considers the maximum limit for applicant's cam lobe height for each down-shift event except the final one to sprocket #1 to be such that the cam lobe not cause the derailleur system 178 to move the chain sufficiently far laterally inwardly to cause a double shift, i.e., to skip on over the destination sprocket to the next sprocket. For sprocket #1, applicant considers the upper limit for the respective cam lobe height to be such that it not cause the derailleur mechanism to move the chain laterally inwardly sufficiently to derail the chain off of sprocket #1. While applicant considers these to be the upper limits for the cam lobe heights, it is presently preferred that the cam lobe heights not cause the derailleur mechanism to shift the chain laterally during any down-shifting event sufficiently to cause chain rasp against the next freewheel sprocket inboard of the destination sprocket. Nevertheless, for optimum positive index shifting, applicant prefers that each cam lobe be sufficiently high to bring the chain as close to the next freewheel sprocket as possible without the chain rasping against the next sprocket. These maximum and preferred upper limits are observable phenomena.

The following chart provides down-shifting data for a Shimano Hyperglide rear derailleur mechanism 58a utilizing applicant's rear handgrip shift actuator 66 and rear cable system 178. This chart is given by way of example only, and not of limitation. This chart illustrates the operation of the invention as heretofore described in connection with FIG. 35. The first column, "Sprocket," gives the origin and destination freewheel sprockets, listing down-shift events from the smallest sprocket, #7, down to the largest sprocket, #1. The second column, "Takeup," represents movement from position 1 to position 2 in FIG. 35 accounting for lost motion in the derailleur and cable systems. The third column, "Shift," is the lateral spacing between origin and destination sprocket centers, represented by the shift increment from position 2 to position 3 in FIG. 35. The fourth column, "Overshift," lists the overshift increments provided by cam 292 from position 3 to position 4 in FIG. 35. The fifth column lists "Overtravel," which is the sum of "Takeup" and "Overshift," or the amount of axial cam travel greater than the "Shift" spacing between the origin and destination sprocket centers. The sixth column lists the amount of overtravel which will just cause double shift in the shifts down to freewheel sprockets 6, 5, 4, 3 and 2, and will just cause derailling in the final shift down to sprocket 1. The amount of takeup required for each down-shifting event is the same, indicating the same amount of cumulative lost motion in the systems. The shift increments vary for the different down-shift events according to variations in the freewheel sprocket spacings. The amount of overshift generally is reduced from the smaller sprockets down to the larger sprockets, principally because of successive reductions in the chain gap. In the shift from sprocket 2 to sprocket 1, the overshift is made small to avoid any possibility of derailling, and with the shortest chain gap at that location, positive index shifting is achieved with only a relatively small amount of overshift. Comparing the overtravel to the double shift figures, it is noted that the cam is configured to bring the chain closest to double shift in the region of the smaller sprockets. This is to produce early and positive index shifting despite the longer chain gaps in the region of the smaller sprockets.

| Sprocket Orig./Dest. | Takeup | Shift | Overshift | Overtravel | Dbl Shift or Derail |
|---|---|---|---|---|---|
| 7-6 | .040 | .106 | .074 | .114 | .120 |
| 6-5 | .040 | .107 | .067 | .107 | .110 |
| 5-4 | .040 | .103 | .066 | .106 | .110 |
| 4-3 | .040 | .112 | .058 | .098 | .110 |
| 3-2 | .040 | .126 | .058 | .098 | .120 |
| 2-1 | .040 | .133 | .019 | .059 | .120 |

Up-shift

Figure 36:
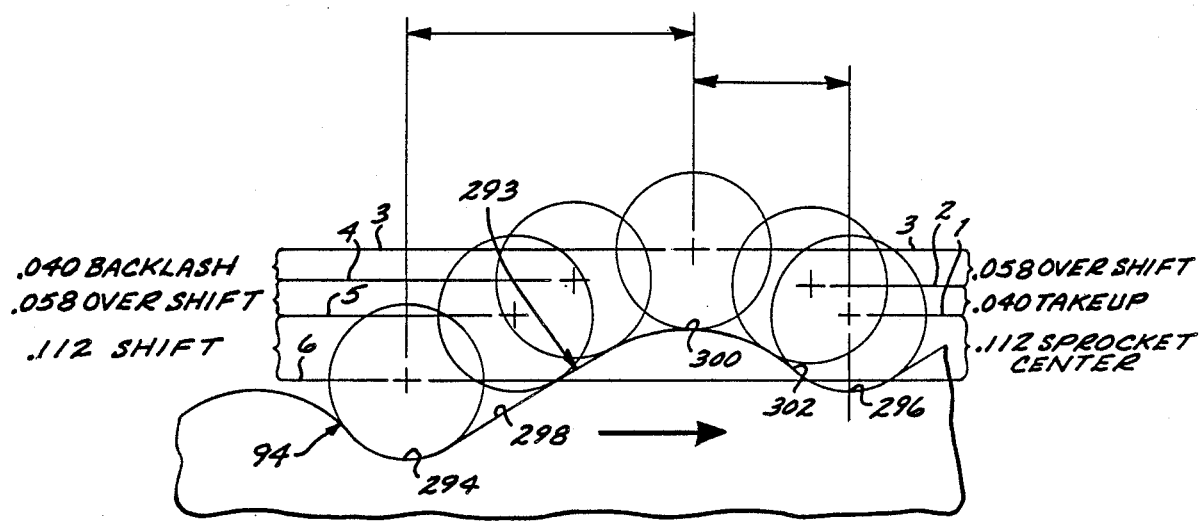
FIG. 36 is an diagrammatic illustration of a single up-shift event.

Up-shifting to a smaller sprocket does not require overshifting for accurate centering of the chain on the destination sprocket, and release of lost motions in the derailleur and cable systems is automatic. Nevertheless, with applicant's handgrip shift actuator system in which for a down-shift there is first takeup of the lost motion, next movement of a shift increment, and finally an overshift increment, when the shift actuator movement is reversed from that down-shift destination position so as to shift back up to a smaller sprocket, to get over the cam peak there will be, going up the backslope 302, takeup of the lost motion which had been left after the down-shift, plus takeup of the amount of overshift, before the cam ramp slides under the cam pin as the next lower cam detent moves toward the cam pin. This upshift event is illustrated in FIG. 36, which is the same as FIG. 35 except for the reversed rotational direction of movement of cam 292. Referring for convenience to cam pin 94 as moving relative to cam operating face 293, pin 94 starts in the higher detent 296, then rides up backslope 302 and over peak 300, and thence down cam ramp 298 and into the destination higher gear ratio detent 294. Successive positions of pin 94 relative to cam operating face 293 are indicated by the numbers 1–6. At the #1 origin position, pin 94 is detented in the higher, lower gear ratio detent 296. The first increment of movement of cam 292 to the right relative to pin 94 takes up the cumulative lost motion which was left relaxed or backlashed after the previous down-shift or up-shift event. In the example, the takeup is approximately 0.040 inch. Next, the backslope 302 takes up the amount of overshift that would have been programmed for a down-shift from detent 294 to detent 296, in the example 0.058 inch. This is motion from point 2 to point 3, point 3 representing the location of pin 94 at peak 300. Then cam pin 94 rides down cam ramp 298, and the takeup on backslope 32 is first released as backlash between positions 3 and 4, this being approximately 0.040 inch in the example. Then the overshift is released between points 4 and 5, this being 0.058 inch. Finally, the up-shift to the smaller freewheel sprocket is effected between points 5 and 6, in the example 0.112 inch.

Undercut Cam

Figure 37:
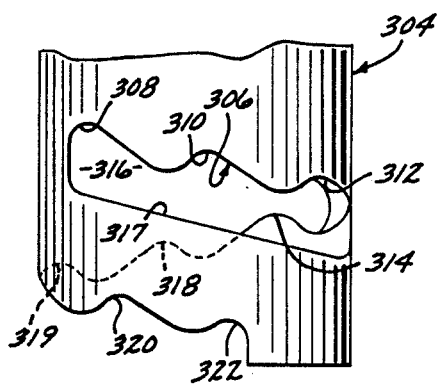
FIG. 37 is a fragmentary elevational view illustrating an elongated undercut cam for accommodating an unusually large number of gear ratios.

Applicant's cam member 74 shown in FIGS. 4–10 has sufficient circular extent for its operating face 99 to occupy an arc substantially less than 360°, as for example about 325°, with room left for a stop projection 117 at the low gear end of the operating face, for up to about seven gear ratio cam positions, with the cam ramps being gentle enough for easy down-shifting. However, with more than about seven gear ratio positions, the cam ramps may have to be undesirably steep to accommodate the necessary axial displacement for effecting the shifts, and the resulting loss of mechanical advantage may make the twisting effort for down-shifting undesirably large. FIG. 37 illustrates a modified, undercut form of cylindrical cam, generally designated 304, which has an extended operating face 306 having eight shift locations while at the same time having gentle cam ramps for easy shifting with an 8-sprocket freewheel. The highest gear ratio detent for the smallest sprocket is designated 308, and in the elevational view of FIG. 37 it is seen at the front of the cylindrical cam member 304. Traversing operating face 306 toward the lower gear ratio, larger sprocket locations, the second and third detents 310 and 312, respectively, are both also seen from the front of cam member 304 as viewed in FIG. 37. However, the fourth detent 314 is at the rear of cam member 304 as viewed in FIG. 37, but is seen through undercut region 316 of cam member 304, which is an elongated, generally helical slot defined between cam operating face 306 and a helical edge, this slot having sufficient axial dimension to accommodate the diametrical thickness of the cam pin. The next two succeeding detents 318 and 319 are still behind cam member 304, but out of view through the undercut region 316, and are therefore shown in dotted lines. The final two detents 320 and 322 for the lowest two gears are again on the front of cam member 304 as viewed in FIG. 37.

Fine-Tune Detents for Front Derailleur with 3-Chain Wheel Cluster

Figure 38:
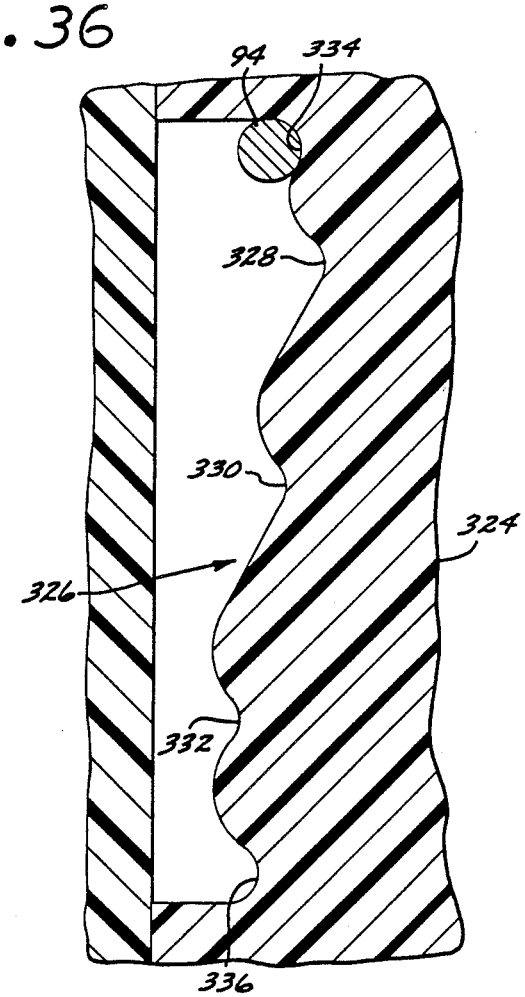
FIG. 38 is a developed view illustrating fine-tune detents for a cam of the invention adapted to control front derailleur shifting for a 3-chain wheel cluster.

In FIGS. 14 and 15, a cam 136 was shown which had two primary detents for a 2-chain wheel front derailleur cluster, with a secondary, fine-tune detent outside of each of the primary detents to counteract cross-over riding. FIG. 38 is a view similar to FIG. 15 showing a cam 324 operative for shifting the chain between the chain wheels of a front derailleur system embodying three chain wheels of small, medium and large diameters, having fine-tune secondary detents associated with the small and large diameter chain wheels. With three chain wheels in a front derailleur cluster, the small and large chain wheels may be spaced even further apart than they are in a 2-chain wheel cluster, so the crossover problem referred to in connection with FIG. 15 may be more severe for a 3-chain wheel cluster.

Cam face 326 of cam 324 has three primary detents 328, 330 and 332 for the respective small, medium and large chain wheels. To avoid cross-over chain rasp when the chain is engaged over the small chain wheel, pin 94 may be engaged in a secondary, fine-tune detent 334 which will cause the front derailleur cage to move toward medium chain wheel detent 330 and thereby avoid or minimize chain rasp on the derailleur cage when riding with the chain crossed over. Similarly, a fine-tune secondary detent 336 is provided outside of the large chain wheel detent 332, and engagement of cam pin 94 in detent 336 will move the derailleur cage toward the location of medium chain wheel detent 330 so as to avoid or minimize chain rasp against the derailleur cage when riding with the chain crossed over.

Front Derailleur

FIGS. 39 and 42-44 illustrate details of construction of front derailleur mechanism 56a shown generally in FIG. 20. The parallelogram is generally designated 338 and is best seen in FIG. 39. The fixed member of parallelogram 338 is a support body 340 which is clamped to seat tube 20a by means of a clamp 342. The derailleur cage is generally designated 344, and consists of outer and inner cage plates 346 and 348, respectively, which are connected by an upper bridge member 350 seen in FIG. 39, and a lower bridge member 351 seen in FIGS. 42, 43 and 44. An outer, upper parallelogram link 352 is pivotally connected at its ends to support body 340 and cage 344 by means of respective pivot pins 354 and 356. An inner, lower parallelogram link 358 is also pivotally connected at its ends to support body 340 and cage 344. The cage connection pin is designated 360, but the support body connection pin is masked behind a portion of the support body as viewed.

A helical spring 362 best seen in FIGS. 39 and 42 is engaged about outer pivot pin 360 for link 358, and bears against link 358 and cage 344 so as to bias parallelogram 338 and hence cage 344 inwardly toward frame member 20a and thus inwardly toward the smaller chain wheel. Spring 362 is covered by a spring housing 364.

An actuator arm 366 extends upwardly and inwardly toward frame member 20a as an extension of the upper, outer link 352. Front derailleur cable 176 is attached to actuator arm 366 proximate its free end by means of a cable clamp 368 on actuator arm 366.

Front derailleur mechanism 56a is controlled by front handgrip shift actuator 62 through cable 176. The lost motion factors previously discussed with respect to the rear derailleur system are minimized in the front derailleur system by the simplicity of the mechanism and shortness of the cable. The lost motion factors may nevertheless be accounted for in the cam lobe heights in the same manner as discussed in detail with respect to the rear derailleur system and associated handgrip shift actuator.

FIG. 40 diagrammatically illustrates locations of chain 52a when a bicycle rider is riding "parallel." Chain wheel cluster 50a has two chain wheels, a large chain wheel 370 and a small chain wheel 372. Rear freewheel 54a is a 6-sprocket cluster, including sprockets numbered 1-6. In FIG. 40, chain cage 344 is longitudinally aligned with large chain wheel 370, and also substantially aligned with freewheel sprocket #5. In normal parallel riding, when the chain is engaged over large chain wheel 370, the rear derailleur mechanism will only be actuated to shift chain 52a between the three smallest freewheel sprockets, numbers 6, 5 and 4, and with any of these three freewheel sprockets, chain 52a will remain sufficiently aligned with cage 344 to avoid rasping against either of the outer or inner cage plates 346 and 348. Similarly, with cage 344 aligned with smaller chain wheel 372, with normal parallel riding, the rear derailleur will only be actuated to locate the chain on one of the three largest freewheel sprockets, numbers 1, 2 and 3, and chain rasp will be avoided.

FIG. 41 illustrates the cross-over riding situation in which chain 52a is engaged on the larger chain wheel 370, but where the rear derailleur has been actuated to place the chain over one of the three largest freewheel sprockets, numbers 1, 2 or 3. This will cause chain rasp against inner cage plate 348, unless an undesirably wide chain cage 344 is provided. Such a large chain cage is conventional to accommodate cross-over riding, but can readily lead to derailling. Still referring to FIG. 41, if the chain were located over the smaller chain wheel 372, and located on one of the three smallest freewheel sprockets 4, 5 or 6, a reverse cross-over situation would occur in which the chain would rasp against outer cage plate 346.

FIG. 42 shows the parallel riding situation of FIG. 40, wherein chain 52a is engaged over the larger chain wheel 370, and the chain is generally centered through cage 344. FIG. 43 shows the cross-over situation of FIG. 41, with the chain engaged over the larger chain wheel 370 at the front, and engaged over one of the three largest freewheel sprockets 1, 2 or 3 at the rear. The chain is seen to be rasping against inner cage plate 348 at the front of chain cage 344. FIG. 44 shows chain 52a again properly aligned in chain cage 344 after a fine-tune adjustment has been made with the cam 136 shown in FIGS. 14 and 15, the cam being moved from a position like detent 142 in cam 136 which will produce the result of FIG. 43 to fine-tune detent 152 which will bring the chain into alignment with cage 344 as seen in FIG. 44.

Inboard Handgrip Shift Actuators

FIGS. 45-50 illustrate alternative handgrip shift actuators according to the invention which are located inboard of the handlebar ends, preferably immediately inboard of conventional handgrips. This form of the invention is particularly suitable for "mountain bikes," since riders of mountain bikes like the fixed handgrips at the ends of the handlebar for best control.

FIG. 45 illustrates the front end portion of a mountain bike, generally designated 370, which has a widespread handlebar 372 that angles slightly rearwardly. Conventional left and right grips 374 and 376, respectively, are located on the ends of handlebar 372. Front handgrip shift actuator 378 is engaged over handlebar 372 immediately inboard of left grip 374, and rear handgrip shift actuator 380 is engaged over handlebar 372 immediately inboard of right grip 376.

The front derailleur cable system is generally designated 382, and includes front control cable 384 and cable housing or casing 386. Front cable system 382 for mountain bike 370 is preferably the same system as that employed on the bicycle 10a shown in FIG. 20, with cable housing 386 terminating at an adjustment barrel arrangement like that shown in FIG. 24, cable 384 extending down alongside main down tube 388 and riding under the bottom bracket as shown in FIGS. 22 and 23, and with substantially compressionless cable housing like that shown in FIGS. 25 and 26.

The rear derailleur cable system is generally designated 390, and includes rear control cable 392, forward cable housing or casing 394, and a rearward cable housing (not shown) like that seen in FIGS. 20 and 21. Rear cable system 390 is preferably the same as rear cable system 178 shown in FIGS. 20-26 and described in detail in connection with those figures.

FIGS. 46-50 illustrate details of construction of front handgrip shift actuator 378. Actuator 378 has a tubular support body 396 comprised of an elongated inner portion 398 with a cylindrical outer surface 400, and a radially enlarged outer collar portion 402. Inner portion 398 extends from collar portion 402 in the direction of the handlebar end. Collar portion 402 has a cylindrical outer surface 404 which is coaxial with the cylindrical outer surface 400 of the support body inner portion 398. A cylindrical bore 406 extends through the length of support body 396 and has its axis laterally offset from or eccentric relative to the cylindrical outer surfaces 400 and 404, providing a relatively thick side of support body 396 for containing the cam actuating mechanism and receiving the cable housing end, while at the same time maintaining a minimum diametrical dimension for shift actuator 378.

An axially directed cam follower slot 408 is provided on the outside of inner body portion 398, extending the length of inner portion 398. Support body 396 is engaged over handlebar 372, and locked in fixed position relative to handlebar 372 by means of a set screw 410 seen in FIG. 46.

A cylindrical cam member 412 is affixed within a generally cylindrical housing 414, being locked to housing 414 by an annular array of pins 416, one of which is seen in FIG. 47. Cam member 412 has an annular inboard end 418 which rotatably seats against body collar portion 402, and a generally helical cam operating face 420 formed on its outboard end. Cam operating face 420, being configured to cooperate with the front derailleur mechanism, may have a profile similar to any of those shown in FIGS. 13, 15 and 38.

Rear handgrip shift actuator 380 is constructed in the same manner as front actuator 378, except for the cam face configuration, which is adapted for cooperation with the rear derailleur system. The cam member in rear shift actuator 380 embodies the features heretofore described in detail, and may have a profile similar to any of those illustrated in FIGS. 8, 19, 34 or 35.

Cylindrical housing 414 has a radially inwardly directed flange 422 at its outboard end which registers with the outboard end of body inner portion 398 to provide a barrier against entry of dust and dirt into the mechanism of shift actuator 378. At the inboard end of actuator 378, housing 414 overlaps body collar portion 402 to similarly provide a barrier against entry of dust and dirt into the actuator mechanism.

A cam follower plate 424 rides generally axially in follower slot 408, and has a radially outwardly directed follower pin 426 rigidly secured thereto. Cam follower pin 426 rides against cam operating face 420 as seen in FIGS. 47, 48 and 49, following the profile of cam face 420. A metal bead 428, which may be made of lead, is cast onto the end of front control cable 384, and seats in a complementary recess 430 in cam follower plate 424. A ferrule 432 crimped on the end of cable housing 366 seats in a recess 434 in collar portion 402 of body 396 to complete the cable connections to shift actuator 378.

Handgrip shift actuators 378 and 380 cooperate with respective front and rear derailleur systems in the same manner as heretofore described in detail for respective shift actuators 62 and 66, with all of the same advantages.

FIGS. 51-66 illustrate another form of the invention in which a secondary slip cam is added to the basic mechanism axially in tandem with the primary helical lobed cam, and is applicable to either a front derailleur handgrip shift actuator or a rear derailleur handgrip shift actuator. The secondary slip cam of this form of the invention is adapted to cooperate with any primary helical cam configuration according to the invention, as for example the front handgrip shift actuator primary cam profiles like those shown in FIGS. 13, 15 and 38, or any of the rear handgrip shift actuator primary cam profiles like those illustrated in FIGS. 8, 19, 34 and 35.

However, the secondary slip cam of this form of the invention is an overshift boost cam which supplements the overshift boost previously described which is programmed into the primary cam profiles, and thereby enables the primary cam profiles to be somewhat shallower so that the handgrip shift actuation is somewhat easier, requiring less rotational torque. The slip cam handgrip shift actuator shown in FIGS. 51-66 is an inboard handgrip shift actuator generally of the type shown in FIGS. 45-50 but is a rear derailleur shift actuator mounted on the right-hand side of the handlebar, the handlebar being generally designated 450. It is to be understood that the secondary slip cam form of the invention is equally applicable to a front derailleur handgrip shift actuator mounted on the left-hand side of the handlebar, with added benefits as will become apparent from the following description.

Handlebar 450 has a right grip 452 mounted on the right-hand end portion 454 of handlebar 450. The slip cam handgrip shift actuator of this form of the invention is generally designated 456, and actuates the rear derailleur through rear derailleur cable system 458 which includes rear control cable 460, forward cable housing or casing 462 which is similar to forward cable housing or casing 394 of the form of the invention shown in FIGS. 45-50, and a rearward cable housing (not shown) like that seen in FIGS. 20 and 21. The rear derailleur cable system 458 is preferably the same as rear cable system 178 shown in FIGS. 20-26 and described in detail in connection with those figures. Rear control cable 460 terminates within shift actuator 456 with a metal bead 464 which may be made of lead and cast onto the end of cable 460. The bead 464 engages against a primary cam follower generally designated 466. The cable end bead 464 is seen in FIGS. 51, and 53-58. The primary cam follower 466 is seen in each of the hardware views of FIGS. 51-58, and is seen in part in the diagrammatic operational views of FIGS. 59-66.

In the following description of shift actuator 456, for convenience of orientation, the portions of the shift actuator located toward or facing toward the outboard or right-hand end portion 454 of handlebar 450 will be referred to as forward portions or surfaces, while the portions of the shift actuator located toward or facing toward the inboard or main portion of handlebar 450 will be referred to as rearward portions or surfaces.

FIGS. 51-58 illustrate details of construction of the slip cam shift actuator 456. Shift actuator 456 has a radially eccentric tubular support body generally designated 468 which is similar to support body 396 of the form of the invention shown in FIGS. 45-50. Tubular support body 468 includes an elongated barrel portion 470 which extends to the forward end of shift actuator 456, and has a cylindrical outer surface 472. Support body 468 also has a radially enlarged cylindrical end collar 474 at its rearward end. A metal bearing insert 476, preferably of stainless steel, forms a part of the enlarged end collar 474. Bearing insert 476 has a flat annular forward bearing surface 477 which provides an axially operating bearing seat for the slip cam of this form of the invention. A rearwardly opening outer recess 478 in bearing insert 476 provides a seat for a ferrule 480 on the end of forward cable housing 462. The metal bearing insert 476 is best seen in FIG. 51, both in section and in dotted lines. Support body 468 and its metal bearing insert 476 are keyed to handlebar 450 by means of a set screw threaded into bearing insert 476 and having an inner end which projects into a hole in handlebar 450 in the same manner as the set screw 410 seen in FIG. 46.

The secondary slip cam of this form of the invention is generally designated 482, and is referred to as a slip cam because it slips during operation relative to the primary gear shifting helical cam member generally designated 483. The primary cam member 483 that is illustrated is a 6-position cam as seen in FIGS. 59–64, for a 6-sprocket rear derailleur. However, it is to be understood that the primary helical cam member 483 may have any number of positions corresponding to the same number of rear derailleur sprockets. Both secondary slip cam 482 and primary helical cam member 483 are cylindrical in form and freely rotatable about the cylindrical outer surface 472 of support body barrel portion 470. As best seen in FIG. 52, the entire cylindrical inner surface of support body 468 fits snugly about handlebar 450, and the cylindrical outer surface 472 of support body barrel portion 470 is eccentric relative to its inner surface and handlebar 450, providing a thick upper portion of barrel portion 470 and a thin lower portion of barrel portion 470 as viewed in FIG. 52, and preferably as mounted on handlebar 450. The radially enlarged end collar 474 of support body 468 and its metal bearing insert 476 are likewise eccentric, with their cylindrical outer surfaces being concentric with the cylindrical outer surface 472 of support body barrel portion 470.

The cylindrical secondary slip cam 482 and cylindrical primary helical cam member 483 are located axially in tandem relative to each other, with secondary slip cam 482 disposed rearwardly of primary cam member 483.

A generally cylindrical housing 484 extends axially the length of support body 468, with its rearward end extending over the support body enlarged rearward end collar 474 as a dust and dirt deterrent, and its forward end portion radially inwardly flanged also as a dust and dirt deterrent. While housing 484 is freely rotatable relative to support body 468, it is locked to secondary slip cam 482, as by cementing or by means of an annular series of radially oriented pins (not shown). Housing 484 and secondary slip cam 482 which it carries within it are freely rotatable as a unit about support body 468. Preferably the outside of housing 484 has an annular array of axially oriented gripping ribs 486.

The Secondary Slip Cam 482

The cylindrical secondary slip cam 482 has a flat annular rearward bearing face 488 which rides on the complementary flat annular forward bearing surface 477 of metal bearing insert 476. Slip cam 482 also has a flat annular forward surface 490 against which the generally flat annular rearward surface of primary cam member 483 seats in the up-shifting mode of operation of shift actuator 456 as will be described hereinafter in detail. Four regularly spaced cam recesses 492 are disposed in the forward portion of slip cam 482, opening out to its forward surface 490. As best seen in the enlarged diagrammatic views of FIGS. 59–66, each of these four cam recesses 492 extends, in the rotational direction, between an up-shift end stop 494 and a down-shift end stop 496. The cam profile between up-shift end stop 494 and down-shift end stop 496 consists of a relatively deep up-shift valley 498 adjacent up-shift end stop 494, then a down-shift overshift cam ramp 500, then a peak 502, next a relatively shallow permanent down-shift overshift valley 504, and finally a transient overshift boost slope 506 adjacent the down-shift end stop 496.

The Primary Helical Cam Member 483

The cylindrical primary helical cam member 483 has a flat annular rearwardly facing surface 508 which seats against the flat annular forward surface 490 of slip cam 482 in the up-shifting mode of operation of handgrip shift actuator 456. Four regularly spaced, rounded, secondary cam follower projections or lobes 510 are integrally formed on primary cam member 483 so as to project rearwardly from its flat annular rearward surface 508. The four secondary cam follower projections 510 extend into the respective four cam recesses 492 of secondary slip cam 482. Registration of the four secondary cam follower projections 510 in the respective four cam recesses 492 is best seen in FIGS. 59–66, and is partially seen in FIGS. 53–58.

As best seen in FIGS. 59–66, the six gear-ratio primary helical cam 483 has a profile with six valleys or detents 512, 514, 516, 518, 520 and 522 corresponding to six respective successive rear derailleur sprockets. The highest gear ratio valley 512 corresponding to the smallest derailleur sprocket is the lowermost in FIGS. 59–66, while the lowest gear ratio valley 522 corresponding to the largest derailleur sprocket is the uppermost in FIGS. 59–66. The derailleur return spring biases the rear control cable 460 and hence primary cam follower 466 to the left or rearwardly as viewed in FIGS. 51 and 53–66. Primary cam follower 466, being engaged on the forwardly facing cam operating face of primary cam 483, biases primary cam 483 rearwardly or to the left as viewed in FIGS. 51 and 53–66, thereby biasing the four secondary cam follower projections 510 of primary cam 483 against the respective four cam operating faces of cam recesses 492 in secondary slip cam 482. Thus, primary cam follower 466 is biased into any one of the six valleys 512, 514, 516, 518, 520 or 522 of primary cam 483 according to the position of rotation of primary cam 483 selected by the cyclist. End stops 524 and 526 are provided adjacent the respective end valleys 512 and 522 of primary cam 483 to prevent primary cam follower 466 from jumping off the operating face of primary cam 483.

A plurality of regularly spaced cam recesses 492 and respective secondary cam follower projections, preferably at least three, and most preferably at least four as shown, is provided to assure true coaxial orientation of primary cam member 483 about support body barrel 470, so as to prevent any possible cocking and consequent binding of primary cam member 483 against barrel 470 under the influence of the axial force of primary cam follower 466 which is applied to one side of primary cam member 483.

As with the primary cam shown in FIG. 34, the axial spacings 528 between successive valleys or detents 512–522 may be substantially the same, because with the cable system like cable system 178 there is no need for any material compensation in the cam operating face for conventional cable system lost motions. However, also as for the primary cam shown in FIG. 34, to compensate for progressively increasing derailleur return spring loading, it is preferred that the arcs 530, 532, 534, 536 and 538 between the successive valleys 512–522 in the down-shifting direction progressively increase in length for progressively increasing mechanical advantage.

The five successive cam lobes 540, 542, 544, 546 and 548 between the valleys 512-522 function in generally the same manner as described in detail hereinabove in connection with FIGS. 34-36 to first take up lost motion, second to provide lateral derailleur shifting movement, third to provide a primary overshift increment, fourth to provide lost motion backlash release, and fifth to provide overshift release. The profile of the cam operating face of primary cam 483 is tailored to fit the operating characteristics of any particular derailleur system Secondary slip cam 482 cooperates with primary cam 483 through its four cam recesses 492 and the secondary cam follower projections 510 to assist in down-shifting overshift and up-shifting release of the overshift as will be described hereinafter in detail in connection with FIGS. 59-66.

It is preferred that both secondary slip cam 482 and primary helical cam 483 be made of a lubricious type plastic material like that described above in connection with other forms of the invention. This facilitates the sliding action of the secondary cam rearward bearing face 488 against the metal bearing insert flat annular bearing surface 477, the sliding action between the secondary cam recesses 492 and secondary cam follower projections 510, and the sliding action of primary cam follower 466 against the lobed helical primary cam face.

Referring again to FIGS. 51-58, primary cam follower 466 consists of a cam follower plate 550 which slides within a cam follower slot 552 longitudinally arranged in the outside of the thickest portion of the tubular support body barrel portion 470. A cam follower pin 554 extends radially outwardly from the outside of plate 550, and is preferably integral with plate 550. Cam follower pin 554 is preferably half round for compactness, with the rounded part facing rearwardly for riding on the cam face of primary cam 483. An axial slot 556 in cam follower plate 526 receives the cable 460 and cable bead 464.

Down-Shifting Overshift Boosts

Figure 59:
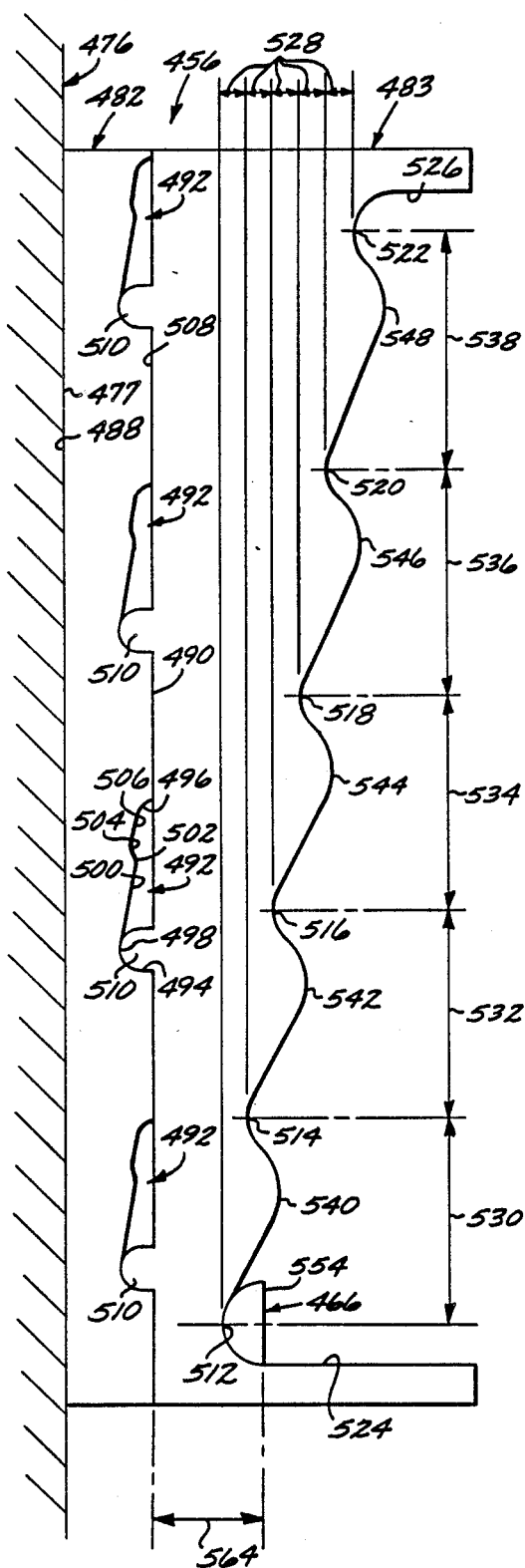
Figure 60:
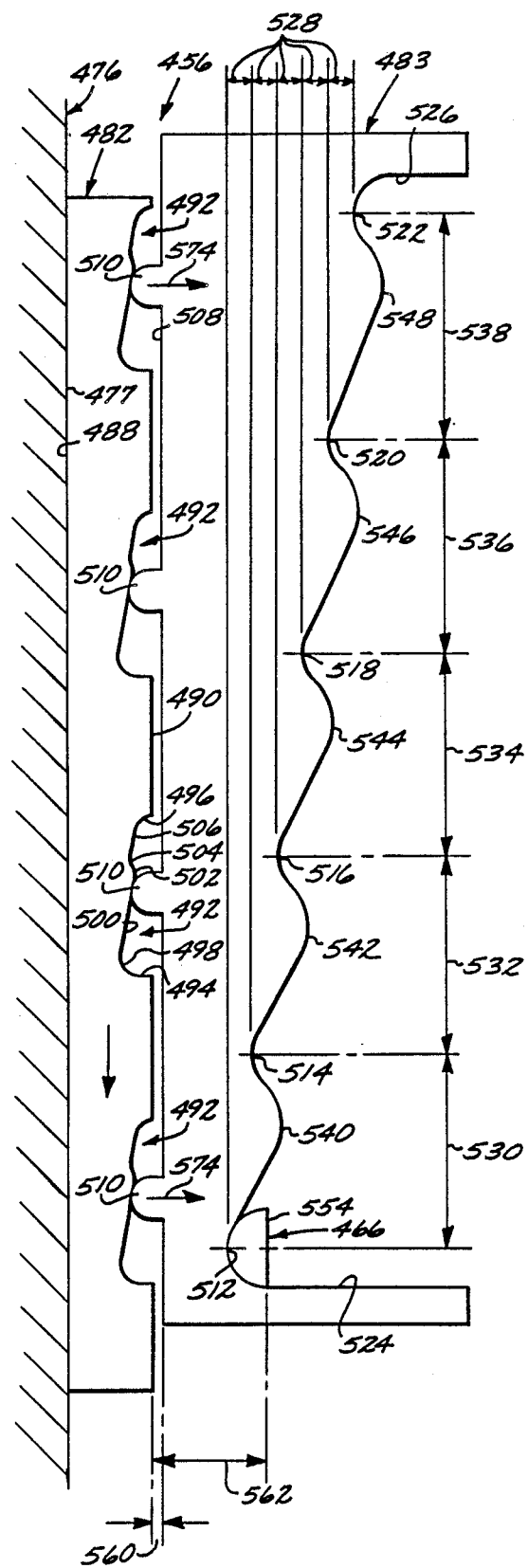

The sequence of hardware views in FIGS. 53-58 illustrates a single down-shifting event during which primary cam follower pin 554 is shifted by primary helical cam 483 from the highest gear ratio valley 512 to the second highest gear ratio valley 514, and secondary slip cam 482 applies both a transient overshift boost and a permanent overshift boost. Diagrammatic FIGS. 59-64 illustrate this same single down-shifting event, FIG. 59 showing the position of FIG. 53, FIG. 60 showing the position of FIG. 54, FIG. 61 showing the position of FIG. 55, FIG. 62 showing the position of FIG. 56, FIG. 63 showing the position of FIG. 57, and FIG. 64 showing the position of FIG. 58. Diagrammatic FIGS. 65 and 66 illustrate a single up-shifting return of primary cam follower pin 554 from the second highest gear ratio primary cam valley 514 to the highest gear ratio primary cam valley 512, while as the first stage of this up-shifting event secondary slip cam 482 completely unloads the overshift boost which had been applied during the down-shifting event.

Referring first to FIGS. 53 and 59, in these figures housing 484 and secondary slip cam 482 have been torqued to their maximum clockwise position looking from the right-hand end of handlebar 450, or from right to left in FIG. 53. In this position, the secondary cam follower projections 510 of primary cam 483 are seated in up-shift valleys 498 against up-shift end stops 494 of secondary slip cam 482, and primary cam follower pin 554 is seated in the highest gear ratio valley 512 of primary cam 483.

Starting from this position of FIGS. 53 and 59, the down-shifting event has been initiated in the position of FIGS. 54 and 60 by twisting housing 484 of shift actuator 456 counterclockwise as viewed from the right-hand end of handlebar 450, the direction in which the top of housing 484 is moved toward the cyclist It has been found from extensive testing that this is the most natural direction for a cyclist to actuate the inboard-type shift actuator 456 in the down-shifting direction. In FIGS. 54 and 60, housing 484 has rotated secondary slip cam 482 to a position in which the secondary cam follower projections 510 on primary cam 483 have ridden up the secondary cam ramps 500 close to the secondary cam peaks 502 to a level proximate that of the down-shift overshift valleys 504 which is the permanent overshift boost position at the end of a down-shifting event or series of down-shifting events. The slope of secondary cam ramps 500 is sufficiently gentle relative to the slope of primary cam lobe 540 that this rotational movement of slip cam 482 does not cause any rotational movement of primary cam 483, so that primary cam follower pin 554 remains seated in the highest gear ratio valley 512. Nevertheless, primary cam 483 has been axially shifted in FIGS. 54 and 60 an axial increment of overshift boost designated 560 in FIG. 60, which is the difference between primary cam follower 554 positions 562 in FIG. 60 and 564 in FIG. 59.

In FIGS. 55 and 61, housing 484 and slip cam 482 have been further rotated in this same counterclockwise direction to the maximum position of overshift boost in which secondary cam follower projections 510 have ridden over the secondary cam peaks 502, past the down-shift overshift valleys 504 and up the transient overshift boost slopes 506 to the down-shift end stops 496. This is the position of maximum overshift boost applied by slip cam 482. Nevertheless, primary cam follower pin 554 still remains seated in the highest gear ratio valley 512. In this position, primary cam 483 has shifted to a maximum increment of spacing 566 axially forwardly relative to secondary slip cam 482, with the primary cam follower pin 554 spacing from slip cam 482 being designated 568.

In FIGS. 56 and 62, housing 484 and slip cam 482 have been further rotated in the same direction, and slip cam 482 has now rotated primary cam 483 in the same counterclockwise direction to initiate the principal shifting movement of primary cam follower pin 554 up the slope of primary cam lobe 540. As seen in FIG. 62, in this position the spacing 566 between primary cam 483 and slip cam 482 remains the same as in FIGS. 55 and 61, but the axial spacing 570 between primary cam follower pin 554 and slip cam 482 has substantially increased. Continued abutment of cam follower projections 510 against down-shift end stops 496 has caused this down-shifting rotational movement of primary cam 483.

In FIGS. 60 and 61, the rotational direction of movement of slip cam 482 is indicated by arrow 572, and the resulting axial movement of primary cam 483 is indicated by arrows 574. No rotational movement arrow is associated with primary cam 483 in FIGS. 60 and 61, since it remains rotationally stationary, although it is being axially moved by slip cam 482. In FIG. 62, slip cam 482 and primary cam 483 rotate synchronously as indicated by respective arrows 572 and 576.

In FIGS. 57 and 63, this synchronous rotational movement has progressed to where primary cam follower pin 554 has a displacement 577 and registers with the peak of primary cam lobe 540, synchronous movement of slip cam 482 and primary cam 483 still being indicated by respective arrows 572 and 576. This is the position of maximum derailleur return spring force during this down-shifting event on primary cam follower pin 554, biasing pin 554 against primary cam 483 and biasing primary cam 483 against slip cam 482. As rotation of the cams proceeds from this location, the derailleur return spring biasing force will automatically cause primary cam follower pin 554 to ride down the back slope of cam lobe 540 into the second highest gear valley 514 as seen in FIGS. 58 and 64. As primary cam follower pin 554 slides down the back slope of lobe 540 the tension of the derailleur return spring automatically pulls primary cam 483 axially relative to slip cam 482, rotationally riding the secondary cam follower projections 510 down along the transient overshift boost slope 506 to locate projections 510 in the permanent down-shift overshift valleys 504, where they remain under the influence of the derailleur return spring until an up-shifting event occurs. This rotational increment of movement of primary cam 483 relative to slip cam 482 is indicated by the number 578 in FIG. 64.

The axial displacement between primary cam 483 and slip cam 482 in this down-shift overshift position of repose shown in FIG. 64 returns from the overshift boost spacing 566 of FIGS. 61–63 to approximately the overshift boost spacing 560 shown in FIGS. 60 and 64. The second highest gear ratio axial position of primary cam follower pin 554 relative to secondary slip cam 482 is indicated in FIG. 64 by the spacing arrows 579. The directional arrow 580 in FIG. 64 indicates counter-clockwise rotational movement of primary cam 483 under the influence of both primary cam follower pin 554 riding down the backslope of primary cam lobe 540 and secondary cam follower projections 510 riding down the transient overshift boost slopes 506.

The foregoing description of the mode of operation for a single down-shifting event between primary cam valleys 512 and 514 applies to a down-shifting event between any two adjacent primary cam valleys.

While FIGS. 53–58 and 59–64 illustrate a single down-shifting event from one of the primary cam valleys to the next, it is to be understood that the transient overshift boost illustrated in FIGS. 61–63 during which the secondary cam follower projections of primary cam 483 abut against down-shift end stops 496 of slip cam 482 will remain in effect continuously during any plural sequence of down-shifting events, no matter how many of such down-shifting events occur, at the end of which the derailleur return spring will automatically shift the secondary cam follower projections 510 back down into the down-shift overshift valleys 504 for holding the permanent overshift increment 560 while riding in that destination gear.

Up-Shifting Overshift Unloading

A single up-shifting event is illustrated in the sequence of FIGS. 64–66. In FIG. 64, primary cam follower pin 554 is lodged in the valley 514 for the second highest gear ratio of the rear derailleur, and the cam follower projections 510 of primary cam 483 are lodged in the permanent down-shift overshift valleys 504 after a down-shifting event has occurred as described above. In this position, primary cam follower pin 554 is forwardly axially displaced a spacing amount 528 from the highest gear ratio valley 512, and is axially displaced forwardly from slip cam 482 a distance 579, with primary cam 483 forwardly axially displaced from slip cam 482 an increment 560.

From this position of FIG. 64, to perform an up-shifting event, housing 484 and slip cam 482 are rotated clockwise as viewed from the right-hand end of handlebar 450, thus rotating slip cam 482 clockwise relative to primary cam 483, or upwardly relative to primary cam 483 as viewed in FIGS. 58 and 64–66, and as indicated by arrow 582 in FIGS. 64 and 65. This shifts the cam recesses 492 of slip cam 482 upwardly as viewed in FIGS. 48 and 64–66 relative to the secondary cam follower projections 510 of primary cam 483, moving projections 510 from permanent overshift valleys 504 over peaks 502, down slopes 500 into up-shift valleys 498. This is the position illustrated in FIG. 65, and represents a complete unloading of the down-shift overshift programmed into the secondary slip cam 482, placing the chain on-center with the second highest gear ratio sprocket of the rear derailleur.

This also places the secondary cam follower projections 510 of primary cam 483 against up-shift end stop 494 of slip cam 482, so that further clockwise rotation of slip cam 482 rotates primary cam 483 clockwise as viewed from the right-hand end of handlebar 450 or upwardly as viewed in FIGS. 65 and 66, accomplishing the primary up-shift movement by moving primary cam follower pin 554 from the primary cam valley 514 over primary cam lobe 540 and down into the highest gear ratio valley 512, at which position the chain registers with the smallest, highest gear sprocket of the derailleur system. The synchronous movement of slip cam 482 and primary cam 483 to accomplish this principal up-shifting action is indicated by respective arrows 582 and 584 in FIG. 66, and represents a rearward axial shifting displacement of primary cam follower pin 554 from the relatively larger axial spacing 586 of FIG. 65 down to the relatively smaller axial spacing 564 of FIG. 66 which was the spacing that the down-shifting event started with in FIG. 59.

During a single up-shifting event from any of the valleys 522, 520, 518 or 516 to the next higher gear ratio valley, the mode of operation will be the same as described above for the up-shift from valley 514 to valley 512. During a plural sequence of up-shifts from any of the valleys 522, 520, 518 or 516 to a higher gear ratio valley, the first up-shift of the series will have the same mode of operation as described for the up-shift from valley 514 to valley 512, and once that first up-shift is accomplished, slip cam 482 and primary cam 483 will maintain their same relative rotational positions throughout the up-shifting sequence, which is the relative position illustrated in both FIG. 65 and FIG. 66.

The Permanent Down-Shift Overshift Boost

The permanent down-shift overshift boost afforded by slip cam valleys 504 has been found by applicant to be particularly useful for "mass market" (i.e., inexpensive) rear derailleur mechanisms which tend to have undesirably long chain gaps and undesirably large amounts of lost motion.

Another benefit of the permanent overshift valleys 504 in slip cam 482 is that they, in cooperation with the slip cam up-shift valleys 498, afford alternative lateral positionings for a front derailleur chain cage such as chain cage 344 seen in FIGS. 39–44, for avoiding front derailleur chain rasp with the use of a relatively narrow, accurate front derailleur chain cage. Thus, a front derailleur chain cage micro-adjustment to avoid chain rasp can be accomplished after a down-shifting event which leaves cam projections 510 in the overshift valleys 504 by simply reversing the direction of rotation of shift actuator housing 484 and slip cam 482 so as to slide the secondary cam follower projections 510 back down into the up-shift valleys 498. Similarly, after a front derailleur up-shift which leaves cam follower projections 510 in the up-shift valleys 498, the micro-adjustment to avoid chain rasp may be accomplished by reversing the direction of rotation of housing 484 and slip cam 482 so as to cam the secondary cam follower projections 510 back up into the down-shift overshift valleys 504. These procedures are particularly useful where the front derailleur mechanism is associated with three chain rings, in which case chain rasp is often a problem.

Alternative Handgrip Shift Actuator for High End Bicycles

Figure 67:
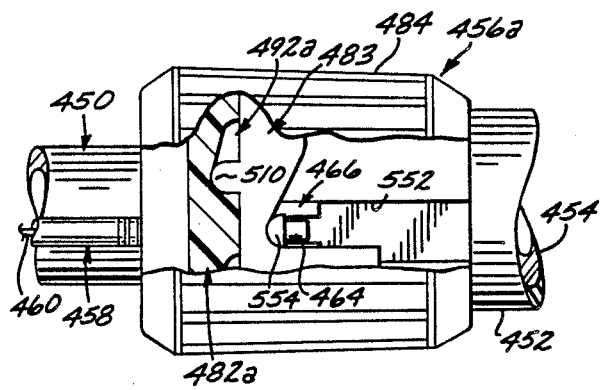
FIG. 67 is a fragmentary side elevational view with portions broken away similar to FIG. 53, but illustrating a second slip cam form of the invention.
Figure 68:
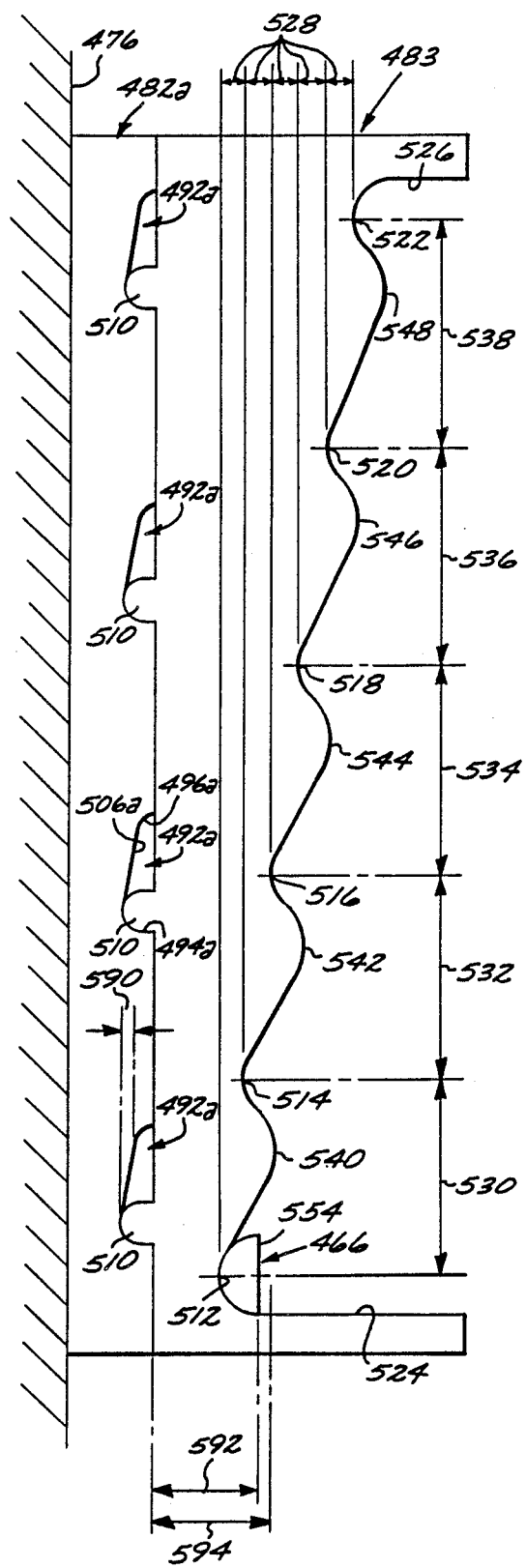
FIG. 68 is a diagrammatic view similar to FIGS. 59-66 illustrating the form of the invention of FIG. 67 with the primary helical cam and secondary slip cam laid out flat.

Relatively high quality or high end-of-the-line bicycles embody derailleur systems in which the chain gaps are generally relatively shorter and the lost motions generally less than the derailleur systems of mass production-type bicycles. The permanent overshift boost provided by the down-shift overshift valleys 504 of secondary slip cam 482 may not be useful in the derailleurs of some of the high-end bicycles because of the relatively smaller chain gaps and lesser lost motions. Nevertheless, the transient overshift boost provided by cam slopes 506 of slip cam 482 is still desirable for down-shifting in high-end derailleur systems. FIGS. 67 and 68 illustrate an alternative form of handgrip shift actuator 456a in which the secondary slip cam is modified to omit the permanent down-shift overshift valleys 504, but to retain transient overshift boost slopes similar to slopes 506 of slip cam 482. Otherwise, the alternative shift actuator 456a is the same as shift actuator 456 illustrated and described above in connection with FIGS. 51-66.

Referring to FIGS. 67 and 68, the alternative handgrip shift actuator 456a is mounted on the right-hand end portion 454 of handlebar 450, and actuates rear derailleur cable system 458 which is the same as that of FIGS. 51-58 and FIGS. 20-26. Rear derailleur cable 460 ends within shift actuator 456a with a cam follower actuating bead 464 which bears against primary cam follower 466 under the influence of the derailleur return spring. Primary cam follower 466 includes follower pin 554 and is the same as in the form of the invention shown in FIGS. 51-58. Eccentric support body 468 is also the same as in the form of FIGS. 51-58, having external longitudinal cam follower slot 552 within which primary cam follower 466 slides. The primary helical cam 483 may be the same as primary cam 483 of the form shown in FIGS. 51-56, and as with all primary helical cams of the invention, will have a cam profile which is tailored to fit the operating characteristics of any particular derailleur system.

The modified secondary slip cam of this form of the invention is generally designated 482a, and as with the form shown in FIGS. 51-66 is locked to and carried by external housing 484. Secondary slip cam 482a is the same as secondary slip cam 482 of the form of FIGS. 51-66 except only for a modified cam face profile of the four cam recesses 492a which omits the permanent down-shift overshift valleys 504. Thus, each of the four cam recesses 492a has a profile which includes an up-shift and release end stop 494a, a down-shift end stop 496a, and an intermediate transient overshift boost slope 506a. Primary helical cam 483 is the same as primary cam 483 of FIGS. 51-66.

The position of repose of the secondary cam follower projections 510 in cam recesses 492a is the position illustrated in FIGS. 67 and 68. During an up-shift event or a sequence of up-shift events, housing 484 and secondary slip cam 482a are rotated clockwise as viewed from the right-hand end of handlebar 450, secondary slip cam 482a shifting upwardly as viewed in FIG. 68. During such up-shifting, cam follower projections 510 remain seated against up-shift and release end stops 494a, and remain in that position at the end of the up-shifting event or events.

During a down-shifting event or a sequence of down-shifting events, housing 484 and secondary slip cam 482a are rotated counterclockwise as viewed from the right-hand end of handlebar 450, secondary slip cam 482a moving downwardly as viewed in FIG. 68. At the beginning of any such down-shifting event or sequence of events, the initial movement is counterclockwise rotation of secondary slip cam 482a or downward movement as viewed in FIG. 68 relative to primary helical cam 483, which remains stationary under the axial influence of the derailleur return spring as applied through primary cam follower pin 554. As secondary slip cam 482a thus moves relative to primary cam 483, the secondary cam follower projections 510 ride upwardly along the transient overshift boost slopes 506a until cam follower projections 510 come into abutment with down-shift end stops 496a. Primary helical cam 483 is thereby cammed axially forwardly relative to the axially stationary location of secondary slip cam 482a. Further counterclockwise rotation of housing 484 and secondary slip cam 482a or downward movement as viewed in FIG. 68 will cause secondary slip cam 482a to carry primary helical cam 483 with it to accomplish any desired number of sequential down-shifting events, secondary cam follower projections 510 remaining in abutment with down-shift end stops 496a during either a single down-shifting event or during any number of down-shifting events in sequence.

Although the biasing force of primary cam follower pin 554 against primary cam 483 is the same as the biasing force of cam follower projections 510 against transient overshift boost slope 506a, movement of cam follower projections 510 upwardly along transient overshift boost slopes 506a is preferential to movement of primary cam follower pin 554 upwardly along the lobes of primary helical cam 483 because the slopes of these lobes are substantially steeper than the transient overshift boost slopes 506a. Nevertheless, transient overshift boost slopes 506a are sufficiently steep to cause automatic return of cam follower projections 510 downslope to their position of repose lodged against up-shift and release end stops 494a under the influence of the derailleur return spring upon release of housing 484 and hence also of secondary slip cam 482a by the cyclist at the end of any down-shifting event or sequence of down-shifting events. Cam follower projections 510 will remain seated in this position under the influence of the derailleur return spring while no shifting is occurring and during up-shifting events, and will only become unseated again at the commencement of the next down-shifting event.

The axial increment of transient overshift boost is designated 590 in FIG. 68, and this axial increment of overshift boost 590 translates into forward axial movement of primary cam follower pin 554 in the lowest gear ratio valley 512 from an initial position designated 592 to a boosted position designated 594. The same amount of change of position of primary cam follower pin 554 will occur during initiation of any down-shifting event from any of the other primary cam valleys 514, 516, 518 or 520.

While the form of the invention having the transient overshift boost without the permanent overshift valleys has been shown and described in detail in connection with a rear derailleur handgrip shift actuator, it is to be understood that it is equally applicable to a front derailleur handgrip shift actuator, the only differences being reversal of the handgrip shift actuator onto the left-hand end portion of handlebar 450 and a different profile of primary helical cam 483.

Slip Cam Forms Require Less Down-Shifting Torque

In the handgrip shift actuator forms shown in FIGS. 51-66 and in FIGS. 67 and 68, a portion of the cable pull is taken up by the secondary slip cams before any cable pull is applied by the primary helical cams. This enables the primary helical cam lobes to be provided with a relatively shallower profile than for the other forms of the invention which do not have the secondary slip cam. The slip cam profiles have relatively low profiles, and hence good mechanical advantage in pulling the cable, and the reduced primary cam profiles enable the primary cams to have greater mechanical advantage in pulling the cables, provided the primary cam lobes are spread over the same length. A trade-off for this extra mechanical advantage in the primary cam lobes is that for a single down-shifting event, extra rotational movement is required because of the rotational distance taken up by the slip cam before the primary cam becomes operative. However, during any plural down-shifting sequence, once the slip cam movement has been taken up during the first down-shifting event, there is no further lost rotational motion because the slip cam then remains rotationally fixed to the primary helical cam during the second and any further down-shifting events of a sequence. As an alternative to gaining mechanical advantage and hence easier shifting by lowering the profiles of the primary helical cam lobes, these profiles may be shortened so as to reduce the overall amount of shift actuator rotation through all of the gears.

Referring to FIG. 35, with the handgrip shift actuators of FIGS. 51-66 and FIGS. 67 and 68, since the secondary slip cam rotates before the primary slip cam to cause cable pulling through the primary helical cam, it is to be understood that at least some of the take-up between positions 1 and 2 will be caused by the secondary slip cam. Nevertheless, since the forward movement imparted by the secondary slip cam to the primary helical cam at the onset of each down-shifting event is preserved through the shifting event, the secondary slip cam applies a calculated amount of overshift to position 4 of FIG. 35. Then, since the secondary slip cam 482 of the form shown in FIGS. 51-66 automatically partly unloads to overshift valleys 504 when housing 484 is released, and completely unloads in the form shown in FIGS. 47 and 48, at least part of the backlash between positions 4 and 5 is actually caused by such unloading of the secondary slip cam.

It is notable that the secondary slip cams of the invention always automatically produce a boost in the correct direction for both down-shifting and up-shifting, providing overshift boost in the down-shifting direction, and unloading the overshift boost in the up-shifting direction.

Although applicant's handgrip actuators preferably embody primary cam operating faces which are generally helical in configuration with the detents and peaks along the helix, it is to be understood that alternative configurations may be provided without the detents and peaks being located on the helix. For example, the primary cam operating face with the detents and peaks may be generally circular, with a lead screw advancing and retracting the cam member, or with a separate cam having a simple helical cam slope performing the advancing and retracting functions.

While the present invention has been shown and described herein in what are conceived to be the most practical and preferred embodiments, it is recognized that departures may be made therefrom within the scope of the invention, which is therefore not to be limited to the details disclosed herein, but is to be afforded the full scope of the appended claims.

What is claimed is:

1. A bicycle derailleur gear shifting system, which comprises:

derailleur shifting means having return spring means operatively associated with the rear wheel of the bicycle;

primary shift actuator cam means rotatably mounted on the bicycle handlebar generally coaxially of the handlebar;

control cable means having one end operatively associated with said primary cam means and the other end operatively connected to said derailleur shifting means, said cable means being biased toward said derailleur shifting means by said return spring means;

said primary cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means; and secondary handgrip slip cam means rotatably mounted on the bicycle handlebar coaxially in tandem with said primary cam means for actuating said primary cam means, said slip cam means being axially located so that said primary cam means is biased against said secondary slip cam means by the force of said spring means;

said slip cam means having a cam face engaged against said primary cam means whereby preliminary rotational movement of said slip cam means in the down-shift direction moves said primary cam means against the biasing force of said spring means to apply an overshift increment of cable pull against the biasing force of said spring means, further down-shifting movement of said slip cam means causing said down-shifting; and preliminary rotational movement of said slip cam means in the up-shift direction releases said primary cam means in the direction of said biasing force so as to release at least a portion of said overshift increment of cable pull, further up-shifting movement of said slip cam means causing said up-shifting.

2. A bicycle derailleur gear shifting system as defined in claim 1, wherein said cam face of said slip cam means is configured so as to release a portion of said overshift increment under the influence of said spring means upon release of said slip cam means at the completion of a down-shifting event, the remainder of said overshift increment being released under the influence of said spring means at the commencement of a subsequent up-shifting event.

3. A bicycle derailleur gear shifting system as defined in claim 2, wherein said primary cam means and said cam face of said slip cam means are configured so as in tandem to substantially compensate for the lost motions in said derailleur shifting means and said cable means.

4. A bicycle derailleur gear shifting system as defined in claim 3, wherein said cable means embodies housing means which is substantially compressionless, thereby making lost motion in said cable means small and substantially predictable.

5. A bicycle derailleur gear shifting system as defined in claim 3, wherein said derailleur shifting means is a rear derailleur shifting means, and said cable means comprises a first relatively short cable housing section proximate said cam means and a second relatively short cable housing section proximate said derailleur shifting means, with a relatively long unhoused length of said cable means extending between said first and second cable housing sections.

6. A bicycle derailleur gear shifting system as defined in claim 3, wherein said derailleur shifting means is a front derailleur shifting means, and said cable means comprises a relatively short cable housing section proximate said cam means, with a relatively long unhoused length of said cable means extending between said cable housing section and said derailleur shifting means.

7. A bicycle derailleur gear shifting system as defined in claim 2, wherein said primary cam means and said cam face of said slip cam means are configured so as in tandem to substantially compensate for chain gap variations in said derailleur shifting means.

8. A bicycle derailleur gear shifting system as defined in claim 2, wherein said derailleur shifting means is a front derailleur shifting means, and said primary cam means is configured with first and second locations which causes said derailleur shifting means to substantially align the bicycle chain with respective first and second derailleur chain wheels during parallel riding, and a third location which causes said derailleur shifting means to substantially align the chain with one of said chain wheels during cross-over riding;

adjustment of said slip cam means between its partial and complete release positions enabling fine-tuning of said front derailleur shifting means to avoid chain rasp.

9. A bicycle derailleur gear shifting system as defined in claim 8, wherein said primary cam means is configured with a fourth location which causes said derailleur shifting means to substantially align the chain with the other said chain wheel during cross-over riding;

adjustment of said slip cam means between its partial and complete release positions enabling fine-tuning of said front derailleur shifting means.

10. A bicycle derailleur system as defined in claim 2, wherein said derailleur shifting means is a front derailleur shifting means having three chain wheels;

adjustment of said slip cam means between its partial and complete release positions enabling fine-tuning of said front derailleur shifting means to avoid chain rasp.

11. A bicycle derailleur gear shifting system as defined in claim 1, wherein said cam face of said slip cam means is configured so as to release substantially the complete said overshift increment under the influence of said spring means upon release of said slip cam means at the completion of a down-shifting event.

12. A bicycle derailleur gear shifting system as defined in claim 1, wherein said primary cam means is engaged over the outside of the handlebar proximate an end of the handlebar.

13. A bicycle derailleur gear shifting system as defined in claim 1, wherein said primary cam means is engaged over the outside of the handlebar substantially inboard of an end of the handlebar.

14. A bicycle derailleur gear shifting system as defined in claim 1, wherein said primary cam means is configured so as to substantially compensate for increasing force of said return spring means in the down-shifting direction of said derailleur shifting means.

15. A bicycle derailleur gear shifting system as defined in claim 1, wherein said primary cam means is configured so as to substantially compensate for the lost motions in said derailleur shifting means and said cable means.

16. A bicycle derailleur gear shifting system as defined in claim 15, wherein said cable means embodies housing means which is substantially compressionless, thereby making lost motion in said cable means small and substantially predictable.

17. A bicycle derailleur gear shifting system as defined in claim 15, wherein said derailleur shifting means a rear derailleur shifting means, and said cable means comprises a first relatively short cable housing section proximate said cam means and a second relatively short cable housing section proximate said derailleur shifting means, with a relatively long unhoused length of said cable means extending between said first and second cable housing sections.

18. A bicycle derailleur gear shifting system as defined in claim 15, wherein said derailleur shifting means is a front derailleur shifting means, and said cable means comprises a relatively short cable housing section proximate said cam means, with a relatively long unhoused length of said cable means extending between said cable housing section and said derailleur shifting means.

19. A bicycle derailleur gear shifting system as defined in claim 1, wherein said primary cam means is configured so as to substantially compensate for chain gap variations in said derailleur shifting means.

20. A bicycle derailleur gear shifting system as defined in claim 1, wherein said derailleur shifting means is a rear derailleur shifting means, and said primary cam means and said cam face of said slip cam means are configured so as in tandem to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event.

21. A bicycle derailleur gear shifting system as defined in claim 20, wherein said primary cam means and said cam face of said slip cam means are configured so that said movement of the bicycle chain beyond said destination sprocket is insufficient to cause a double shift.

22. A bicycle derailleur gear shifting system as defined in claim 20, wherein said destination sprocket is the largest freewheel sprocket, and said primary cam means and said cam face of said slip cam means are configured so that movement of the bicycle chain beyond said destination sprocket is insufficient to cause the chain to derail from said destination sprocket.

23. A bicycle derailleur gear shifting system as defined in claim 20, wherein said primary cam means and said cam face of said slip cam means are configured so that said movement of the bicycle chain beyond said destination sprocket is insufficient to cause the chain to rasp against the next sprocket beyond said destination sprocket.

24. A bicycle derailleur gear shifting system as defined in claim 1, wherein said derailleur shifting means is a front derailleur shifting means, and said primary cam means is configured with first and second locations which causes said derailleur shifting means to substantially align the bicycle chain with respective first and second derailleur chain wheels during parallel riding, and a third location which causes said derailleur shifting means to substantially align the chain with one of said chain wheels during cross-over riding.

25. A bicycle derailleur gear shifting system as defined in claim 24, wherein said primary cam means is configured with a fourth location which causes said derailleur shifting means to substantially align the chain with the other said chain wheel during cross-over riding.

26. In a bicycle derailleur gear shifting system having a rear derailleur shifting mechanism, a shift actuator having primary shift cam means and secondary slip cam means operatively associated with said primary cam means so as to actuate said primary cam means, and control cable means operatively associating said primary cam means with said shifting mechanism, a method of performing down-shifting events from a relatively smaller origin freewheel sprocket to a relatively larger destination freewheel sprocket, which comprises the sequential steps of:

first slipping said slip cam means relative to said primary cam means a first increment of movement to actuate said primary cam means a take-up increment of movement to take up at least some of the cumulative lost motion in said derailleur mechanism and said cable means; and then moving said slip cam means and said primary cam means synchronously a second increment of movement a further amount so as to further actuate said primary cam means sufficiently to move the bicycle chain at least substantially the distance between the centers of said origin and destination sprockets.

27. A method according to claim 26, which comprises minimizing said cumulative lost motion and making it more predictable by providing said cable means with housing means that is substantially compressionless.

28. A method according to claim 27, which comprises further minimization of said cumulative lost motion by providing said cable means with relatively short cable housing means and a relatively long cable portion that is unhoused.

29. A method according to claim 26, which comprises moving said slip cam means a sufficient amount to actuate said primary cam means sufficiently to substantially compensate for chain gap variations in said derailleur shifting means.

30. A method according to claim 26, which comprises first moving said slip cam means a sufficient amount to actuate said primary cam means sufficiently to cause the bicycle chain to first move beyond said destination sprocket, and then allowing said slip cam means and said primary cam means to move back sufficiently under the influence of the derailleur return spring to cause the chain to move back to substantial alignment with said destination sprocket, whereby the chain approaches the destination sprocket in the same direction as it would in an up-shifting event.

31. A method according to claim 30, wherein the bicycle chain is not moved beyond said destination sprocket a sufficient amount to cause a double shift.

32. A method according to claim 30, wherein said destination sprocket is the largest freewheel sprocket, and wherein the bicycle chain is not moved beyond said destination sprocket a sufficient amount to cause the chain to derail from said destination sprocket.

33. A method according to claim 30, wherein the bicycle chain is not moved beyond said destination sprocket a sufficient amount to cause the chain to rasp against the next sprocket beyond said destination sprocket.

34. A method according to claim 30, wherein release of said slip cam means at the end of a down-shifting event enables the derailleur return spring to slip said slip cam means back relative to said primary cam means at least a portion of said first slipping increment of movement so as to enable the derailleur return spring to move said primary cam means sufficiently to remove at least a portion of its said take-up increment of movement.

35. A method according to claim 34, wherein said slip cam means is allowed to slip back relative to said primary cam means only a portion of said slipping increment of movement at the end of a down-shifting event, whereby said primary cam means will maintain a portion of its said take-up increment of movement at the end of a down-shifting event.

36. A method according to claim 35, wherein the remainder of said take-up increment of movement is automatically released at the beginning of the next up-shifting event.

37. A method according to claim 34, wherein said slip cam means is allowed to slip back relative to said primary cam means substantially the entire said slipping increment of movement at the end of a down-shifting event, whereby said primary cam means will release substantially all of its said take-up increment of movement at the end of a down-shifting event.

38. A method according to claim 26, wherein said shift actuator comprises cam means rotatably mounted on the bicycle handlebar generally coaxially of the handlebar.

39. A method according to claim 38, wherein said shift actuator comprises cam means rotatably mounted on the bicycle handlebar generally coaxially of the handlebar.

40. In a bicycle derailleur gear shifting system having a front derailleur shifting mechanism with a chain cage and a plurality of chain wheels, a shift actuator having primary shift cam means and secondary slip cam means operatively associated with said primary cam means so as to actuate said primary cam means, and control cable means operatively associating said primary cam means with said shifting mechanism, a method of fine-tune alignment of said chain cage with the bicycle chain at the end of a shifting event which comprises slipping said slip cam means relative to said primary cam means to cause movement of said primary cam means a sufficient amount to avoid chain rasp of said chain against said chain cage.

41. A method according to claim 40, wherein said derailleur system comprises three chain wheels.

* * * * *

UNITED STATES PATENT AND TRADEMARK OFFICE
CERTIFICATE OF CORRECTION

PATENT NO. : 4,938,733
DATED : July 3, 1990
INVENTOR(S) : Sam H. Patterson

It is certified that error appears in the above-identified patent and that said Letters Patent is hereby corrected as shown below:

In Colume 6, line 47, after "form of" delete "grip" and insert therefore --handgrip--.

Signed and Sealed this

Twenty-fourth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 4,938,733
DATED : July 3, 1990
INVENTOR(S) : Sam H. Patterson

It is certified that error appears in the above-identified patent and that said Letters Patent is hereby corrected as shown below:

In Column 6, line 47, after "form of" delete "grip" and insert therefore --handgrip--.

This certificate supersedes Certificate of Correction issued March 24, 1998.

Signed and Sealed this

Seventeenth Day of November, 1998

Attest:

BRUCE LEHMAN

Attesting Officer

Commissioner of Patents and Trademarks